United States Patent
Ota et al.

(10) Patent No.: US 11,729,334 B2
(45) Date of Patent: Aug. 15, 2023

(54) COMMUNICATION SYSTEM, DEVICE, AND RECORDING MEDIUM FOR REMOTE ACCESS TO ELECTRONIC DEVICE THROUGH RELAYING DEVICE AND CONVERTER

(71) Applicants: Hiroshi Ota, Tokyo (JP); Kazumasa Takemura, Kanagawa (JP); Susumu Chida, Kanagawa (JP)

(72) Inventors: Hiroshi Ota, Tokyo (JP); Kazumasa Takemura, Kanagawa (JP); Susumu Chida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/488,308

(22) Filed: Sep. 29, 2021

(65) Prior Publication Data
US 2022/0103714 A1    Mar. 31, 2022

(30) Foreign Application Priority Data

Sep. 30, 2020  (JP) ................. 2020-164967

(51) Int. Cl.
*H04N 1/32*  (2006.01)
*H04N 1/00*  (2006.01)
(Continued)

(52) U.S. Cl.
CPC ..... *H04N 1/32411* (2013.01); *H04N 1/00188* (2013.01); *H04N 1/00222* (2013.01); *H04N 1/4486* (2013.01); *H04W 88/04* (2013.01)

(58) Field of Classification Search
CPC ........... H04N 1/32411; H04N 1/00188; H04N 1/00222; H04N 1/4486; H04W 88/04;
(Continued)

(56) References Cited

U.S. PATENT DOCUMENTS

| 10,999,365 B2 | 5/2021 | Watanabe et al. |
| 11,108,867 B2 | 8/2021 | Funahara |

(Continued)

FOREIGN PATENT DOCUMENTS

| JP | 2013-167940 A | 8/2013 |
| JP | 2614-014187 | 1/2014 |

(Continued)

OTHER PUBLICATIONS

Extended European Search Report dated Jan. 31, 2022 in European Patent Application No. 21199614.5, 9 pages.

*Primary Examiner* — Kent Yip
(74) *Attorney, Agent, or Firm* — Xsensus LLP

(57) ABSTRACT

A disclosed communication system designed for implementing remote access from an information terminal connected to a first network to an electronic device connected to a second network differing from the first network. The communication system includes a computer having a processor and a memory storing programmed instructions that, when executed by the processor, are operable for performing a process. The process includes relaying, by a relaying device, communication between the information terminal and the second network, in a state of being connectable from the first network and the second network; and converting, by a converter, a first protocol used by the information terminal for the remote access into a second protocol corresponding to the electronic device.

20 Claims, 44 Drawing Sheets

(51) Int. Cl.
*H04N 1/44* (2006.01)
*H04W 88/04* (2009.01)

(58) Field of Classification Search
CPC ............. H04L 67/2823; H04L 63/0428; H04L 63/0823; H04L 69/329; H04L 67/38; H04L 67/02; H04L 69/326; H04L 69/08; H04L 69/18
USPC ........................................................ 358/1.15
See application file for complete search history.

(56) References Cited

U.S. PATENT DOCUMENTS

| | | | | |
|---|---|---|---|---|
| 2007/0282951 | A1* | 12/2007 | Selimis | .................... H04L 67/36 |
| | | | | 709/205 |
| 2013/0208303 | A1* | 8/2013 | Uchida | ................. G06F 3/1288 |
| | | | | 715/740 |
| 2015/0244788 | A1 | 8/2015 | Fausak et al. | |
| 2015/0277820 | A1* | 10/2015 | Anezaki | ................ G06F 3/1273 |
| | | | | 358/1.15 |
| 2020/0045124 | A1* | 2/2020 | Wayama | .................. H04L 69/08 |
| 2020/0053162 | A1 | 2/2020 | Vajravel et al. | |

FOREIGN PATENT DOCUMENTS

| | | |
|---|---|---|
| JP | 2018-061201 | 4/2018 |
| JP | 2019-062495 | 4/2019 |

* cited by examiner

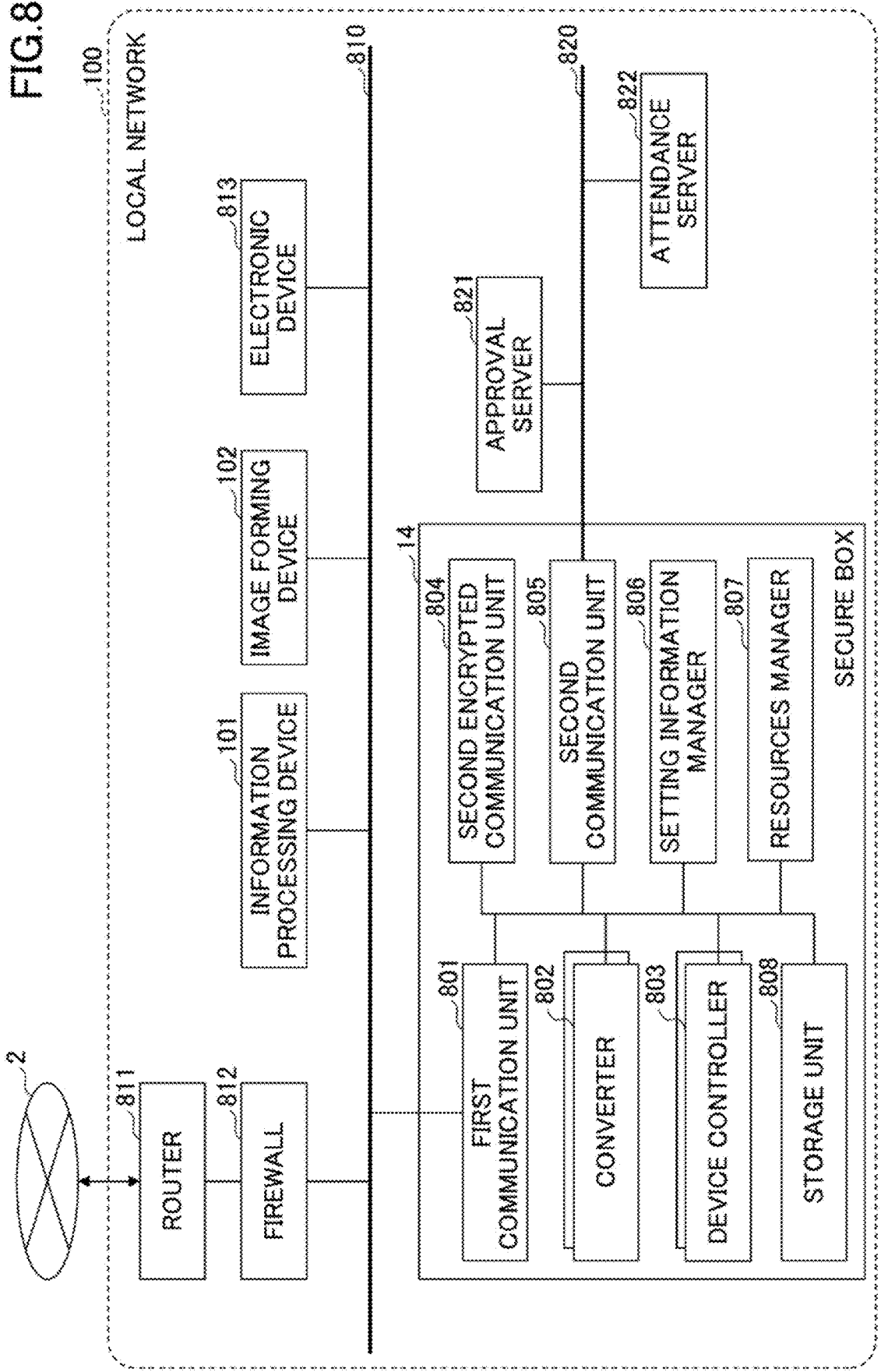

FIG.10A

SERVICE URL LIST ~1001

| SERVICE | SYMBOL | URL |
|---|---|---|
| APP SERVICE | SRV_APP | https://app.srw.example.com/ |
| RELAY SERVICE | SRV_R | https://relay.srw.example.com/ |
| PLATFORM SERVICE | PSV | https://psv.example.com/ |

FIG.10B

TENANT LIST ~421

| TENANT ID | TENANT NAME |
|---|---|
| t_20171384 | Example Co., Ltd. |
| t_51299351 | Some Company |

FIG.10C

USER LIST

| TENANT ID | USER ID | USER NAME | DISPLAY NAME | PASSWORD (HASH) |
|---|---|---|---|---|
| t_20171384 | u_30623016 | User A | USER A | 427E170F76F81F7742E9DA100D71346AA6 31ACB3F9980A1A41680883C065443 1 |
| t_20171384 | u_53293025 | User B | USER B | 10954 8320E1216758D686029CDDF1B1E1A ABBF6DC107737E11EEC5652E1D31E1 |
| t_20171384 | u_32653303 | User C | USER C | 6BC20F8892242A407D8F80B2F42A73D72F B45A4368369C06D9A2E636C51299F6 |
| t_20171384 | u_06923601 | User D | USER D | 6EAAD334709ADE01D4E0536E5251BB9D3 04A5080D6D73AF3F65CD8EFA59F6E84 |
| t_20171384 | u_03547150 | User E | USER E | F7E737B4 70CA2A4FCDA09B933C34BB542 B763DF354417 51312A9B1FAEB5F4864 |
| t_51299351 | u_67527370 | User F | USER F | D62BC66BEADBEDA27452E2EE2878F5477 61F82536A96701B7CF7C08C24AB107A |
| t_51299351 | u_60033333 | User G | USER G | 6A2436381A506C59EE76265B05F2BDCE2 48B77D14F5769EA9DFB67ED8000F21 |

USER GROUP LIST 423

| TENANT ID | USER GROUP ID | USER GROUP NAME | MEMBER LIST |
|---|---|---|---|
| t_20171384 | ug_208816657 | INFORMATION SYSTEM DEPARTMENT | u_30623016<br>u_53293025<br>ug_41656478<br>ug_12057081 |
| t_20171384 | ug_41656478 | PLANNING DIVISION | u_32653303<br>u_06923601<br>u_03547150 |
| t_20171384 | ug_12057081 | OPERATION DIVISION | u_55227158<br>u_97007332<br>u_38531663 |
| t_20171384 | ug_427783520 | SECURITY PROMOTION DEPARTMENT MANAGER | u_66887594<br>u_21397419 |
| t_20171384 | ug_35619664 | SECURITY PROMOTION DEPARTMENT | u_66887594<br>u_21397419<br>u_47470111<br>u_23588820<br>u_11899101 |
| t_51299351 | ug_55772245 | Management | u_67527370<br>u_60033333 |

FIG.11B

TYPE LIST ~331

| TENANT ID | TYPE ID | TYPE NAME | CONVERSION PROGRAM |
|---|---|---|---|
| common | t_84735099 | RDP | app/common/rdp |
| common | t_48577944 | FAX | app/common/fax |
| t_20171384 | t_17269900 | APPROVAL | app/tenant/t_20171384/approval |
| t_20171384 | t_46365658 | ATTENDANCE | app/tenant/t_20171384/attendance |
| t_51299351 | t_92833731 | HTTPS | app/common/https |

FIG.12A

SERVICE LIST 332

| TENANT ID | SERVICE ID | SERVICE NAME | TYPE | DESTINATION |
|---|---|---|---|---|
| t_20171384 | s_62375197 | INFO-SYS DEPT SHARED PC | RDP | info-pc.info.example.co.jp:3389/TCP |
| t_20171384 | s_90501454 | INFO-SYS DEPT FAX | FAX | fax.info.example.co.jp:443/TCP |
| t_20171384 | s_89645095 | INFORMATION SYSTEM MANAGEMENT | HTTPS | management.info.example.co.jp:443/TCP |
| t_20171384 | s_74241930 | APPROVAL SYSTEM | APPROVAL | approval.example.co.jp:443/TCP |
| t_20171384 | s_90716027 | ATTENDANCE SYSTEM | ATTENDANCE | attendance.example.co.jp:443/TCP |
| t_20171384 | s_89645095 | SECURITY PROMOTION DEPARTMENT INCIDENT MANAGEMENT | HTTPS | incident.security.example.co.jp:443/TCP |
| t_51299351 | s_98900543 | Accounting | HTTPS | accounting.example.co.uk:443/TCP |

FIG.12B

SERVICE GROUP LIST

| TENANT ID | SERVICE GROUP ID | SERVICE GROUP NAME | SERVICE LIST |
|---|---|---|---|
| t_20171384 | sg_29114097 | COMMON TO INFORMATION SYSTEM DEPARTMENT | s_62375197<br>s_90501454<br>sg_65031531 |
| t_20171384 | sg_65031531 | HEADQUARTERS SERVICE | s_74241930<br>s_90716027 |
| t_20171384 | sg_71576344 | COMMON TO SECURITY PROMOTION DEPARTMENT | s_61662551<br>sg_65031531 |
| t_20171384 | sg_61662551 | COMMON TO SPECIAL MISSIONS | sg_65031531 |
| t_51299351 | sg_84735099 | Top Management | s_98900543 |

ACTION LIST ~334

| TENANT ID | ACTION ID | ACTION NAME | ACTION |
|---|---|---|---|
| common | a_64499849 | PERMISSION | action/common/accept |
| common | a_15440752 | REJECTION | action/common/deny |
| t_20171384 | a_11030259 | MULTI-FACTOR AUTHENTICATION | action/tenant/t_20171384/mfa |

FIG.13A

POLICY LIST 335

| TENANT ID | POLICY ID | POLICY NAME | PRIORITY | USER | SERVICE | ACTION |
|---|---|---|---|---|---|---|
| t_20171384 | p_63619389 | INFORMATION SYSTEM DEPARTMENT MANAGER | 00000001 | u_30623016 u_53293025 u_32653303 | s_89645095 | a_64499849 |
| t_20171384 | p_10034703 | INFORMATION SYSTEM DEPARTMENT GENERAL | 00000002 | ug_20816657 | sg_29114097 | a_64499849 |
| t_20171384 | p_47089709 | SECURITY PROMOTION DEPARTMENT MANAGER | 00000003 | ug_42783520 | s_89645095 | a_11030259 |
| ... | ... | ... | ... | ... | ... | ... |

FIG.13B

SECURE BOX LIST 1301

| TENANT ID | DEVICE ID | UUID | DEVICE NAME | AUTOMATIC UPDATING |
|---|---|---|---|---|
| t_20171384 | b_76052347 | 18735b99-4fde-44e6-abff-9cd7aecc6ce1 | INFORMATION CENTER | ENABLED (SAT AND SUN, 03:00-04:00) |
| t_20171384 | b_39696039 | d658d085-1141-41b6-879b-d444453df697 | GENERAL AFFAIRS CENTER | ENABLED (SAT AND SUN, 03:00-04:00) |
| t_20171384 | b_80734640 | 11a45b85-bc8c-41c8-844e-e05ab0f2e992 | SALES CENTER | ENABLED (SAT AND SUN, 03:00-04:00) |
| ... | ... | ... | ... | ... |

FIG.13C

SESSION ID LIST ~1302

| SESSION ID | TENANT ID | USER ID | SERVICE ID | CREATION TIME |
|---|---|---|---|---|
| 1234 | t_20170931 | u_07462983 | s_69845321 | 2020-03-03-13:56 |
| ... | ... | ... | ... | ... |

FIG.13D

CONNECTION MANAGEMENT LIST ~1303

| SESSION ID | CONTAINER IP ADDRESS CORRESPONDING TO RELAY SERVER |
|---|---|
| 1234 | 192.168.0.1 |
| ... | ... |

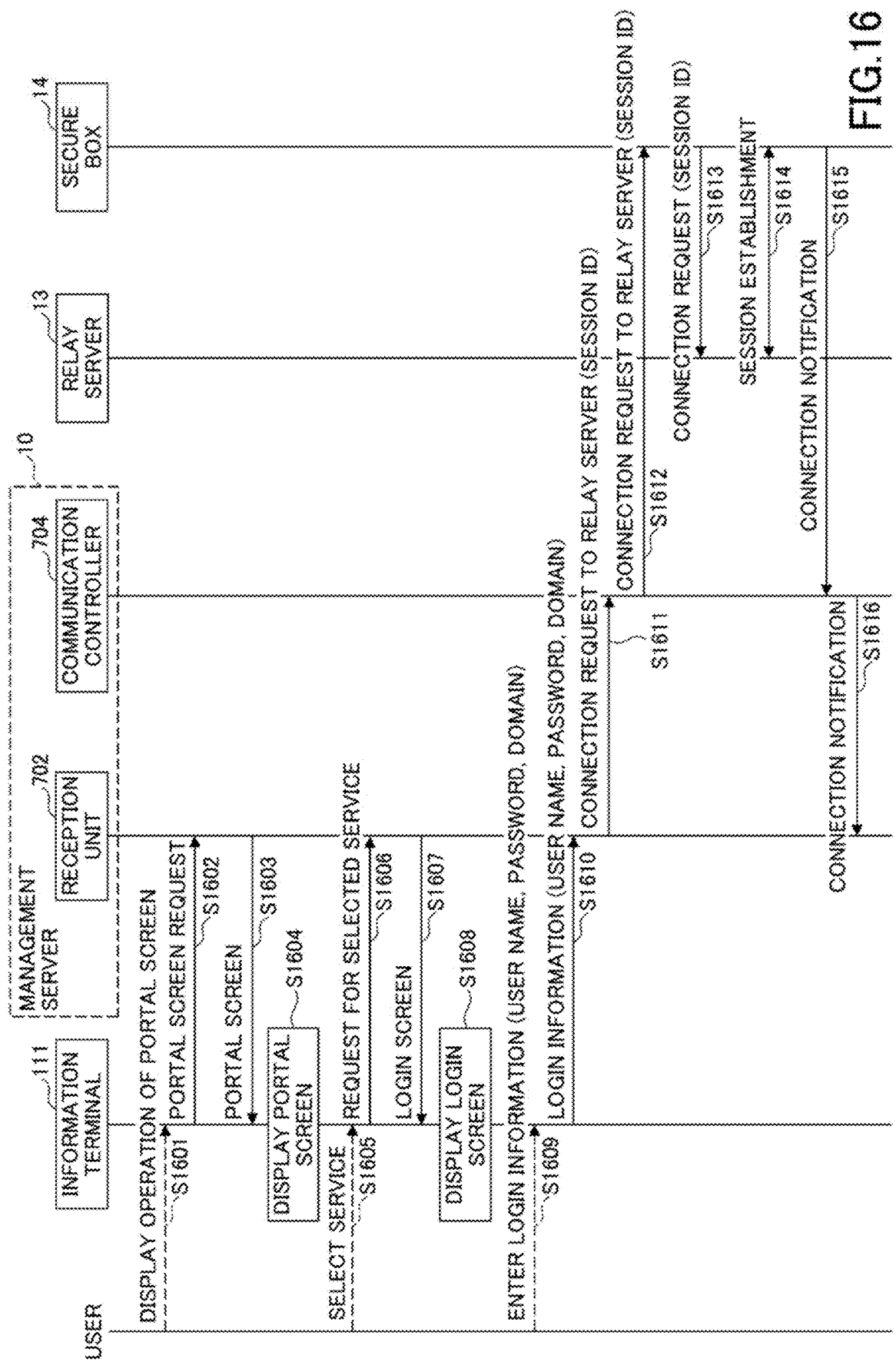

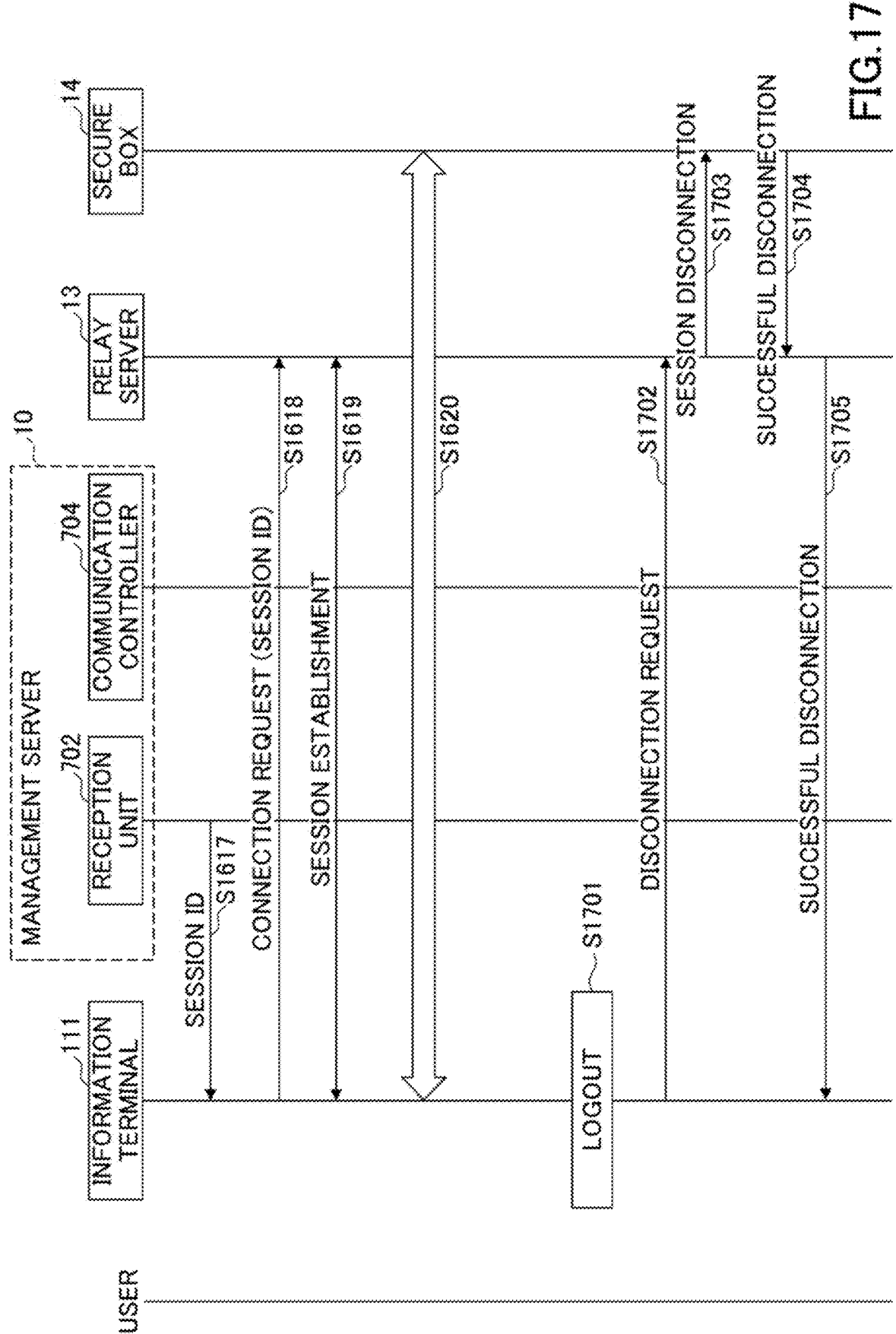

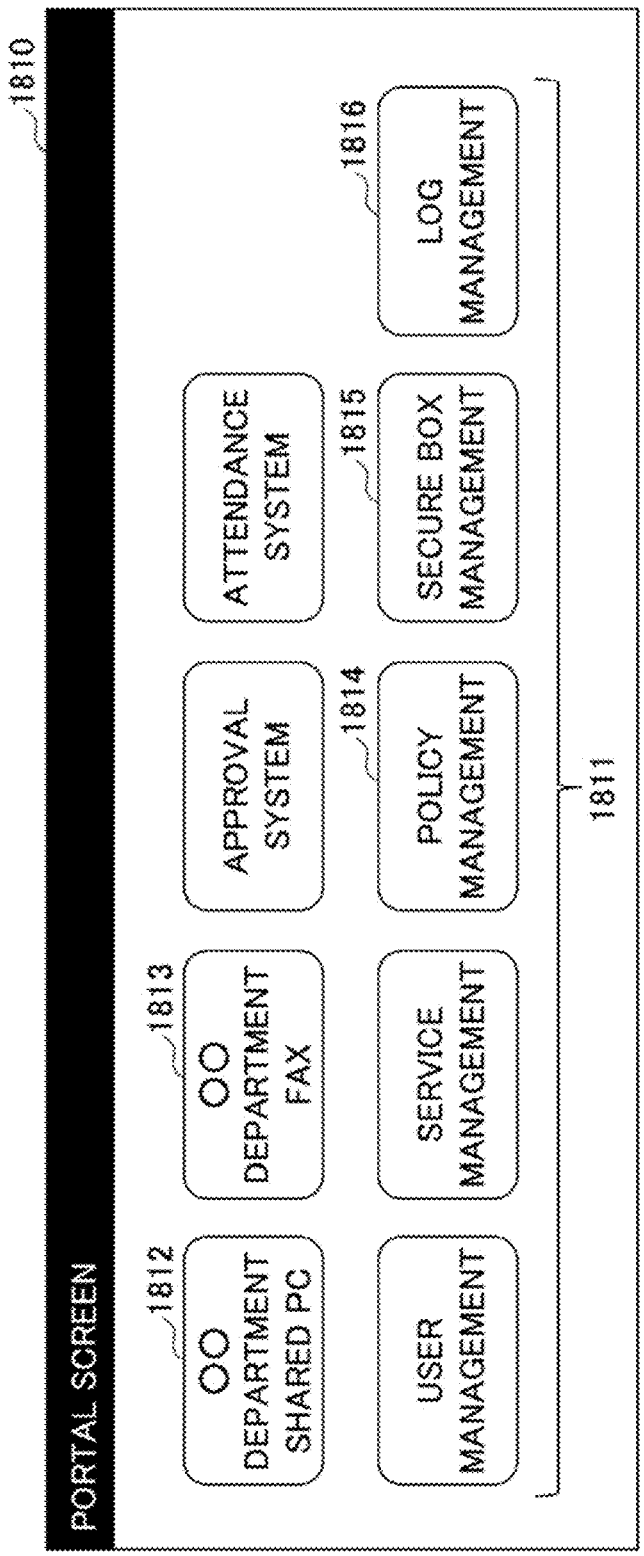

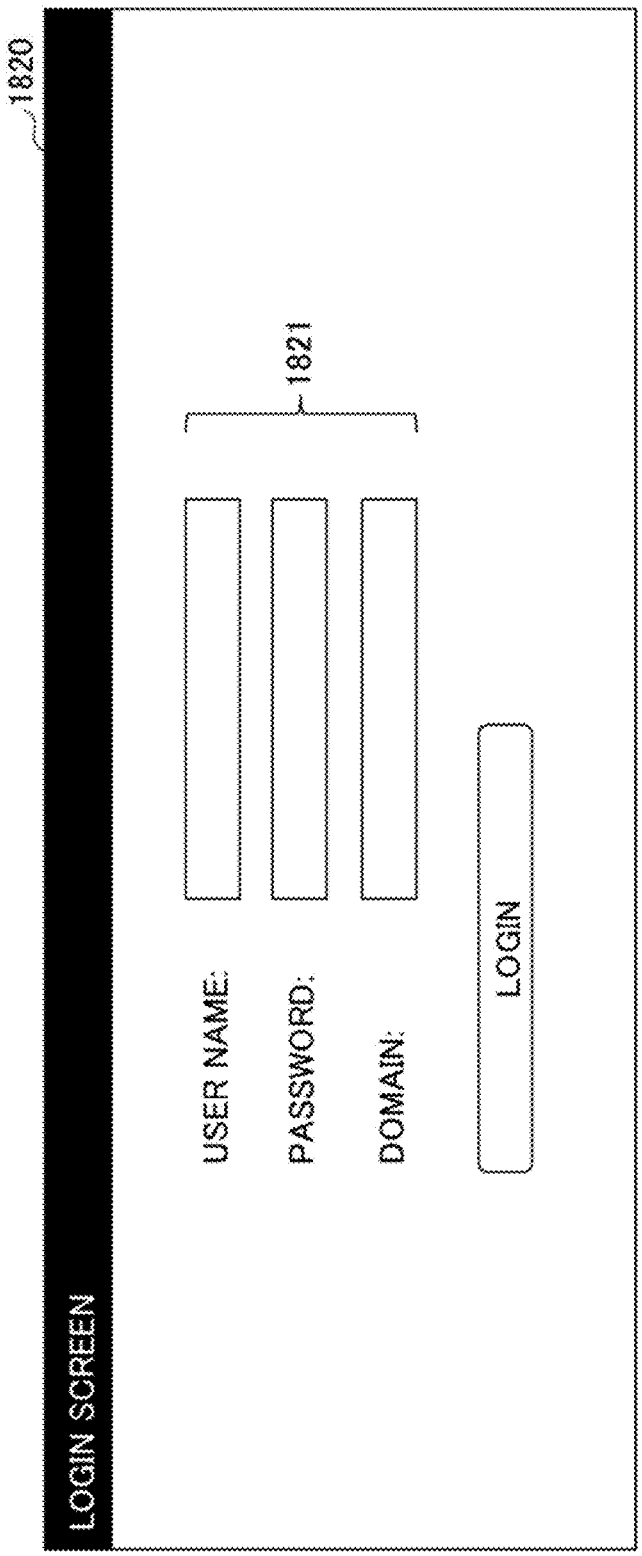

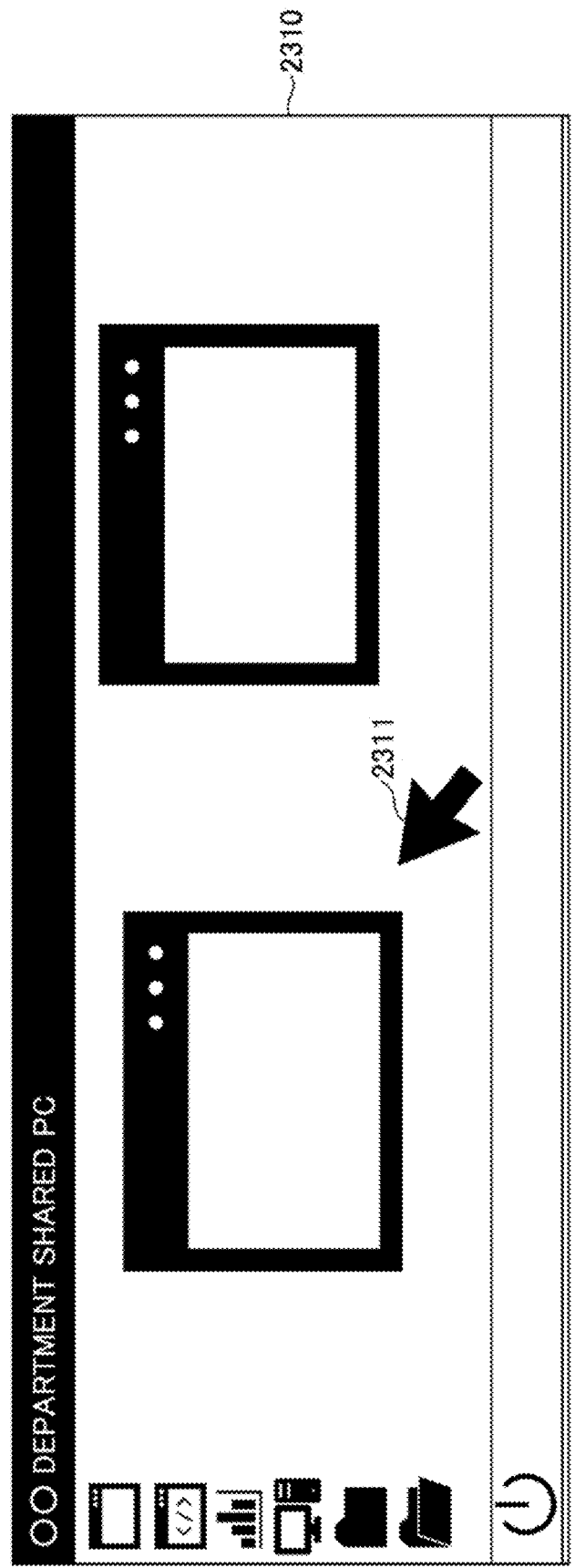

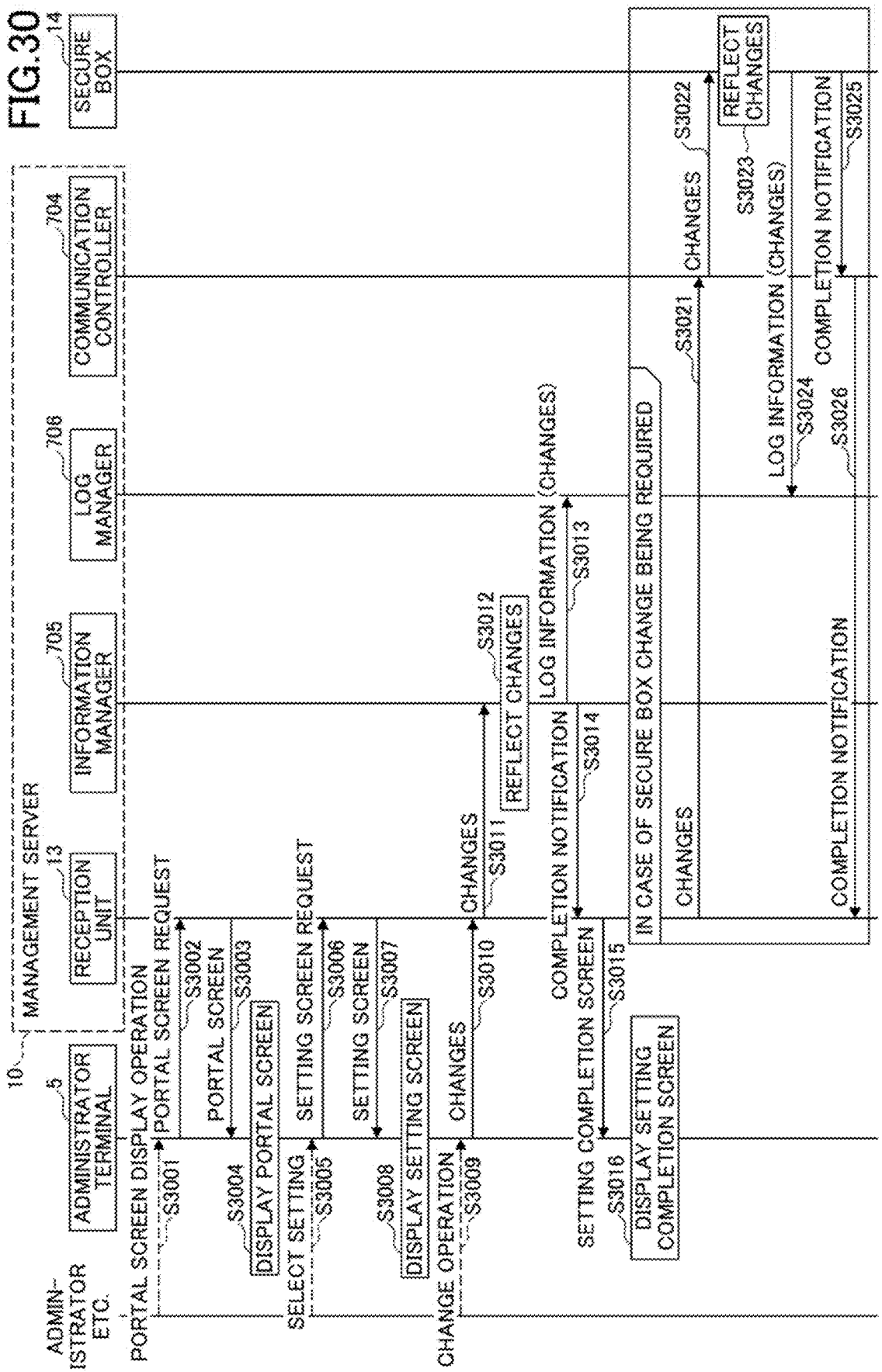

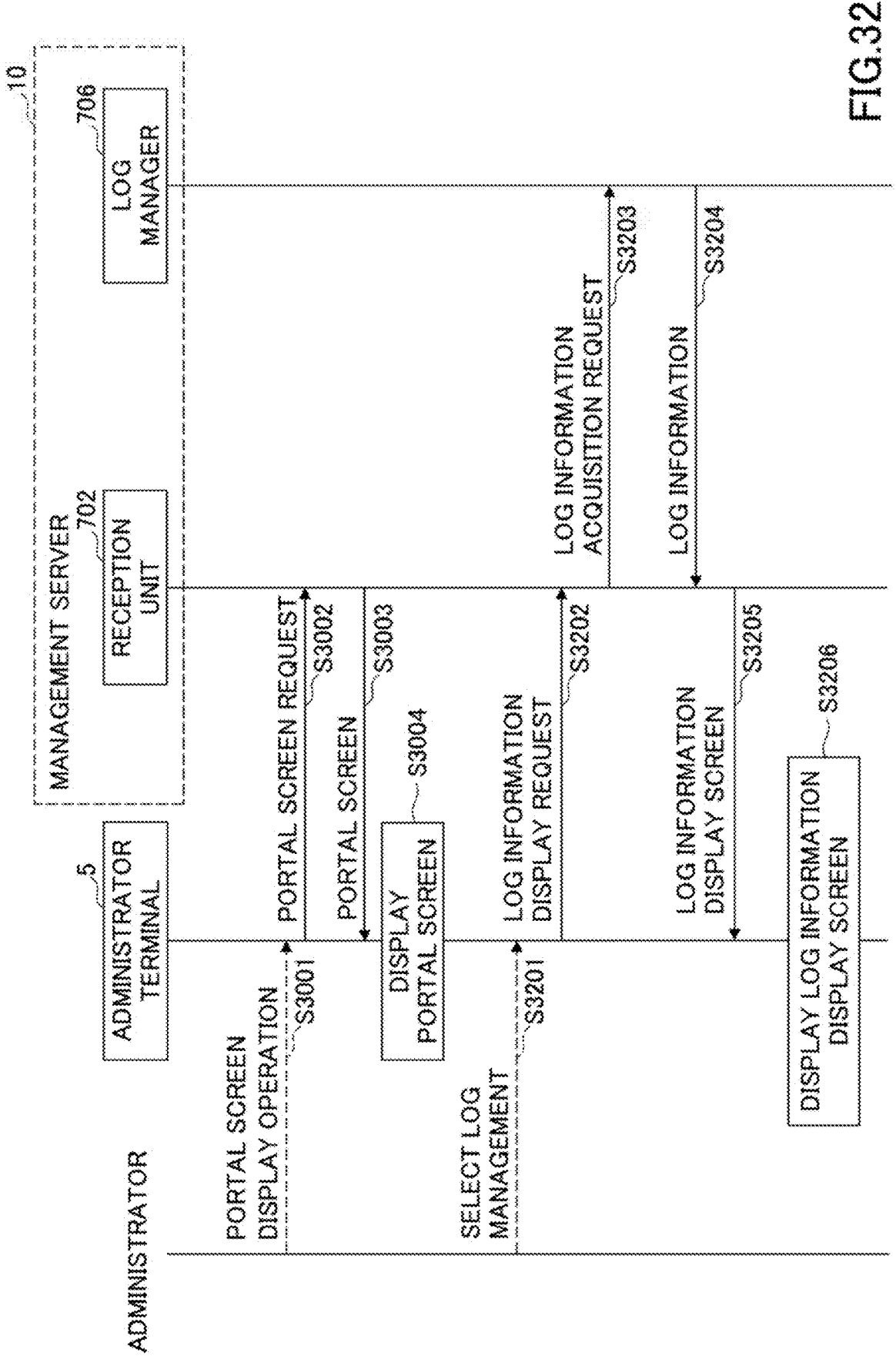

FIG.33A

LOG INFORMATION

| USER LOG | ADMINISTRATOR LOG |

| TIMESTAMP | USER | SERVICE | OPERATION | RESULT |
|---|---|---|---|---|
| 2020/09/30 13:21:10 | UserA | APPROVAL SYSTEM | SETTLEMENT: 1235 | SUCCESSFUL |
| 2020/09/30 13:20:10 | UserD | INFO-SYS DEPT SHARED PC | LOGIN | SUCCESSFUL |
| 2020/09/30 13:00:10 | UserD | INFO-SYS DEPT FAX | DISPLAY RECEIVED LIST | SUCCESSFUL |
| 2020/09/30 12:20:50 | UserE | INFO-SYS DEPT SHARED PC | LOGOUT | SUCCESSFUL |

COMMUNICATION SYSTEM, DEVICE, AND RECORDING MEDIUM FOR REMOTE ACCESS TO ELECTRONIC DEVICE THROUGH RELAYING DEVICE AND CONVERTER

CROSS-REFERENCE TO RELATED APPLICATION

The present application is based on and claims priority under 35 U.S.C. § 119 to Japanese Patent Application No. 2020-164967, filed on Sep. 30, 2020, the content of which is incorporated herein by reference in its entirety.

BACKGROUND OF THE INVENTION

1. Field of the Invention

The present invention relates to a communication system, a communication controller, a communication control method, a non-transitory computer-readable recording medium, and a program.

2. Description of the Related Art

There has seen an increase in the need for remote access to use services provided by electronic devices such as personal computers (PCs), servers, or image forming devices connected to an internal local network from home or outside due to work style reforms and the spread of working from home.

Further, Patent Document 1 discloses, for example, a communication system known in the art. In the disclosed communication system, a first communication path capable of receiving data at all times is established between a relay device connected to an electronic device acting as an operation target and a relay server, and a second communication path is established between an operation terminal and the electronic device using the first communication path (see, for example, Patent Document 1).

RELATED ART DOCUMENT

Patent Document

[Patent Document 1] Japanese Unexamined Patent Application Publication No. 2019-62495

SUMMARY OF THE INVENTION

According to one aspect of the present invention, a communication system designed for implementing remote access from an information terminal connected to a first network to an electronic device connected to a second network differing from the first network is provided. The communication system includes a computer having a processor and a memory storing programmed instructions that, when executed by the processor, are operable for performing a process. The process includes relaying, by a relaying device, communication between the information terminal and the second network, in a state of being connectable from the first network and the second network; and converting, by a converter, a first protocol used by the information terminal for the remote access into a second protocol corresponding to the electronic device.

BRIEF DESCRIPTION OF THE DRAWINGS

FIG. 8 is a diagram illustrating an example of a functional configuration of a secure box according to the first embodiment;

FIGS. 10A to 10C are diagrams (1) illustrating examples of information managed by the communication system according to the first embodiment;

FIGS. 11A and 11B are diagrams (2) illustrating examples of information managed by the communication system according to the first embodiment;

FIGS. 12A to 12C are diagrams (3) illustrating examples of information managed by the communication system according to the first embodiment;

FIGS. 13A to 13D are diagrams (4) illustrating examples of information managed by the communication system according to the first embodiment;

FIG. 16 is a sequence diagram (1) illustrating examples of a session start process and a session end process according to the first embodiment;

FIG. 17 is a sequence diagram (2) illustrating examples of a session start process and a session end process according to the first embodiment;

FIGS. 18A and 18B are diagrams (1) illustrating examples of display screens according to the first embodiment;

FIGS. 23A and 23B are diagrams (2) illustrating examples of display screens according to the first embodiment;

FIG. 30 is a sequence diagram illustrating an example of a setting process of setting information according to an embodiment;

FIG. 32 is a sequence diagram illustrating an example of a display process of log information according to an embodiment; and FIGS. 33A and 33B are diagrams illustrating examples of display screens of log information according to an embodiment.

DETAILED DESCRIPTION OF THE PREFERRED EMBODIMENTS

In the technique disclosed in Patent Document 1, after the second communication path is established, the electronic device provides the operation terminal with a web browser of the operation terminal or a UI (User Interface) displayed in the operation application. According to this technique, existing electronic devices that do not have a function to provide a UI capable of being displayed on the control device cannot be used.

One embodiment of the present invention has been made in view of the above-described related art techniques and makes various electronic devices available from various existing information terminals in a communication system for remotely accessing the electronic devices connected from the information terminals to a local network.

Hereinafter, embodiments of the present invention will be described in detail with reference to the accompanying drawings.

<System Configuration>

Figure 1:
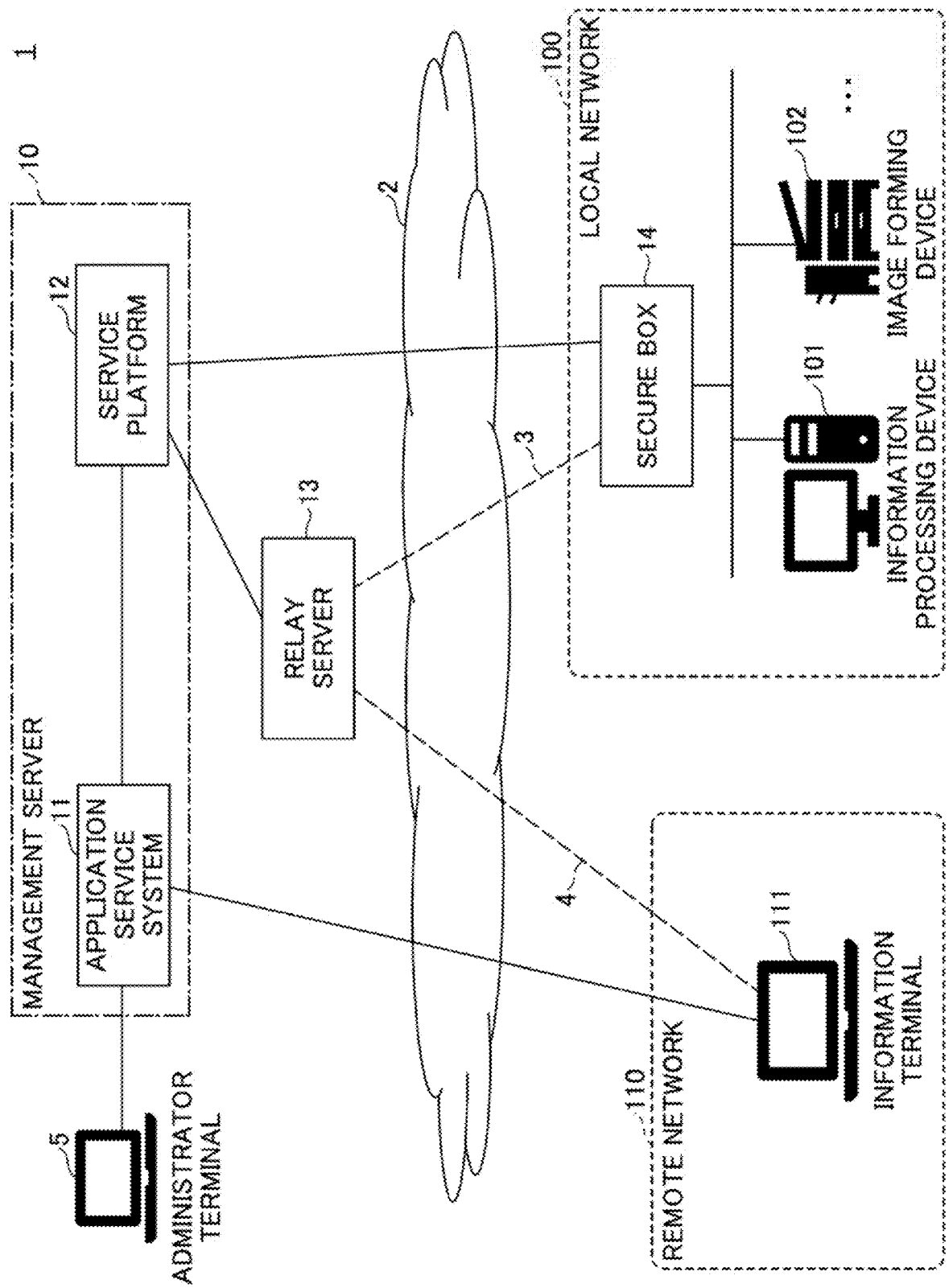
FIG. 1 is a diagram illustrating an example of a system configuration of a communication system according to a first embodiment.

FIG. 1 is a diagram illustrating an example of a system configuration of a communication system according to a first embodiment. A communication system 1 includes, for example, an application service system 11 that connects to a communication network 2 such as the Internet, a service platform 12, a relay server 13, and a secure box 14 that connects to a local network 100. The communication system 1 is a system for utilizing an information processing device 101 connected to the local network 100 and electronic devices such as an image forming device 102 from an information terminal 111 connected to an external network such as a remote network 110.

The local network 100 is a network such as, for example, an internal LAN (Local Area Network) in which access from the communication network 2 and an external network such as the remote network 110 is restricted by a firewall or the like. Note that the remote network 110 is an example of a first network. The local network 100 is an example of a second network differing from the first network.

In FIG. 1, it is assumed that the service platform 12 and the secure box 14 are preset to be communicable. Access to the secure box 14, the information processing device 101, and the image forming device 102 in the local network 100 from the information terminal 111, the relay server 13, and the like is prohibited, or disabled.

The remote network 110 is an example of an external network (first network) differing from the local network 100 (second network) provided, for example, in a remote office, and the like. The information terminal 111 is connected to, but not limited to, the remote network 110. For example, the information terminal 111 may be connected to the communication network 2, such as the Internet, from a home or an outside destination. The information terminal 111 may also be an application that runs on a cloud system. Herein, as an example, the following description will be given on the assumption that the information terminal 111 is connected to the remote network 110 which is a local network provided in a remote office or the like.

The information terminal 111 is an information processing device having a web communication function, such as a personal computer (PC), a tablet terminal, a web browser such as a smartphone, etc. used by a user. The information terminal 111 can access the application service system 11 and the relay server 13 through the remote network 110 and the communication network 2.

The information processing device 101 is an information processing device such as a PC connected to the local network 100, and provides a remote desktop service. The image forming device 102 is an electronic device having an image forming function such as MFP (Multifunction Peripheral) connected to the local network 100, and provides a facsimile service.

The information processing device 101 and the image forming device 102 may be an example of an electronic device connected to the local network 100, and providing a predetermined service. The electronic device connected to the local network 100 may be, for example, an output device such as a PJ (Projector), an IWB (white board having an electronic blackboard function enabling intercommunication), and a digital signage. The electronic device may be, for example, an industrial machine, an imaging device, a sound collector, a medical device, a network home appliance, a smartphone, a tablet terminal, a game machine, a PDA (Personal Digital Assistant), a digital camera, or the like. Further, the electronic device may be a virtual electronic device such as a virtual server.

The application service system 11 is, for example, an information processing device having a computer configuration or a system including a plurality of information processing devices. The application service system 11, for example, has a web server function that provides the information terminal 111 or the like with a web page for using an information processing device 101 or an electronic device such as an image forming device 102 in the local network 100 by using the communication system 1. The application service system 11 also has a function to provide a web page for setting the communication system 1 to, for example, an administrator terminal 5 that is an information terminal used by an administrator who administers the communication system 1.

The service platform 12 is, for example, an information processing device having a computer configuration, or a system including a plurality of information processing device. The service platform 12 links with the application service system 11 to perform an information management process for managing various setting information associated with the communication system 1 and a communication control process for controlling the secure box 14, and the like.

The application service system 11 and the service platform 12 may be included in one management server 10, for example. Further, since the application service system 11 and the service platform 12 can have various system configurations, in the following description, the application service system 11 and the service platform 12 are not distinguished and may be simply referred to as the management server 10.

The relay server 13 is, for example, an information processing device having a computer configuration or a system including a plurality of information processing devices. The relay server 13 relays communication between the information terminal 111 and the secure box 14 (or the local network 100).

The secure box 14 is, for example, a communication control device (or information processing device) having a computer configuration. The secure box 14 connects to the relay server 13 according to a control from the management server 10, and relays remote access from the information terminal 111 to the electronic device connected to the local network 100.

The administrator terminal 5 is an information terminal provided with a web communication function such as a web browser used by an administrator who administers the communication system 1.

In the above-described system configuration, the information terminal 111 is connected to the communication network 2 from the remote network 110, but cannot access the information processing device 101 and the image forming device 102 connected to the local network 100.

In such a case, in order to connect from the information terminal 111 to the local network 100, a VPN (Virtual Private Network) or the like is used for connecting from the information terminal 111 or the remote network 110 to the local network 100.

For example, as a method of connecting through a VPN, an IPsec (Internet Protocol Security) or the like is known for connecting from the remote network 110 to the local network 100. When this method is used, administrators need to configure network settings appropriately, for example, setting routing routers and setting firewall access control lists, so that IPsec can communicate correctly.

After the VPN is connected, for example, the information terminal 111 connected to the remote network 110 may access resources (e.g., networks, services, etc.) within the local network 100 under the firewall access control. However, firewall access control is essentially access control by at least one of the IP address and the port number of the transport layer (e.g., 3389/tcp). Accordingly, for example, in order to implement access control for each login user, complicated tasks such as linking the login user to an identifier such as an IP address and changing the existing network configuration are required.

According to the present embodiment, the communication system 1 is provided in which the information terminal 111 connected to the remote network 110 can securely communicate with the information processing device 101 connected to the local network 100, the image forming device 102, or the like with a simple setting.

(Outline of Processing)

For example, when a user who uses the information terminal 111 desires to perform FAX transmission using the image forming device 102 in the local network 100, the user accesses a predetermined web source provided by the management server 10 using the web browser provided by the information terminal 111. The user can select a desired service (in this case, a facsimile service provided by the image forming device 102) from a web source to request connection (connection request) to the facsimile service provided by the image forming device 102. Note that a user may access a predetermined web source by using, but not limited to, the web browser provided by the information terminal 111, but may access a predetermined web source by using an application program (hereinafter, referred to as an "application") for the communication system 1 having the web communication function.

When the management server 10 receives the connection request from the information terminal 111, the management server 10 generates (issues) a session ID as identification information identifying a session, notifies the secure box 14 of the generated session ID, and requests connection to the relay server 13. The management server 10 notifies the request source information terminal 111 of the issued session ID.

The secure box 14 connects to the relay server 13 with an encrypted first communication 3 using the notified session ID in accordance with a request from the management server 10. For example, the secure box 14 connects to the relay server 13 with the first communication 3 by utilizing Web Socket over HTTPS (Hypertext Transfer Protocol Secure) (hereinafter referred to as wss).

The information terminal 111 connects to the relay server 13 by an encrypted second communication 4 using the session ID notified from the management server 10. For example, the information terminal 111 connects to the relay server 13 by the second communication 4 using wss.

The relay server 13 relays between the first communication 3 connected to the relay server 13 and the second communication 4, using the same session ID (connection information). For example, the relay server 13 can communicate between the information terminal 111 and the secure box 14 by tunneling the first communication 3 and the second communication 4.

Through the above-described process, the information terminal 111 may be connected to the local network 100 with wss.

However, in order to use a facsimile service (an example of an image forming service) provided by the image forming device 102, for example, it is necessary to control the image forming device 102 by using a predetermined Web API (Application Programming Interface). Note that the Web API is an interface that uses the HTTP protocol or the HTTPS protocol to externally utilize various functions provided by the image forming device 102 across the network. The Web API is an example of control information that controls the image forming device 102.

The secure box 14 includes a protocol conversion function that enables control of an electronic device, such as an information processing device 101 or an image forming device 102, which is connected to the local network 100 from the information terminal 111. The protocol conversion according to the present embodiment converts the transport layer-level and the application layer-level protocol. For example, the transport layer-level and the application layer-level protocol conversion differs from a lower-layer protocol conversion executed by the gateway or the like.

For example, the secure box 14 converts a wss FAX transmission request received from the information terminal 111 into a web API FAX transmission command provided by the image forming device 102, and transmits the converted request to the image forming device 102. The secure box 14 converts an image such as a list of received documents (a received document list) output by the image forming device 102 or a received document into a format such as HTML (Hyper Text Markup Language) that can be displayed by the information terminal 111, and transmits the converted image to the information terminal 111.

As a result of the above-described process, the information terminal 111 can easily and securely communicate with an electronic device such as the image forming device 102 connected to the local network 100 without performing complicated work such as a network configuration change, and the like. Further, the information terminal 111 can utilize the protocol conversion function of the secure box 14 from the information terminal to provide services provided by various existing electronic devices, such as the image forming device 102, connected to the local network 100.

As described above, according to the present embodiment, in the communication system 1 that remotely accesses electronic devices connected to the local network 100 from the information terminal 111, various existing electronic devices can be used from the information terminal 111.

The system configuration of the communication system 1 illustrated in FIG. 1 is an example. For example, the information terminal 111 may be connected to, but not limited to, the remote network 110, but may be connected to the communication network 2 or to various networks that can be connected to the communication network 2. The relay server 13 may be included in the management server 10. Additionally, the communication system 1 may include a plurality of relay servers 13 or a plurality of secure boxes 14. Further, the communication network 2 may include a connection section by, for example, mobile communication or wireless communication such as a wireless LAN.

<Hardware Configuration>

The management server 10, the application service system 11, the service platform 12, the relay server 13, the secure box 14, the information processing device 101, the information terminal 111, and the administrator terminal 5 of FIG. 1 are implemented by one or more computers. Herein, a typical hardware configuration of a computer will be described.

Figure 2:
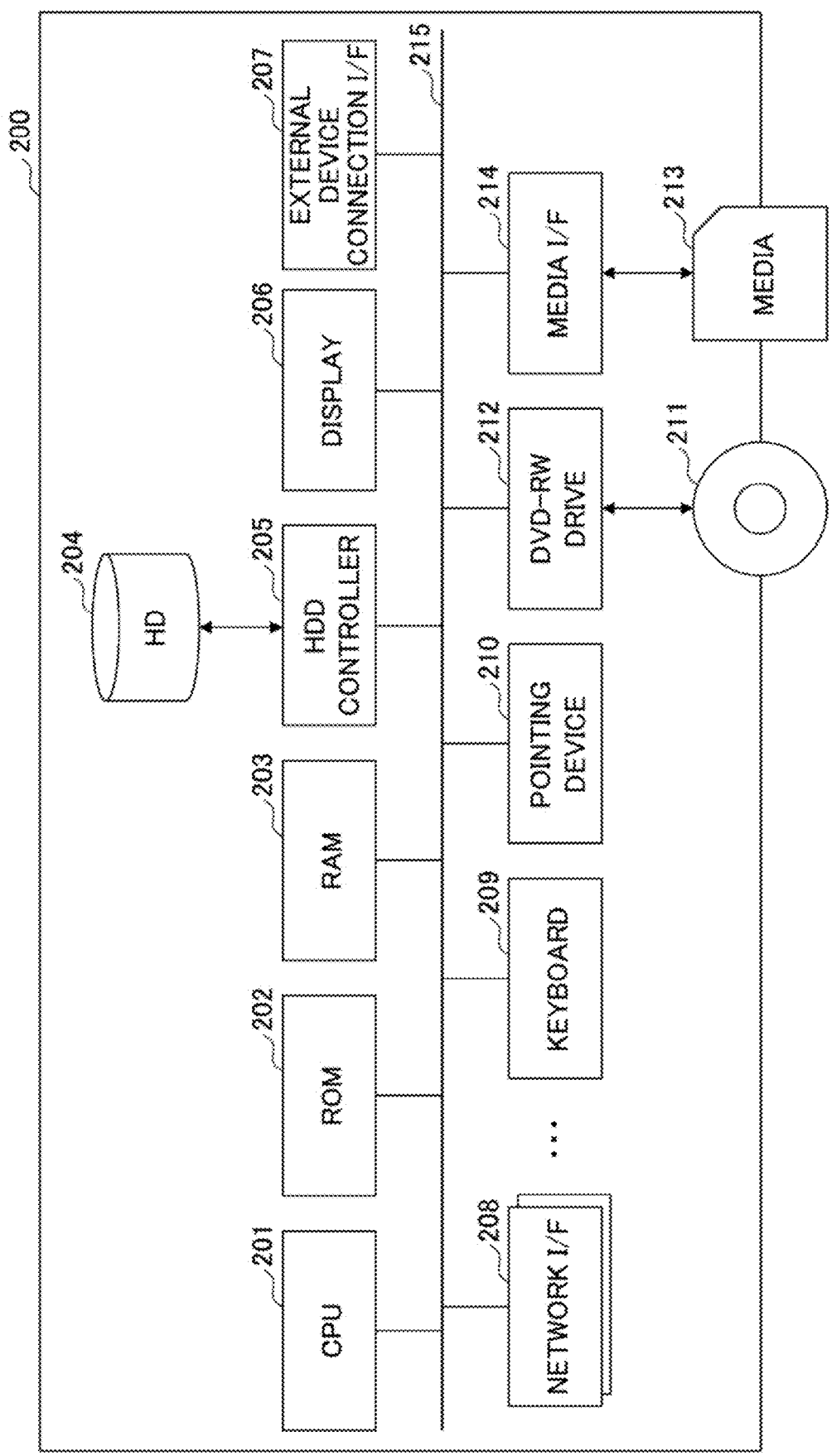
FIG. 2 is a diagram illustrating an example of a hardware configuration of a computer according to the first embodiment.

FIG. 2 is a diagram illustrating an example of a hardware configuration of a computer according to an embodiment. A computer 200 includes, for example, a CPU (Central Processing Unit) 201, a ROM (Read Only Memory) 202, a RAM (Random Access Memory) 203, an HD (Hard Disk) 204, an HDD (Hard Disk Drive) controller 205, a display 206, an external device connection I/F (Interface) 207, one or more network I/Fs 208, a keyboard 209, a pointing device 210, a DVD-RW (Digital Versatile Disk Rewritable) drive 212, a media I/F 214, and a bus line 215, as illustrated in FIG. 2. It should be noted that the hardware configuration of the computer 200 illustrated in FIG. 2 is an example, and the computer 200 need not include all of the above components.

Of these, the CPU 201 controls operation of the entire computer 200. The ROM 202 stores programs used to start the computer 200, such as, for example, IPL (Initial Program Loader). The RAM 203 is used, for example, as a work area of the CPU 201. The HD 204 stores, for example, programs such as an OS (operating system), an application, a device driver, and various data. The HDD controller 205 controls reading or writing of various data to the HD 204, for example, according to the control of the CPU 201.

The display 206 displays various information such as, for example, a cursor, menus, windows, characters, or images. The display 206 may be provided outside the computer 200. The external device connection I/F 207 is an interface such as a USB, RS-232C, or the like that connects various external devices such as an electronic device, a measuring device, an external storage device, or the like to the computer 200. One or more networks I/F 208 are interfaces for data communication using, for example, the communication network 2, the local network 100, or the remote network 110.

The keyboard 209 is a type of an input device with a plurality of keys for input of characters, numbers, various indications, and the like. The pointing device 210 is a type of an input device for selecting and executing various instructions, selecting a processing target, moving a cursor, and the like. The keyboard 209 and the pointing device 210 may be provided outside the computer 200.

The DVD-RW drive 212 controls reading or writing of various data to the DVD-RW 211 as an example of a removable recording medium. The DVD-RW 211 is not limited to the DVD-RW but may be a DVD-R or the like. The media I/F 214 controls reading or writing (storing) of data into a media 213, such as flash memory. The bus line 215 includes an address bus, a data bus, and various control signals for electrically connecting the above components.

<Software Configuration>

Next, an example of a software configuration of the application service system 11, the service platform 12, the relay server 13, and the secure box 14 will be described.

(Software Configuration of the Application Service System)

Figure 3:
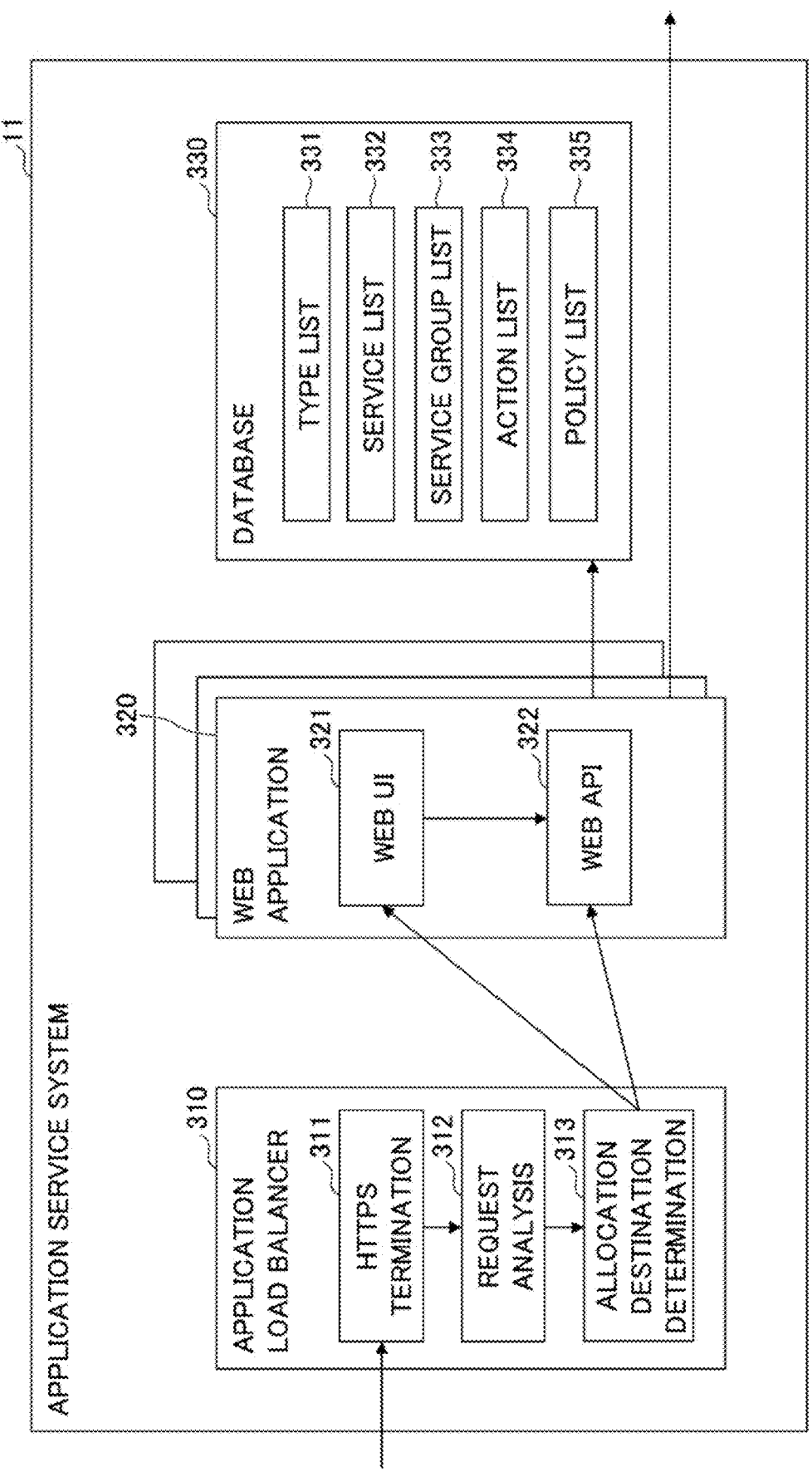
FIG. 3 is a diagram illustrating an example of a software configuration of an application service system according to the first embodiment.

FIG. 3 is a diagram illustrating an example of a software configuration of an application service system according to the first embodiment. The application service system 11 includes, for example, an application load balancer 310, one or more Web applications 320, and a database 330, as illustrated in FIG. 3.

The application load balancer 310 has functions such as, for example, https termination 311, request analysis 312, allocation destination determination 313, and the like. The https termination 311 is connected in HTTPS to another device or system for performing encryption and decryption processes, and data transmission and reception processes. The request analysis 312 decomposes the HTTP header of the received data. The destination determination 313 determines a data allocation destination received via the URL (Uniform Resource Locator) included in the disassembled HTTP header and other information.

The Web application 320 includes, for example, Web UI 321 and Web API 322. The Web UI 321 provides a web page for displaying, for example, an operation screen or a setting screen to the information terminal 111 connected to the application service system 11 or the like. The Web API 322 performs various operations (e.g., communication control, issuance of a session ID, updating of database 330, etc.) associated with operations that are received by the Web UI 321.

The web application 320 may have a redundant configuration according to a plurality of instances, or a single instance. FIG. 3 illustrates an example in which the application service system 11 is implemented by IaaS (Infrastructure as a Service), but the application service system 11 may be implemented by FaaS (Function as a Service).

The database 330 contains information such as, for example, a type list 331, a service list 332, a service group list 333, an action list 334, and a policy list 335, which will be described later.

(Software Configuration of the Service Platform)

Figure 4:
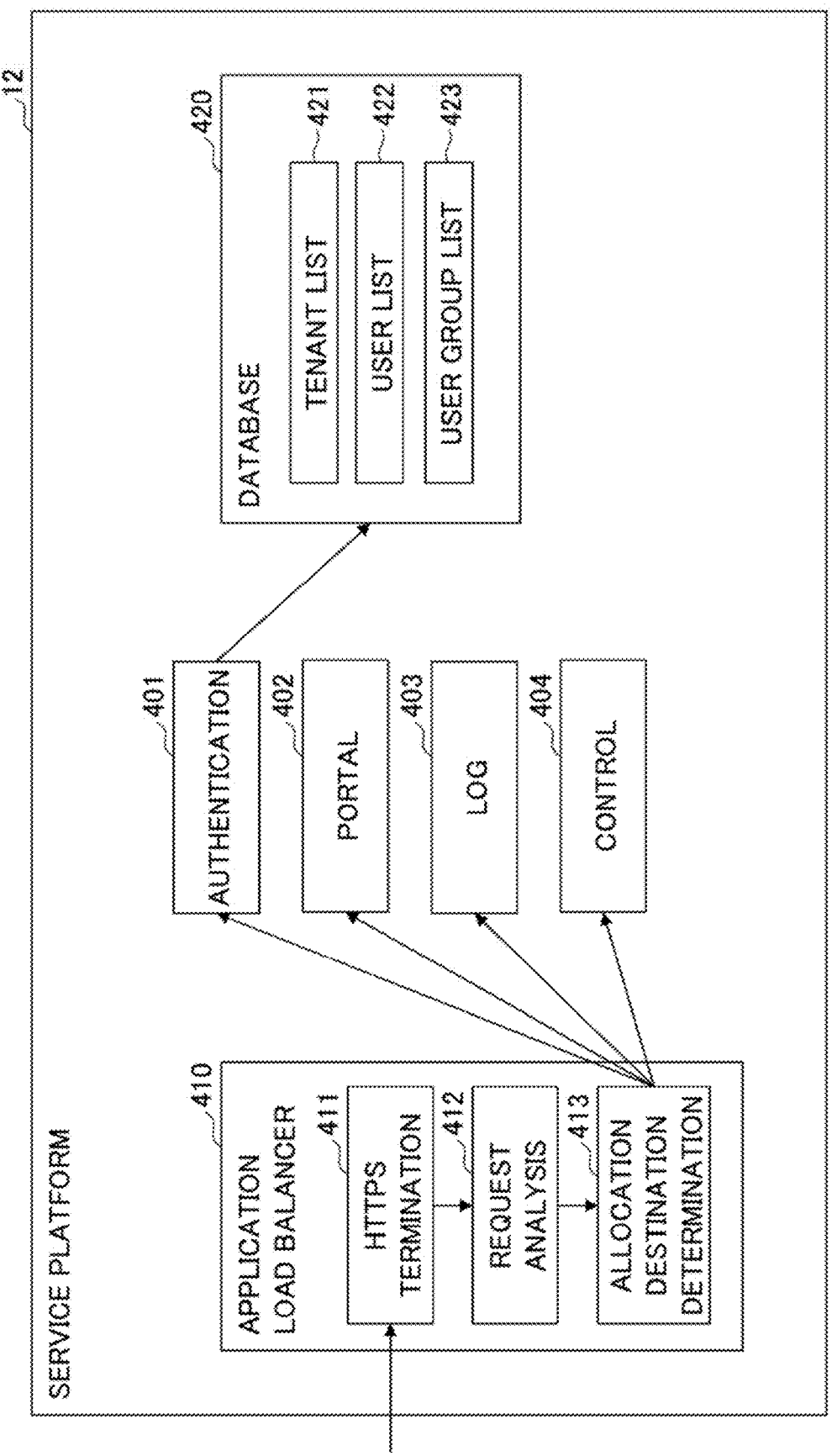
FIG. 4 is a diagram illustrating an example of a software configuration of a service platform according to the first embodiment.

FIG. 4 is a diagram illustrating an example of a software configuration of a service platform according to the first embodiment. The service platform 12 includes, for example, an application load balancer 410 and a database 420, and subsystems of authentication 401, portal 402, log 403, and control 404, as illustrated in FIG. 4.

Since the configuration of the application load balancer 410 may be the same as the application load balancer 310 described in the application service system 11, the description will not be repeated. The database 420 includes, for example, a tenant list 421, a user list 422, and a user group list 423, which will be described later.

The authentication 401 subsystem performs user authentication or authentication of a device (e.g., a secure box 14, etc.). The authentication 401 subsystem performs, for example, authentication by user name and password, authentication by digital certificate, multi-factor authentication, or the like. The portal 402 subsystem provides a portal site for utilizing the various services provided by the communication system 1. The log 403 subsystem, for example, manages predetermined log information such as an access log and a setting log in the communication system 1.

The control 404 subsystem, for example, constantly connects with the secure box 14, and transmits instructions of the management server 10 (for example, the connection instruction to the relay server 13) or setting information to the secure box 14. This constant connection may be used, for example, by MQTT over Websocket over HTTPS which establishes a connection from the secure box 14 to the control 404 subsystem. In this manner, the secure box 14 can connect with the management server 10 without changing the firewall settings of the local network 100.

(Software Configuration of the Relay Server)

Figure 5:
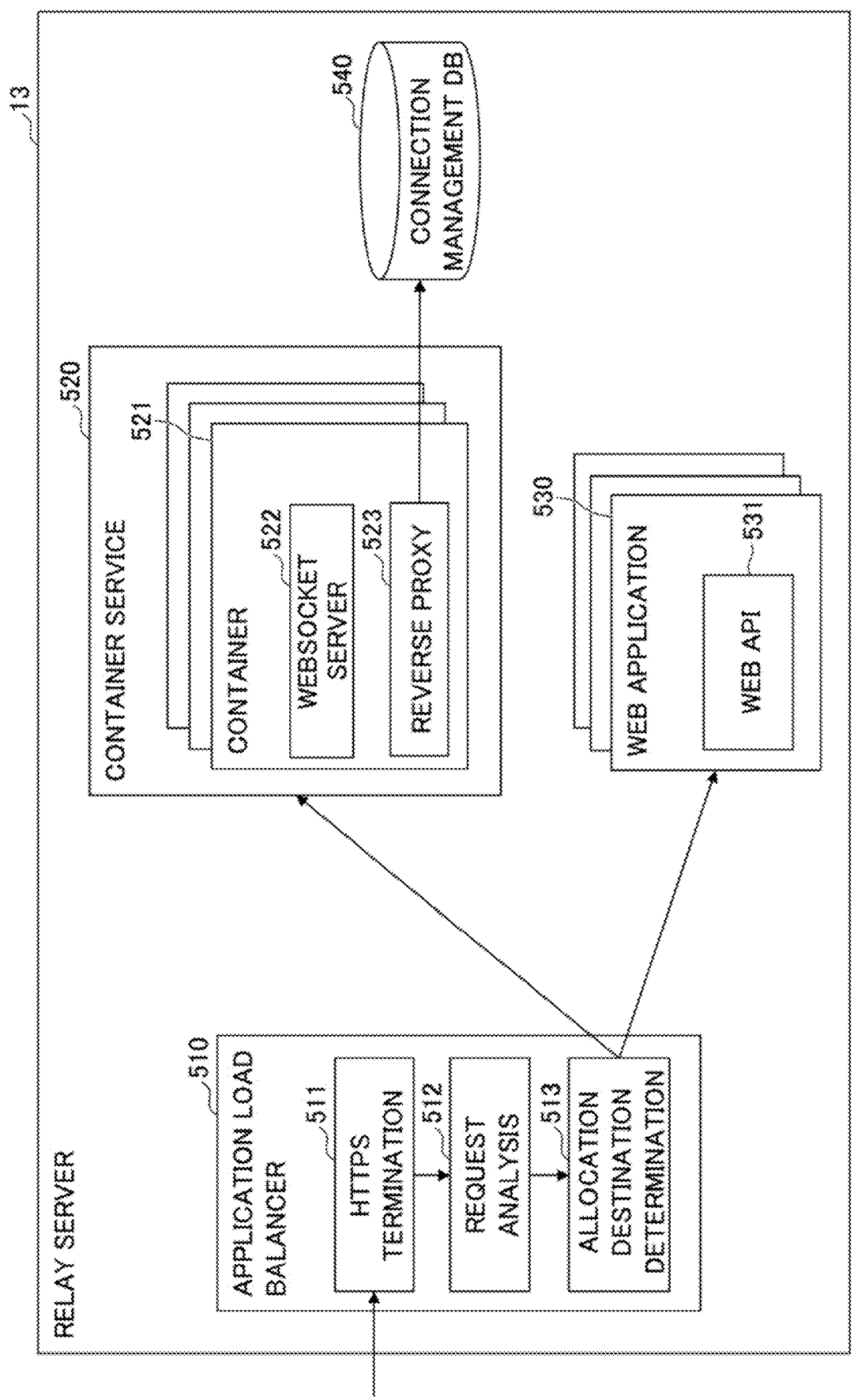
FIG. 5 is a diagram illustrating an example of a software configuration of a relay server according to the first embodiment.

FIG. 5 is a diagram illustrating an example of the software configuration of the relay server 13 according to the first embodiment. The relay server 13 includes, for example, an application load balancer 510, a container service 520, a Web application 530, and a connection management database (Database) 540, as illustrated in FIG. 5.

The configuration of the application load balancer 510 may be basically the same as the application load balancer 310 described in the application service system 11.

Preferably, the application load balancer 510 has a load balancing function that increases or decreases the number of containers 521 of the container service 520 or the throughput of the container 521, for example, depending on the load of the relay server 13.

The container service 520 includes one or more containers 521, each of which includes a WebSocket server 522 and a reverse proxy 523. Containers are used in container-type virtualization, one of the methods of computer virtualization. In container virtualization, a portion of the operating OS is separated and the software runs in a dedicated area that is separated from the others. This dedicated area is called a container.

The WebSocket server 522 performs a relay process for relaying the first communication 3 and the second communication 4 described in FIG. 1. The reverse proxy 523 determines the difference in requests by a URI (Uniform Resource Indicator) or the like, and allocates the requests to appropriate processes.

In the web application 530, when the relay server 13 only performs the relay process, the web application 530 is not required to be included in the relay server 13. However, depending on the system configuration, a portion of the web application 320 included in the application service system 11 may be disposed in the relay server 13 as the web application 530.

A connection management DB 540 stores, for example, a connection management list as illustrated in FIG. 13D. The connection management list includes a session ID of a session relayed by the container 521 stored in association with an IP address of the container 521.

(Secure Box Software Configuration)

FIG. 4 is a diagram illustrating an example of a software configuration of a secure box according to the first embodiment. The secure box 14 includes, for example, a communication controller 610, an application controller 620, a storage 630, and a system 600, as illustrated in FIG. 6.

Figure 6:
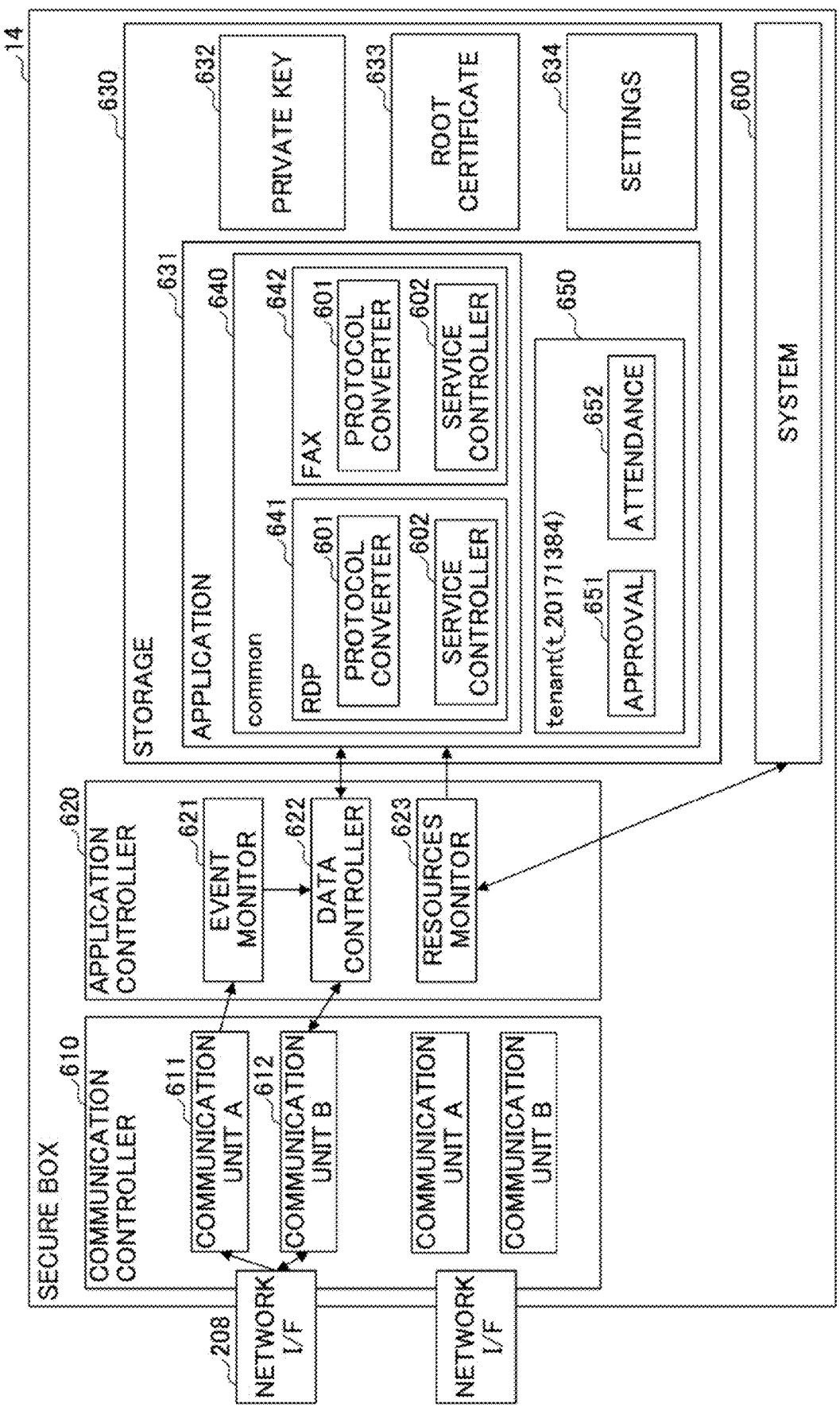
FIG. 6 is a diagram illustrating an example of a software configuration of a secure box according to a first embodiment.

As illustrated in FIG. 6, the communication controller 610 includes, for example, a communication unit A611 and a communication unit B612 for each of the network I/Fs 208, and controls communication with the outside. The communication unit A611 communicates with the management server 10 using, for example, an MQTT over Websocket over HTTPS. For example, the communication unit B612 performs the encrypted first communication 3 with the relay server 13 using the wss or the like.

The application controller 620 includes, for example, an event monitor 621, a data controller 622, and a resource monitor 623, and controls an application 631. The event monitor 621 monitors an event from the management server 10 and notifies the management server 10 of the event through the communication unit A611. The data controller 622 transmits and receives data from the relay server 13 through the communication unit B612. The resource monitor 623, for example, monitors the amount of resources of the application 631 and allocates an appropriate amount of resources, thereby implementing stable operation.

The storage 630 may include, for example, an application 631, a private key 632, a root certificate 633, and settings 634. The application 631 is an application program depending on the service. The application 631 includes, for example, an RDP 641 corresponding to a remote desktop service provided by the information processing device 101, a FAX 642 corresponding to a facsimile service provided by the image forming device 102, and the like.

The application 631 includes, for example, a tenant 650 that is a tenant-only application, in addition to (or instead of) a common 640 that is an application common to multiple tenants (per contract unit, group, etc.). The tenant 650 includes, by way of example, the windows of meeting 651, which is a windowing application available only to a given tenant, and the attendance and departure 652, which is an application for managing attendance and departure.

Each application includes functions of a protocol conversion 601 and a service control 602. The protocol conversion 601 included in the RDP 641 provides remote desktop control, for example, by converting or inverting the data structure in the RDP to a data format that is easy to process in a web browser and by compressing or decompressing the image. The service control 602 included in the RDP 641 performs, for example, power control of the information processing device 101. For example, the service control 602 included in the RDP 641 may execute a control for turning on the information processing device 101 by using the Wake on LAN function or the like of the information processing device 101, and may execute a control for turning off the power of the information processing device 101 as necessary.

The protocol conversion 601 included in the FAX 642 controls, for example, the acquisition of a FAX received document (hereinafter referred to as "FAX reception") or the transmission of a FAX document (hereinafter referred to as "FAX transmission") depending on the request received by the HTTPS. For example, the protocol conversion 601 controls a FAX reception, a FAX transmission, and the like using an SDK (Software Development Kit) provided by the image forming device 102. The service control 602 included in the FAX 642, for example, locks or unlocks the status of the image forming device 102 in order to stabilize processing such as facsimile reception and FAX transmission. Herein, the status of the image forming device 102 includes, for example, a power saving status of the image forming device 102, an offline state, or a display status of an operation portion of the image forming device 102. Accordingly, the service control 602 included in the FAX 642 prevents the processing from being interrupted, for example, when the image forming device 102 moves to another state.

The private key 632 is, for example, an encryption key used in communication with the management server 10. The root certificate 633 is, for example, a digital certificate used for communication with the management server 10. The settings 634 retain, for example, setting information of the secure box 14 according to the local network 100. The system 600 may be, for example, an OS or the like that controls the entire secure box 14.

Note that the software configurations of the devices illustrated in FIGS. 3 to 6 are examples and can be modified, applied, or integrated in various ways.

<Functional Configuration>

Next, the functional configuration of each device will be described.

(Functional Configuration of the Management Server)

Figure 7:
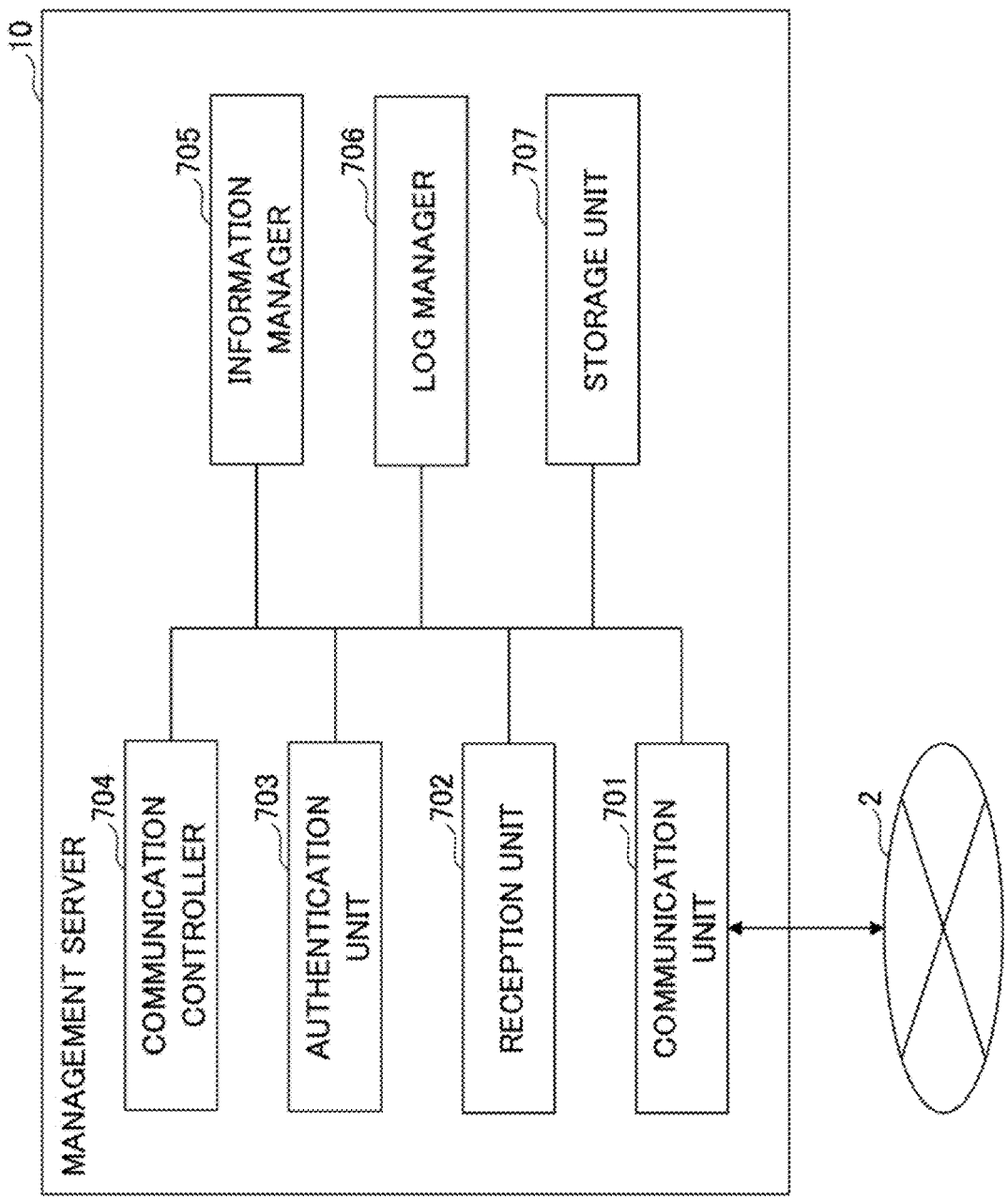
FIG. 7 is a diagram illustrating an example of a functional configuration of a management server according to the first embodiment.

FIG. 7 is a diagram illustrating an example of a functional configuration of a management server according to the first embodiment. The management server 10 is implemented, for example, by executing a predetermined program on the computer 200 to provide a communication unit 701, a reception unit 702, an authentication unit 703, a communication controller 704, an information manager 705, a log manager 706, and a storage unit 707. At least a portion of each of the above-described functional configurations may be implemented by hardware.

The communication unit 701 connects the management server 10 to the communication network 2 to communicate with other devices using, for example, the network I/F 208.

The reception unit 702 is implemented, for example, by the application service system 11 executed on the computer 200, and the portal 402, and receives request information, such as a connection request from the information terminal 111 or a setting request from the administrator terminal 5. In addition, the reception unit 702, for example, generates a session ID (an example of connection information) for connecting to the relay server 13 when a connection request addressed to the electronic device is received from the information terminal 111, and performs processing for notifying the information terminal 111.

The authentication unit 703 is implemented, for example, by the authentication 401 subsystem and the like executed on the computer 200 to perform authentication of a user using the information terminal 111, authentication of an administrator using the administrator terminal 5, or authentication of the secure box 14. The authentication unit 703 may perform authentication using, for example, an external authentication server.

For example, the communication controller 704 is implemented by a control 404 subsystem or the like executed on the computer 200. The communication controller 704 connects the secure box 14 to the relay server 13 by the encrypted first communication 3 in response to a connection request from the information terminal 111. For example, the communication controller 704 constantly connects to the secure box 14. When the reception unit 702 receives the connection request from the information terminal 111, the communication controller 704 notifies the secure box 14 of a session ID (an example of connection information), and requests the connection to the relay server 13.

The information manager 705 stores and manages various information managed by the communication system 1 in the storage unit 707. The information managed by the information manager 705 will be described later.

For example, the log manager 706 is implemented by the log 403 subsystem executed on the computer 200. When a predetermined event (event) occurs, the log manager 706 records the log information in a format corresponding to the event that has occurred.

The storage unit 707 is implemented, for example, by a storage device such as the HD 204 included in the computer 2 or the storage server, and stores information managed by the information manager 705 and various information of the log information managed by the log manager 706.

(Functional Configuration of Secure Box)

FIG. 8 is a diagram illustrating an example of a functional configuration of a secure box according to the first embodiment. Before describing the functional configuration of the secure box 14, an example of a local network 100 will be outlined. In the example of FIG. 8, the local network 100 includes a router 811 and a first local network 810 connected to the communication network 2 through a firewall 812. The local network 100 may also include a second local network 820 that connects to the first local network 810 through the secure box 14.

In the example of FIG. 8, the secure box 14, the information processing device 101 that provides a remote desktop service, and the image forming device 102 that provides an image forming service including a facsimile service are connected to the first local network 810. The first local network 810 is not limited to the information processing device 101 and the image forming device 102, and various electronic devices 813 may be connected. The second local network 820 is connected to, for example, an approval server 821 which provides a tenant-dedicated approval service, or an attendance server 822 which provides a tenant-dedicated attendance management service.

Next, a functional configuration of a secure box 14 will be described. The secure box 14 is an example of a communication control device having a converter 802.

The secure box 14 is implemented, for example, by executing a predetermined program on the computer 200, to provide a first communication unit 801, one or more converters 802, one or more device controllers 803, a second encrypted communication unit 804, a second communication unit 805, a setting information manager 806, a resource manager 807, and a storage unit 808. At least a portion of each of the above-described functional configurations may be implemented by hardware.

The first communication unit 801 connects the secure box 14 to the first local network 810, and communicates with other devices using, for example, the network I/F 208.

One or more converters 802 may be implemented, for example, by applications executed on the computer 200, such as protocol conversion 601 of RDP 641, protocol conversion 601 of FAX 642, and the like. Accordingly, the secure box 14 provides, for example, a converter (RDP) 802 corresponding to a remote desktop service provided by the information processing device 101, a converter (FAX) 802 corresponding to a facsimile service provided by the image forming device 102, and the like.

For example, the converter (RDP) 802 corresponding to the remote desktop service converts the first protocol used by the information terminal 111 for remote access into a remote access protocol (a second protocol) for utilizing the remote desktop service. The converter (FAX) 802 corresponding to the facsimile service converts the first protocol used by the information terminal 111 for the remote access into a Web API or the like for utilizing the facsimile service. As described above, the converter 802 converts a first protocol used by the information terminal 111 for remote access into a protocol for utilizing predetermined functions provided by various electronic devices. The converter 802 converts the second protocol into the first protocol.

One or more device controllers 803 are implemented, for example, by an application executed by computer 200, such as service control 602 of RDP 641 and service control 602 of FAX 642. Accordingly, the secure box 14 provides, for example, a device controller (RDP) 803 corresponding to a remote desktop service provided by the information processing device 101, a device controller (FAX) 803 corresponding to a facsimile service provided by the image forming device 102, and the like.

For example, the device controller (RDP) 803 corresponding to the remote desktop service performs power control for turning the power of the information processing device 101 on or off based on the data protocol converted by the converter 802, and the like. The device controller (FAX) 803 corresponding to the facsimile service performs control for locking or unlocking the status of the image forming device 102 based on the data protocol converted by the converter 802.

The second encrypted communication unit 804 is implemented, for example, by a data controller 622 executed on the computer 200. The secure box 14 or the converter 802 is connected to the relay server 13 by the encrypted first communication 3 according to the control from the communication controller 704.

The second communication unit 805 is implemented, for example, by a communication controller 610 executed on the computer 200. The second communication unit 805 connects the second local network 820 to the secure box 14 using the network I/F 208, which is one of a plurality of communication interfaces included in the secure box 14. Note that a plurality of communication interfaces of the secure box 14 may include an external device connection I/F 207 (for example, a USB interface or a serial interface such as RS-232C).

For example, the setting information manager 806 is implemented by a program executed on the computer 200, and stores and manages the setting information of the secure box 14 in the storage unit 808.

The resource manager may be implemented, for example, by the resource monitor 623 executed on the computer 200, and allocates an appropriate amount of resources to each application such as, for example, RDP 641 and FAX 642.

The storage unit 808 implemented, for example, by a program executed on the computer 200, and a storage device, such as the HD 204, and stores various information, such as setting information of the secure box 14.

(Functional Configuration of Relay Server)

The relay server 13 is implemented, for example, by executing a predetermined program on the computer 200 included in the relay server 13 to provide a communication unit 711, one or more connection managers 712, one or more relay units 713, a load controller 714, and a storage unit 715. At least a portion of each of the above-described functional configurations may be implemented by hardware.

The communication unit 711 connects the relay server 13 to the communication network 2 by, for example, using the network I/F 208, and communicates with other devices.

For example, the connection manager 712 is implemented by a program such as the reverse proxy 523 executed on the computer 200, and manages the connection between the first communication 3 and the second communication 4, which are relayed by the relay unit 713. The connection manager 712 stores and manages the session ID identifying the session that is relayed by the relay unit 713 in the connection management list illustrated in FIG. 13D, in association with the IP address of the relay unit 713 (or the container 521 by which the relay unit 713 is implemented), and the like.

For example, the relay unit 713 is implemented by a program such as the WebSocket server 522 executed on the computer 200, and relays communication between the information terminal 111 and the local network (second network) 100. For example, the relay unit 713 relays between the first communication 3 and the second communication 4 by establishing a tunnel between the first communication 3 and the second communication 4 using the same session ID, where the first communication 3 is established between the relay unit 713 and the secure box 14, and the second communication 4 is established between the relay unit 713 and the information terminal 111.

The load controller 714 performs a load control process of increasing or decreasing the number of the relay units 713 or the throughput of the relay units 713 in accordance with the load of the relay unit 713.

The storage unit 715 is implemented, for example, by a program executed on the computer 200 and the HD 204, and stores various information (or data) including a connection management list as illustrated in FIG. 13D.

(Functional Configuration of Information Terminals)

The information terminal 111 is implemented, for example, by executing a predetermined program on the computer 200 included in the information terminal 111 to provide a communication unit 721, a display controller 722, an operation reception unit 723, a first encrypted communication unit 724, and a storage unit 725. At least a portion of each of the above-described functional configurations may be implemented by hardware.

The communication unit 721 connects the information terminal 111 to the communication network 2 by, for example, using the network I/F 208 and communicates with other devices.

The display controller 722 is implemented, for example, by a web browser or the like executed on the computer 200, and displays a display screen (a Web UI, an HTML screen, or the like) transmitted from the management server 10 or the secure box 14 or the like. The display controller 722 also reproduces audio when the display content includes the audio data.

The operation reception unit 723 is implemented, for example, by a web browser executed on the computer 200, and receives an operation by a user (or an administrator) with respect to the display screen displayed by the display controller 722.

The first encrypted communication unit 724 is implemented, for example, by a web browser executed on the computer 200 or the OS, and connects to the relay server 13 through the encrypted second communication 4 using the session ID (connection information) notified by the management server 10.

The storage unit 725 is implemented, for example, by a program executed on the computer 200 and a storage device such as the HD 204, and stores various information or data.

<Information Managed by Communication System>

FIGS. 10A to 13D are diagrams illustrating examples of information managed by the communication system according to the first embodiment. FIG. 10A is a diagram illustrating an example of a service URL list managed by the communication system 1. Each device included in the communication system 1 may store URL information for connecting to an access destination device, for example, in a service URL list 1001 illustrated in FIG. 10A.

FIG. 10B is a diagram illustrating an example of a tenant list 421 managed by communication system 1. The management server 10 stores and manages the tenant list 421, for example, illustrated in FIG. 10B, in the storage unit 707. For example, a correspondence relationship between a tenant ID and a tenant name is stored in the tenant list 421. The tenant ID is identification information that identifies a tenant as per contract unit of, for example, a company, an organization, a group, or the like. The tenant name is information indicating the name and the like of the tenant. The tenant list 421 may store three or more tenant IDs. The tenant list 421 may also be hierarchical in structure.

FIG. 10C is a diagram illustrating an example of a user list 422 managed by the communication system 1. The management server 10 stores and manages the user list 422, for example, illustrated in FIG. 10C, in the storage unit 707. In the user list 422, for example, a correspondence relationship between the tenant ID, a user ID, a user name, a display name, and a password (Hash) is stored. The user ID is identification information that identifies a user registered in the communication system 1. The user name is information indicating the name of the user. The display name is the name of the user's display. A password (Hash) is an authentication information to authenticate the user. Note that the authentication information for authenticating a user may be, for example, authentication information other than the password of the digital certificate or the like.

FIG. 11A is a diagram illustrating an example of a user group list 423 managed by the communication system 1. For example, the management server 10 stores the user group list 423 in the storage unit 707 as illustrated in FIG. 11A. In the user group list 423, for example, a correspondence relationship between the tenant ID, a user group ID, a user group name, and a member list is stored. The user group ID is identification information that identifies the user group by which a user is grouped. The user group name is information indicating the name of the user group. The user ID of at least one user belonging to the user group is stored in the member list.

FIG. 11B is a diagram illustrating an example of a type list 331 managed by the communication system 1. The management server 10 stores the type list 331, for example, illustrated in FIG. 11B, in the storage unit 707. In the type list 331, for example, a correspondence relationship between the tenant ID, a type ID, a type name, and a conversion program is stored. The type ID is identification information that identifies the type of the conversion program. The type name is information indicating the name of the type of the conversion program.

The conversion program supports applications such as, for example, RDP 641, FAX 642, approval 651, or attendance 652 illustrated in FIG. 6. The conversion program includes, for example, a common type conversion program (common 640) common to tenants and a tenant-dedicated type conversion program (tenant 650) dedicated to each of the tenants. The conversion program includes, for example, information such as a predetermined event (event) for outputting the log information in addition to the contents of the conversion process.

The common type conversion program may be, for example, a general-purpose conversion program registered in advance by a provider or the like that provides a communication system 1. It is assumed that the tenant type conversion program is, for example, a conversion program necessary for each tenant registered by the administrator, a provider, or the like, but each tenant may provide the conversion program.

FIG. 12A is a diagram illustrating an example of a service list 332 managed by the communication system 1. For example, the management server 10 stores the service list 332 as illustrated in FIG. 12A in the storage unit 707. In the service list 332, for example, a corresponding relationship between the tenant ID, the service ID, the service name, the type, and a destination is stored. The service ID is identification information that identifies a service provided by the communication system 1. The service name is information indicating the name of the service. The type is information indicating the type of service. The destination is information indicating a destination of an electronic device that provides the service.

The destination may be an IP address or FQDN (Fully Qualified Domain Name). The destination may be, in the case of an electronic device that cannot perform IP communication, for example, a MAC address of a network interface, a COM port of RS-232C, or a USB interface.

FIG. 12B is a diagram illustrating an example of a service group list 333 managed by the communication system 1. For example, the management server 10 stores the service group list 333 in the storage unit 707 as illustrated in FIG. 12B. In the service group list 333, for example, a correspondence relationship between the tenant ID, the service group ID, the service group name, and the member list is stored.

The service group ID is identification information that identifies a service group that groups the service. The service group name is information indicating the name of the service group. The service ID of the service included in the service group is stored in the service list.

FIG. 12C is a diagram illustrating an example of an action list 334 managed by communication system 1. For example, the management server 10 stores the action list 334 as illustrated in FIG. 12C in the storage unit 707. In the action list 334, for example, a correspondence relationship between the tenant ID, an action ID, an action name, and an action is stored. The action ID is the identification information that identifies the action. The action name is information indicating the name of the action.

Actions include actions common to tenants (common) and tenant-dedicated actions dedicated to each tenant (tenant). In addition, actions are defined to include actions such as permitting, denying, or multi-factor authentication. Log information can also be retained in the action.

FIG. 13A is a diagram illustrating an example of a policy list 335 managed by communication system 1. For example, the management server 10 stores the policy list 335 in the storage unit 707 as illustrated in FIG. 13A. In the policy list 335, a correspondence relationship between the tenant ID, a policy ID, a policy name, a priority, a user, a service, and an action is stored. The policy ID is identification information that identifies the policy. The policy name is information that indicates the name of the policy.

The priority is information indicating a priority of the policy. The user ID corresponding to each policy or the user group ID of the user group is stored with respect to the user. The service ID corresponding to each policy or the service group ID of the service group is stored with respect to the service. The action corresponding to each policy is stored with respect to the action.

For example, the management server 10 performs an action when the accessed "user or user group" matches the "service or service group", based on the policy list 335. Since each of these policies may match a plurality of "users or user groups" or "services or service groups", the management server 10 can set the priority and execute the action when the priority is high.

Herein, the policy is designed to execute the action according to the set precedence, but this design is an example and not limited to this example. For example, the management server 10 may take a technique such as a long-guest match to execute an action in the case of a more detailed setting, or a technique to check, following execution of an action, whether an action matches the next policy, and then execute the action of the matching policy.

FIG. 13B is a diagram illustrating an example of a secure box list 1301 managed by the communication system 1. For example, the management server 10 stores the secure box list 1301 as illustrated in FIG. 13B in the storage unit 707. In the secure box list 1301, for example, a correspondence relationship between the tenant ID, a device ID, a UUID, a device name, and automatic updating is stored.

The device ID is identification information identifying the secure box 14. The UUID (Universally Unique Identifier) is identification information for uniquely identifying some object in software. The device name is information indicating the name of the secure box 14 or the like. The automatic updating is, for example, setting information for automatic updating such as a program or setting information of the secure box 14.

FIG. 13C is a diagram illustrating an example of a session ID list 1302 managed by the communication system 1. For example, the management server 10 stores the session ID list 1302 in the storage unit 707 as illustrated in FIG. 13C. When issuing the session ID, the management server 10 generates a unique session ID using, for example, the tenant ID, the user ID, and the service ID. In this case, as illustrated in FIG. 13C, the management server 10 stores the session ID in association with the tenant ID, the user ID, the service ID, and a creation time in the session ID list 1302.

The session ID may be a hashed session ID as follows.

(HASH session ID)=Hash((session ID),(Connection destination user ID),(Connection destination password),(creation time)).

By hashing the session ID in this manner, leakage of connection information can be prevented.

FIG. 13D is a diagram illustrating an example of a connection management list 1303 stored by the relay server 13 in the connection management DB 540. As described above, the connection management list 1303 stores a correspondence relationship between the session ID of the session relayed by the relay unit 713 and the IP address of the container corresponding to the relay unit 713.

Note that the information pieces illustrated in FIGS. 10A to 13D are examples of the information managed by the communication system 1. The communication system 1 does not necessarily need to manage all of the information pieces illustrated in FIGS. 10A to 13D, but may only manage the necessary information. The information pieces illustrated in FIGS. 10A to 13D can be set by, for example, the administrator using the administrator terminal 5 or the like.

<Flowchart>

Next, a flowchart of a process of a communication control method according to the first embodiment will be described.

(Start Process of Secure Box)

Figure 14:
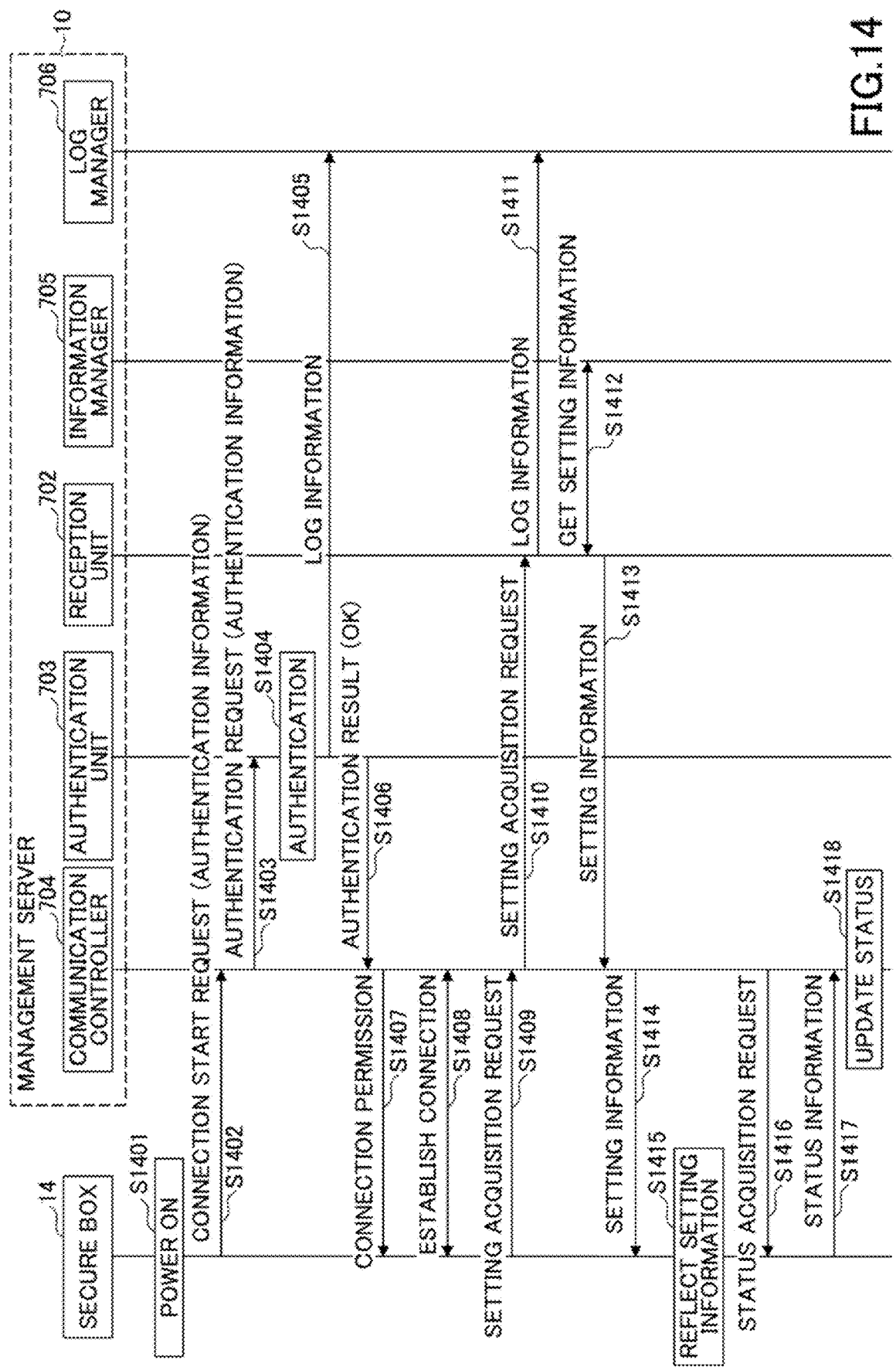
FIG. 14 is a sequence diagram illustrating an example of a process at a start of a secure box according to the first embodiment.

FIG. 14 is a sequence diagram illustrating an example of a process when a secure box is started in accordance with the first embodiment. This process illustrates an example of a process performed by the communication system 1 when the power of the secure box 14 registered in the communication system 1 is turned on in the local network 100.

In step S1401, when the power of the secure box 14 is turned on from off, the communication system 1 performs processes from step S1402 onward.

In step S1402, the first communication unit 801 of the secure box 14 transmits a connection start request requesting a connection with the management server 10 to the management server 10. The connection start request includes, for example, authentication information of the secure box 14.

In step S1403, when the communication controller 704 of the management server 10 receives the connection start request from the secure box, the communication controller 704 requests the authentication unit 703 to authenticate the authentication information included in the connection start request.

In step S1404, the authentication unit 703 of the management server 10 authenticates the authentication information of the secure box 14. Herein, since the secure box 14 is already registered in the communication system 1, the following description will be given on the assumption that the authentication is successful (the authentication result is OK).

In step S1405, the authentication unit 703 of the management server 10 notifies the log manager 706 of log information including the authentication result. Accordingly, the log manager 706 records (stores) the log information to the storage unit 707.

In step S1406, the authentication unit 703 of the management server 10 notifies the communication controller 704 of the authentication result (OK) indicating that authentication has been successful.

In step S1407, the communication controller 704 of the management server 10 notifies the secure box 14 to permit connection, and in step S1408, communication (for example, constant connection by MQTT) is established between the secure box 14 and the management server 10.

In step S1409, the setting information manager 806 of the secure box 14 transmits a setting acquisition request requesting to acquire the setting information to the management server 10 through the first communication unit 801.

In step S1410, the communication controller 704 of the management server 10 notifies the reception unit 702 of the setting acquisition request received from the secure box 14.

In step S1411, the reception unit 702 of the management server 10 notifies the log manager 706 of log information representing setting information acquisition by the secure box 14.

In step S1412, the reception unit 702 of the management server 10 acquires the setting information of the secure box 14 from, for example, the secure box list 1301 managed by the information manager 705.

In steps S1413 and S1414, the reception unit 702 notifies the secure box 14 of the acquired setting information through the communication controller 704.

In step S1415, the setting information manager 806 of the secure box 14 reflects the setting information notified from the management server 10 in the setting information of the secure box 14.

In steps S1416 and S1417, the communication controller 704 of the management server 10 acquires status information representing a status of the secure box 14 from the secure box 14 and updates the status of the secure box 14 managed by the communication controller 704.

(Login Process of Information Terminal)

Figure 15:
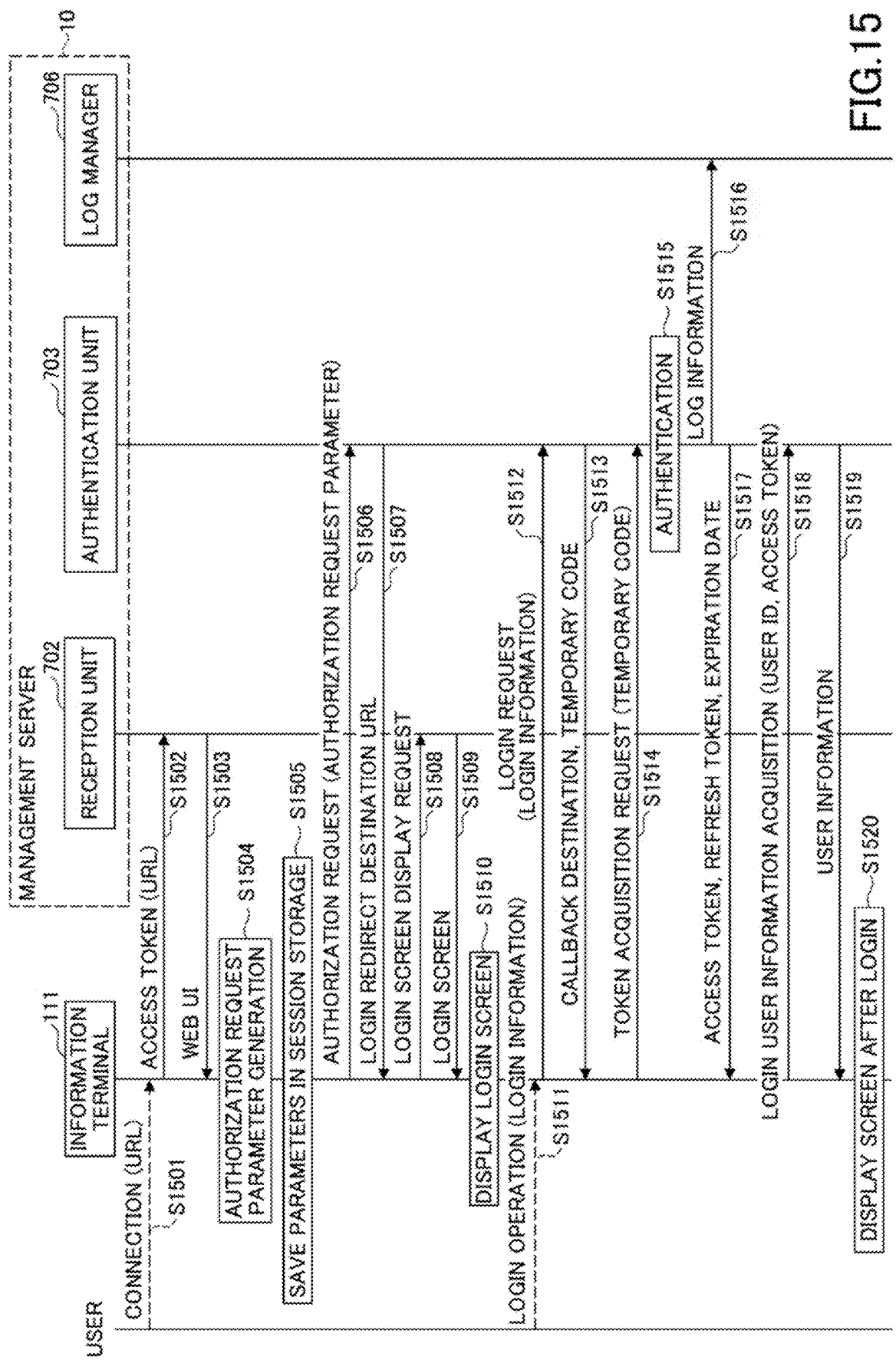
FIG. 15 is a sequence diagram illustrating an example of a login process of an information terminal according to the first embodiment.

FIG. 15 is a sequence diagram illustrating an example of a login process of the information terminal according to the first embodiment. This process illustrates an example of a process in which a user registered in the communication system 1 logs into the management server 10 using the information terminal 111.

In step S1501, the user performs a connection operation to connect to the reception unit 702 of the management server 10 by using a web browser (or an application having a web browser function) of the information terminal 111.

In steps S1502 and S1503, when the operation reception unit 723 of the information terminal 111 receives the connection operation performed by the user, the operation reception unit 723 accesses a designated URL and acquires a Web UI from the reception unit 702 of the management server 10.

In steps S1504 and S1505, the display controller 722 of the information terminal 111 generates an authorization request parameter, and stores the generated authorization request parameter in the session storage. In step S1506, the display controller 722 of the information terminal 111 transmits the authorization request including the generated authorization request parameter to the authentication unit 703 of the management server 10.

In step S1507, the authentication unit 703 of the management server 10 notifies the information terminal 111 of a URL of a login redirection destination in response to the authorization request from the information terminal 111.

In step S1508, the display controller 722 of the information terminal 111 requests the reception unit 702 of the management server 10 to display a login screen using the URL of the redirection destination notified from the management server 10.

In step S1509, the reception unit 702 of the management server 10 transmits the login screen to the information terminal 111. Accordingly, in step S1510, the display controller 722 of the information terminal 111 displays the login screen.

In step S1511, when the user performs a login operation of inputting the login information to the login screen, the processes from step S1512 onward are performed.

In step S1512, when the operation reception unit 723 of the information terminal 111 receives the login operation performed by the user, the operation reception unit 723 transmits the login request including the input login information to the authentication unit 703 of the management server 10.

In step S1513, when the login request is received from the information terminal 111, the authentication unit 703 of the management server 10 notifies the information terminal 111 acting as the request source of the callback destination and a temporary code.

In step S1514, the display controller 722 of the information terminal 111 transmits a token acquisition request including the temporary code notified from the management server 10 to the authentication unit 703 of the management server 10.

In step S1515, the authentication unit 703 of the management server 10 performs user authentication in response to the token acquisition request received from the information terminal 111. Herein, as described above, since the user is a user registered in the communication system 1, authentication is successful (authentication results are OK). In step S1516, the authentication unit 703 notifies the log manager 706 of the log information representing the authentication result.

In step S1517, the authentication unit 703 of the management server 10 notifies the information terminal 111 of an access token, a refresh token, an expiration date, and the like.

In steps S1518 to S1520, the display controller 722 of the information terminal 111 acquires user information from the reception unit 702 of the management server using the user ID of the user and the notified access token, and displays the screen after login using the acquired user information.

The login process illustrated in FIG. 15 is an example, and the communication system 1 may authenticate the user by other procedures, and authorize (permit) the login.

(Session Start Process and End Process)

FIGS. 16 and 17 are sequence diagrams illustrating examples of a session start process and a session end process according to the first embodiment. For example, as illustrated in FIG. 8, a process of starting a session in which communication is performed between the secure box 14 installed in the local network 100 and the information terminal 111 through the relay server 13, and a process of ending the session are illustrated. Note that at the start of the process illustrated in FIG. 16, it is assumed that the information terminal 111 used by the user has already been logged into the management server 10 through the login process of the information terminal described in FIG. 15.

In step S1601, when the user performs a display operation of displaying a portal screen with respect to the information terminal 111, the communication system 1 performs processes in step S1602 onward.

In step S1602, when the operation reception unit 723 of the information terminal 111 receives the display operation of displaying the portal screen performed by the user, the operation reception unit 723 requests the reception unit 702 of the management server 10 to display the portal screen.

In step S1603, the reception unit 702 of the management server 10 transmits the portal screen to the information terminal 111 in response to a request from the information terminal 111. Accordingly, in step S1604, the display controller 722 of the information terminal 111 displays the portal screen 1810, for example, illustrated in FIG. 18A.

FIG. 18A is a diagram illustrating an example of a portal screen 1810 displayed by the information terminal 111. In the example of FIG. 18A, the portal screen 1810 displays a plurality of icons 1811 for selecting a plurality of services or functions provided by the communication system 1. The user can select a remote desktop service provided by the information processing device 101 by selecting a "○○ Department Shared PC" icon 1812 on the portal screen 1810. The user can select the facsimile service provided by the image forming device 102 by selecting the "○○ Department FAX" icon 1812 on the portal screen 1810.

When the user selects a service from the portal screen 1810 in step S1605, the communication system 1 performs processes from step S1606 onward.

In step S1606, when the operation reception unit 723 of the information terminal 111 receives a selection operation of the service performed by the user, the operation reception unit 723 requests the reception unit 702 of the management server 10 to provide the selected service.

In step S1607, the reception unit 702 of the management server 10 transmits a login screen corresponding to the requested service to the information terminal 111 in response to a request from the information terminal 111. Accordingly, in step S1608, the display controller 722 of the information terminal 111 displays the login screen 1820, for example, illustrated in FIG. 18B.

FIG. 18B is a diagram illustrating an example of a login screen 1820 provided by the management server 10. In the example of FIG. 18B, respective entry fields of a user name, a password, and a domain are displayed on the login screen 1820 as examples of the entry field 1821 of the login information.

When the user inputs login information to the login screen 1820 in step S1609, the communication system 1 performs processes from step S1610 onward.

In step S1610, when the operation reception unit 723 of the information terminal 111 receives the login information input by the user, the operation reception unit 723 transmits the received login information (for example, a user name, a password, and a domain) to the reception unit 702 of the management server 10.

In step S1611, when the login information is received from the information terminal 111, the reception unit 702 of the management server 10 generates a session ID and notifies the communication controller 704 of a connection request to the relay server 13 including the generated session ID.

In step S1612, the communication controller 704 of the management server 10 transmits the connection request to the relay server 13 including the session ID to the secure box 14.

In step S1613, the second encrypted communication unit 804 of the secure box 14 transmits the connection request including the session ID notified from the management server 10 to the relay server 13 through the first communication unit 801.

In step S1614, the second encrypted communication unit 804 of the secure box 14 establishes a session (encrypted first communication 3) with the relay server 13.

In step S1615, the second encrypted communication unit 804 of the secure box 14 notifies the communication controller 704 of the management server 10 of connection notification representing the connection with the relay server 13. In step S1616, the communication controller 704 notifies the reception unit 702 of the connection notification received from the secure box 14.

Following the above-described process, in step S1617 of FIG. 17, the reception unit 702 of the management server 10 transmits the session ID transmitted to the secure box 14 to the information terminal 111.

In step S1618, the first encrypted communication unit 724 of the information terminal 111 transmits a connection request including the session ID notified from the management server 10 to the relay server 13 through the communication unit 721.

In step S1619, the first encrypted communication unit 724 of the information terminal 111 establishes a session (the encrypted second communication 4) with the relay server 13. Accordingly, in step S1620, the information terminal 111 and the secure box 14 participate in the same session provided by the relay server 13, and can transmit and receive data to and from each other in encrypted communication (e.g., wss).

For example, in step S1701 of FIG. 17, when the user of the information terminal 111 logs out from the service, the communication system 1 executes a session end process as illustrated in steps S1702 to S1705.

In step S1702, the first encrypted communication unit 724 of the information terminal 111 requests the relay server 13 to disconnect the session.

In steps S1703 and S1704, the connection manager 712 of the relay server 13 disconnects the session (the first communication 3) from the secure box 14. In step S1705, the connection manager 712 of the relay server 13 disconnects the session (the second communication 4) with the information terminal 111.

(Relay Server Process 1)

Figure 19:
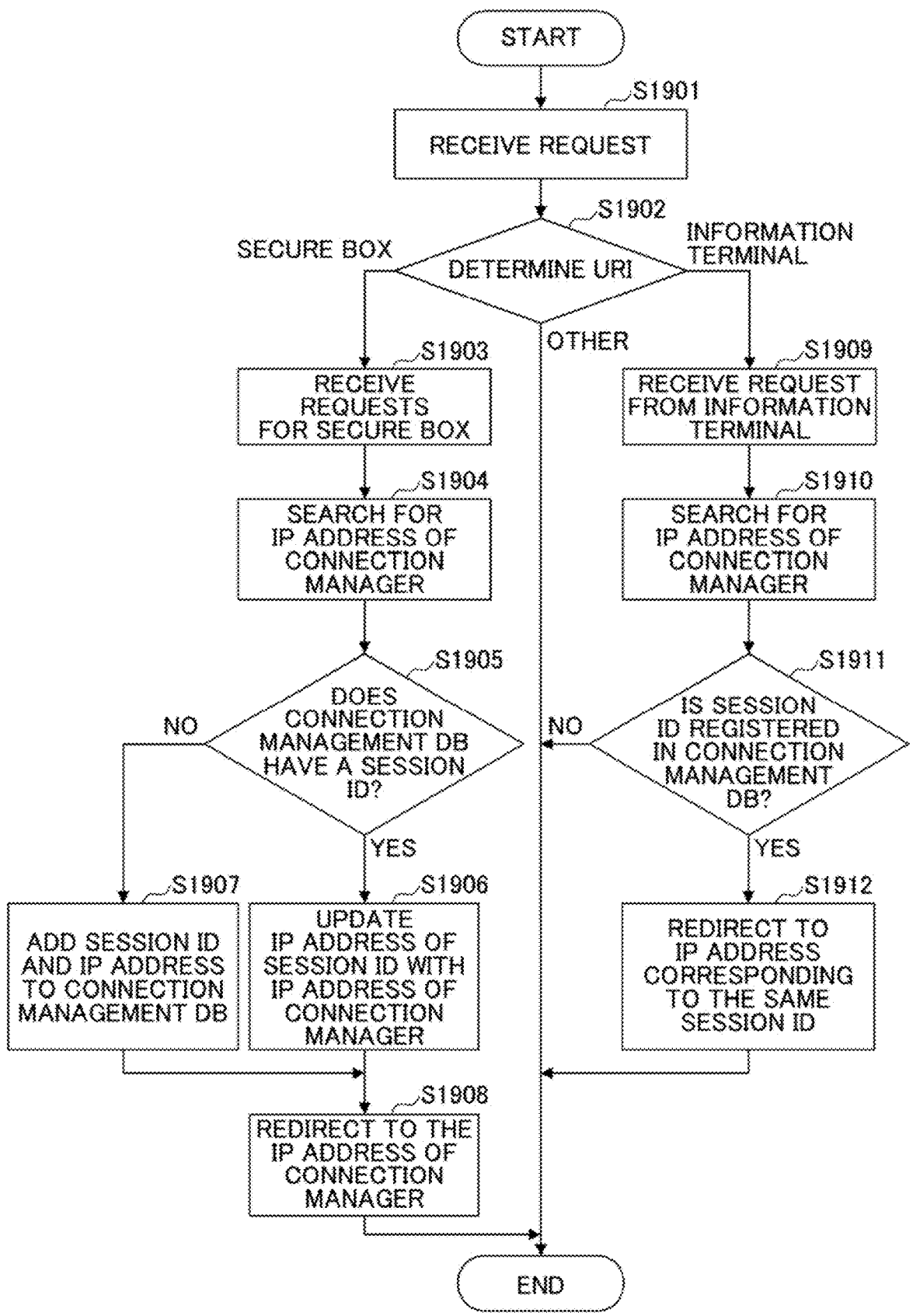
FIG. 19 is a flowchart (1) illustrating an example of a process of the relay server according to the first embodiment.

FIG. 19 is a flowchart (1) illustrating an example of a process of the relay server according to the first embodiment. For example, step S1613 of FIG. 16 or step S1618 of FIG. 17 illustrates an example of a process executed by the connection manager 712 of the relay server 13 when the relay server 13 receives a connection request including the session ID. Herein, it is assumed that the connection manager 712 of the relay server 13 is implemented by the reverse proxy 523 of the container 521 illustrated in FIG. 5.

In step S1901, when the communication unit 711 of the relay server 13 receives a request, the connection manager 712 performs processes from step S1902 onward.

In step S1902, the connection manager 712 determines whether the transmission source of the request is the secure box 14, the information terminal 111, or the like by determining the URI of the request received by the communication unit 711.

When the transmission source of the request is the secure box 14, the connection manager 712 moves the process to step S1903. Meanwhile, when the transmission source of the request is the information terminal 111, the connection manager 712 moves the process to step S1909. When the transmission source of the request is neither the secure box 14 nor the information terminal 111 (or other cases), the connection manager 712 ends the process of FIG. 19.

When the process proceeds to step S1903, the connection manager 712 receives a request from the secure box 14. In step S1904, the connection manager 712 searches for the IP address of the container 521 of the relay server 13.

In step S1905, the connection manager 712 determines whether or not the connection management DB 540 has a session ID included in the received request (connection request). For example, when the session ID included in the connection request is stored in the connection management list 1303 as illustrated in FIG. 13D, the connection manager 712 determines that the session ID included in the connection request is present in the connection management DB 540.

When the connection management DB 540 has the session ID included in the connection request, the connection manager 712 moves the process to step S1906. Meanwhile, when there is no session ID included in the connection request in the connection management DB 540, the connection manager 712 moves the process to step S1907.

When the process proceeds to step S1906, the connection manager 712 updates the IP address corresponding to the session ID included in the connection request with the IP address of the container 521 of the relay server 13 in the connection management list 1303, for example, illustrated in FIG. 13D.

Meanwhile, when the process proceeds to step S1907, the connection manager 712 adds the session ID included in the connection request and the IP address of the container 521 of the relay server 13 to the connection management list 1303, for example, illustrated in FIG. 13D.

In step S1908, the connection manager 712 redirects the secure box 14 to the IP address of the container 521 of the relay server 13.

Meanwhile, when the process proceeds from step S1902 to step S1909, the connection manager 712 receives a request from the information terminal 111. In step S1910, the connection manager 712 checks (searches for) the IP address of the container 521 of the relay server 13.

In step S1911, the connection manager 712 determines whether or not the session ID included in the received request (connection request) is registered in the connection management DB 540. For example, when the session ID included in the connection request is stored in the connection management list 1303 as illustrated in FIG. 13D, the connection manager 712 determines that the session ID included in the connection request is registered in the connection management DB 540.

When the session ID included in the connection request is registered in the connection management DB 540, the connection manager 712 moves the process to step S1912. Meanwhile, when the session ID included in the connection request is not registered in the connection management DB 540, the connection manager 712 ends the process illustrated in FIG. 19.

In step S1912, the connection manager 712 redirects the information terminal 111 to an IP address corresponding to the same session ID as the session ID included in the connection request in the connection management list 1303 as illustrated in FIG. 13D.

In accordance with the above-described process, the connection manager 712 of the relay server 13 dynamically changes the IP address of the relay unit 713 to be connected. For example, when the request source of the connection request is the secure box 14, the connection manager 712 establishes communication within the initially accessed container 521. However, when the request source is the information terminal 111, the connection manager 712 does not necessarily establish communication within the initially accessed container 521.

(Relay Server Process 2)

Figure 20:
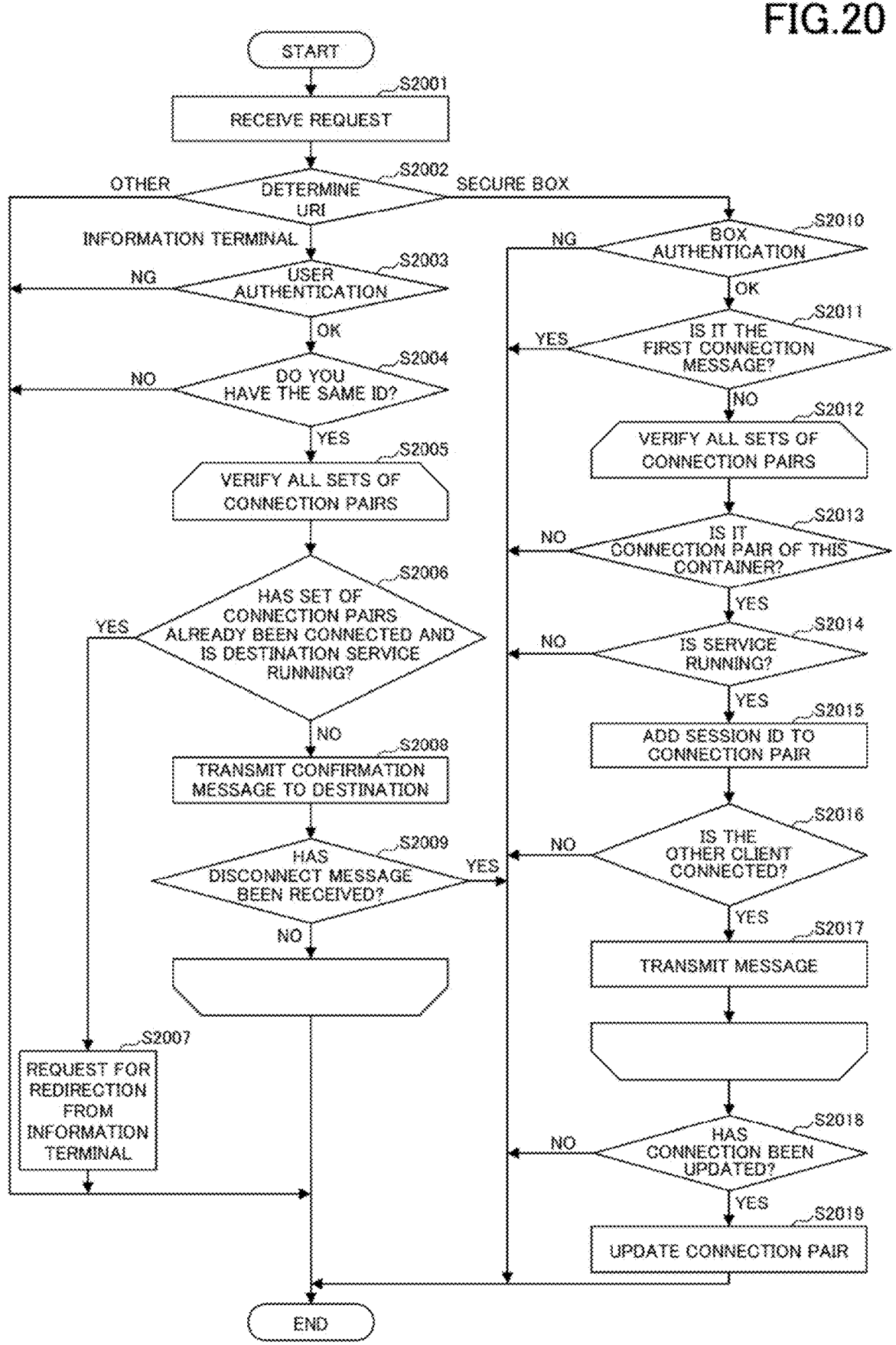
FIG. 20 is a flowchart (2) illustrating an example of a process of the relay server according to the first embodiment.

FIG. 20 is a flowchart (2) illustrating an example of a relay server process according to the first embodiment. This process illustrates an example of a process executed by the relay unit 713 of the relay server 13 when the relay server 13 receives a connection request including the session ID in step S1613 of FIG. 16 or step S1618 of FIG. 17. Note that the relay unit 713 of the relay server 13 is implemented by the WebSocket server 522 of the container 521 illustrated in FIG. 5.

In step S2001, when the communication unit 711 of the relay server 13 receives a request, the relay unit 713 performs the processes from step S2002 onward.

In step S2002, the relay unit 713 determines whether the transmission source of the request is a secure box 14, an information terminal 111, or the like by determining the URI of the request received by the communication unit 711.

When the transmission source of the request is the information terminal 111, the relay unit 713 moves the process to step S2003. Meanwhile, when the source of the request is the secure box 14, the relay unit 713 moves the process to step S2010. Meanwhile, when the transmission source of the request is neither the information terminal 111 nor the secure box 14 (or other cases), the connection manager 712 terminates the process of FIG. 20.

When the process proceeds to step S2003, the relay unit 713 performs user authentication. For example, when an authorized access token is included in the connection request received from the information terminal 111, the relay unit 713 approves (OK) user authentication. When the user authentication is OK, the relay unit 713 moves the process to step S2004. Meanwhile, when the user authentication is disapproved (NG), the relay unit 713 ends the process illustrated in FIG. 20.

When the process proceeds to step S2004, the relay unit 713 determines whether or not there is the same session ID as the session ID included in the request (connection request) in the connection management list 1303, for example, illustrated in FIG. 13D. When the same session ID exists, the relay unit 713 moves the process to step S2005. Meanwhile, when the same session ID is not included, the relay unit 713 ends the process illustrated in FIG. 20.

When the process proceeds to step S2005, the relay unit 713 performs a verification process illustrated in steps S2007 to S2008 for each set of the connection pairs (a combination of the information terminal 111 and the secure box 14 connected to the same session).

In step S2006, the relay unit 713 determines whether or not the set of connection pairs has already been connected and the destination service is running. When the connection has already been made and the destination service is running, the relay unit 713 moves the process to step S2007. Meanwhile, when the connection has not been made, or when the service destination is not running, the relay unit 713 moves the process to step S2008.

When the process proceeds to step S2007, the relay unit 713 requests the information terminal 111 to redirect the set of the connection pairs that has already been connected and for which the connection destination service is running.

Meanwhile, when the process proceeds to step S2008, the relay unit 713 transmits a confirmation message to the connection destination (the secure box 14) of the information terminal 111.

In step S2009, the relay unit 713 determines whether or not a disconnection message has been received from the connection destination. When a disconnection message is received, the relay unit 713 ends the process illustrated in FIG. 20. Meanwhile, when the connection disconnection message is not received, the relay unit 713 performs the process of step S2006 for the next connection pair.

Meanwhile, when the process proceeds from step sS2002 to step S2010, the relay unit 713 performs authentication (box authentication) of the secure box 14. For example, when an authorized route certificate is included in the connection request received from the secure box 14, the relay unit 713 approves (OK) the box authentication. When the box authentication is OK, the relay unit 713 proceed to the process in step S2011. Meanwhile, when the box authentication is disapproved (NG), the relay unit 713 ends the process illustrated in FIG. 20.

When the process proceeds to step S2011, the relay unit 713 determines whether or not the message received from the secure box 14 is a first connection message used when starting a connection with the relay server 13.

When the message is the first connection message, the relay unit 713 terminates the process illustrated in FIG. 20. Meanwhile, if the message is not a first connection message, the process proceeds to step S2012.

When the process proceeds to step S2012, the relay unit 713 executes the verification process illustrated in steps S2013 to S2017 for each set of the connection pairs (the combination of the information terminal 111 and the secure box 14).

In step S2013, the relay unit 713 determines whether or not the connection pair is a connection pair of the present container (the container 521 executing the relay unit 713). When the connection pair is a connection pair of the present container, the relay unit 713 moves the process to step S2014. Meanwhile, when the connection pair is not a connection pair of the present container, the relay unit 713 ends the process illustrated in FIG. 20.

When the process proceeds to step S2014, the relay unit 713 determines whether or not the service corresponding to the connection pair is running. When the service is running, the relay unit 713 moves the process to step S2015. Meanwhile, when the service is not running, the relay unit 713 terminates the process illustrated in FIG. 20.

When the process proceeds to step S2015, the relay unit 713 adds the session ID to the connection pair.

In step S2016, the relay unit 713 determines whether or not the other party's client (the information terminal 111) is connected. When the other client is not connected, the relay unit 713 ends the process illustrated in FIG. 20.

Meanwhile, when the other client is connected, the relay unit 713 sends a message to the other client. When there is a next connection pair, the process in step S2013 is executed for the next connection pair, and when there is no next connection pair, the process proceeds to step S2018.

In step S2018, the relay unit 713 determines whether or not the connection has been updated. When the connection is updated, the relay unit 713 moves the process to step S2019. Meanwhile, when the connection is not updated, the relay unit 713 terminates the process illustrated in FIG. 20. When the process proceeds to step S2019, the relay unit 713 updates the connection pair.

As a result of the above-described process, the relay unit 713 establishes a session between a plurality of information terminals 111 and the secure box 14 through one relay server 13, enabling transmitting and receiving data in each session. This is because the session ID determines a connection pair that combines the information terminal 111 and the secure box 14 into one.

(Protocol Conversion Process 1)

Subsequently, an example of a protocol conversion process (RDP) performed by the communication system 1 will be described when the user uses the information terminal 111 to use the remote desktop service provided by the information processing device 101.

Herein, it is assumed that the information terminal 111 is running a web browser, and that the web browser interprets a HTML 5, can execute Javascript (registered trademark), and can communicate with wss (WebSocket over HTTPS). Meanwhile, the remote desktop service provided by the information processing device 101 can communicate by RDP (Remote Desktop Protocol), but not by wss.

As described above, since the protocol for communicating between the information terminal 111 and the remote desktop service provided by the information processing device 101 is different, in the first embodiment, the secure box 14 performs the protocol conversion process and the service control processing. For example, the secure box 14 performs a process of converting the data format of the data received from the information terminal 111 so that the remote desktop service provided by the information processing device 101 can process the data, and also performs a process of decomposing the data into necessary procedures, and then transmits the resulting data to the information processing device 101. As a specific example, the information terminal 111 transmits login information (for example, a user name, a password, a domain, or the like) as the data of the character string. The secure box 14 converts the login information transmitted by the information terminal 111 as the data of the character string into the login information in the RDP format and transmits the login information in the RDP format to the information processing device 101.

The secure box 14 also performs a process of converting data in the RDP format transmitted by the remote desktop service provided by the information processing device 101 into a data format usable in a web browser provided by the information terminal 111.

Figure 21:
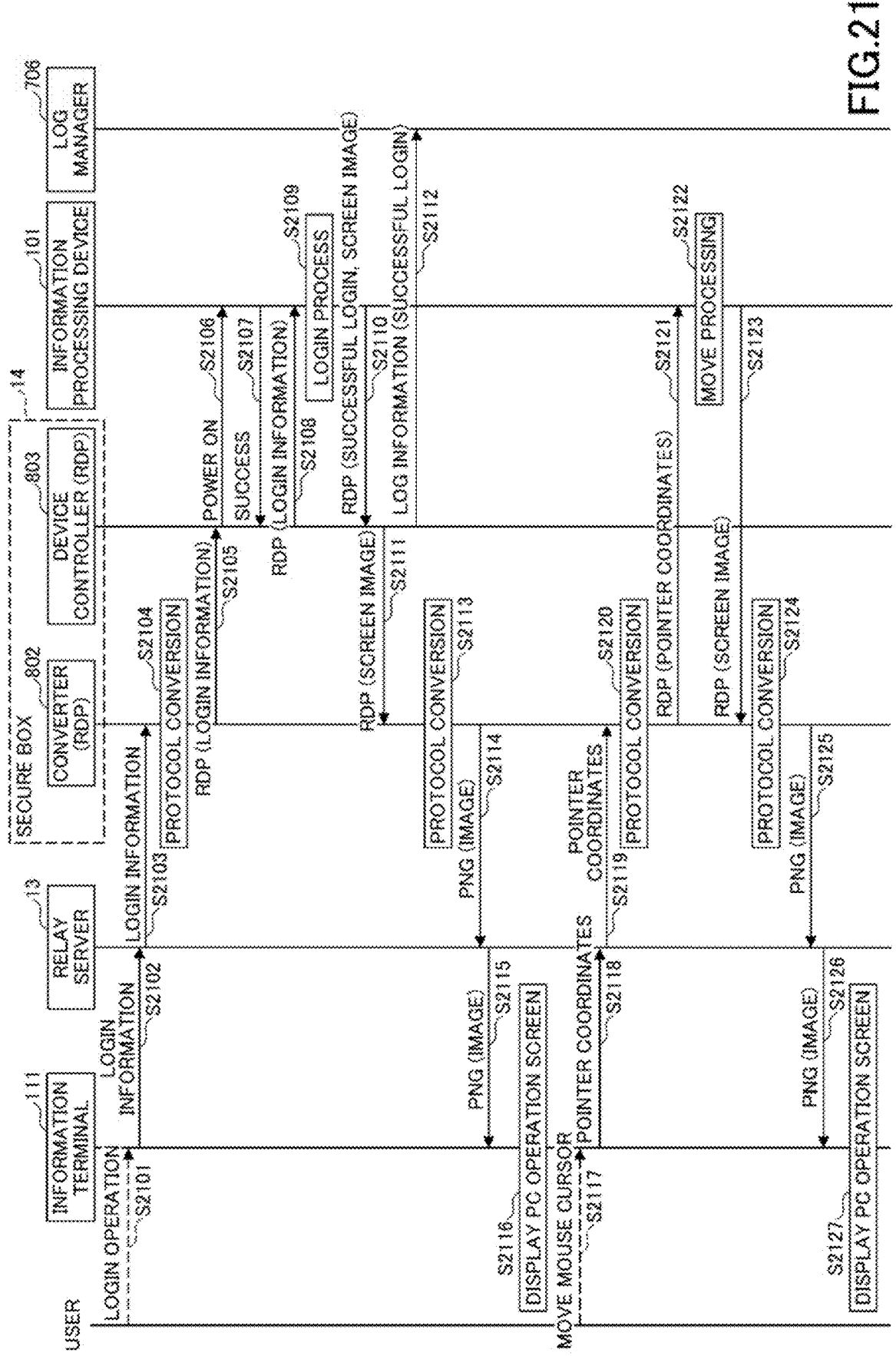
FIG. 21 is a sequence diagram (1) illustrating an example of a protocol conversion process (RDP) according to the first embodiment.
Figure 22:
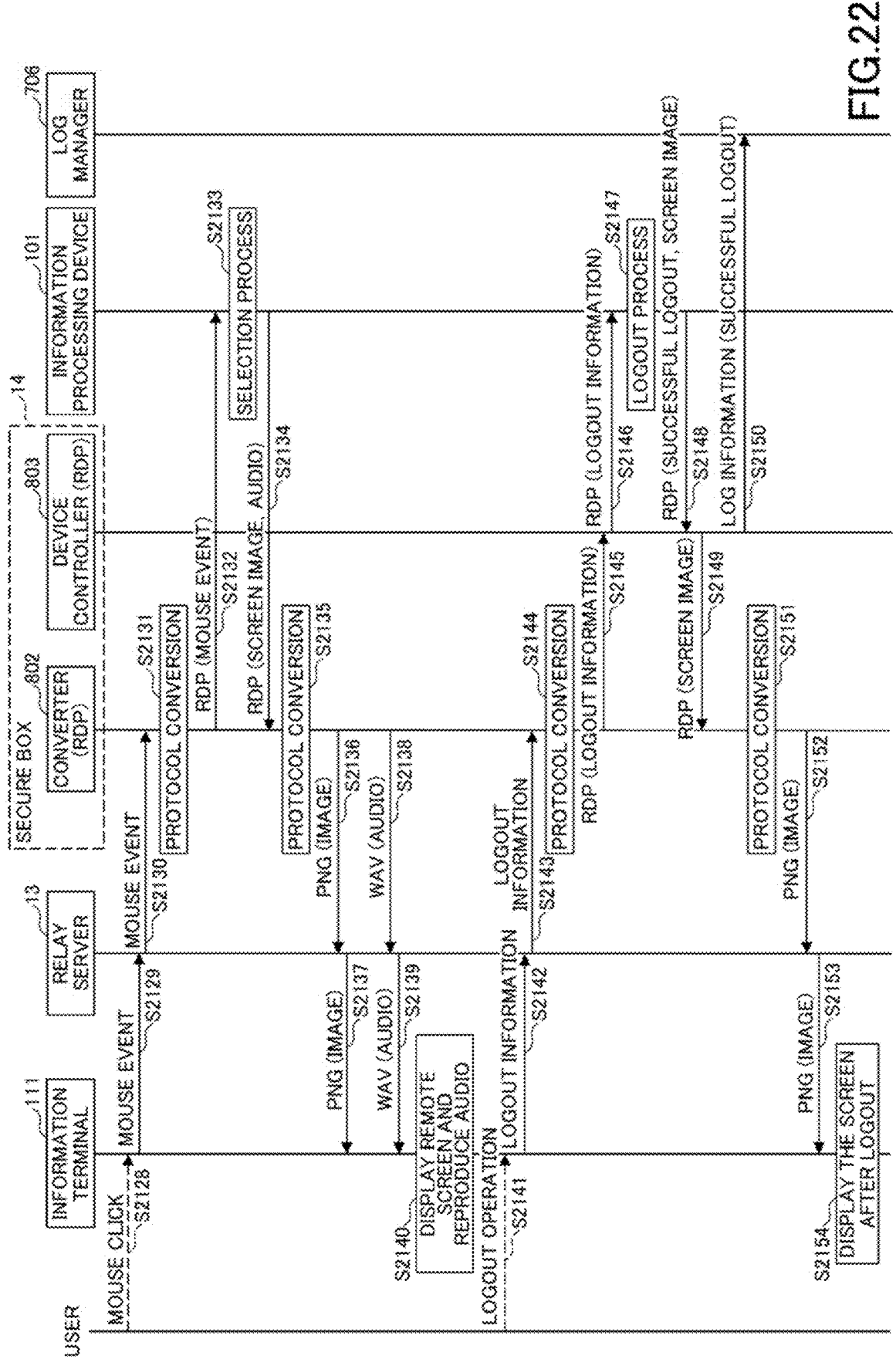
FIG. 22 is a sequence diagram (2) illustrating an example of a protocol conversion process (RDP) according to the first embodiment.

FIGS. 21 and 22 are sequence diagrams illustrating an example of a protocol conversion process (RDP) according to the first embodiment. In order to facilitate the description, the following description will be given on the assumption that a session capable of performing communication between the information terminal 111 and the secure box 14 through the relay server 13 has already been established at the start of the process shown in FIG. 21.

In step S2101, when the user performs a login operation (input of the login information) to the information terminal 111, the communication system 1 performs the processes from step S2102 onward.

In steps S2102 and S2103, the information terminal 111 transmits input login information to the secure box 14 through the relay server 13.

In step S2104, the converter (RDP) 802 of the secure box 14 performs protocol conversion to convert a character string of the login information transmitted by the web browser of the information terminal 111 into login information in the RDP format.

In step S2105, the converter 802 of the secure box 14 notifies the device controller (RDP) 803 of the login information that is converted into the RDP format by the protocol conversion. Note that the converter 802 notifies the device controller 803 or the information processing device 101 of the protocol converted data in accordance with the processing contents.

In steps S2106 and S2107, when the login information in the RDP format is received from the converter 802, the device controller 803 of the secure box 14 starts the power supply of the information processing device 101. Note that the processes of steps S2106 and S2107 are optional and not mandatory. For example, when the power of the information processing device 101 is already turned on, the device controller 803 may omit the processes of steps S2106 and S2107.

In step S2108, the device controller 803 of the secure box 14 transmits login information in the RDP format received from the converter 802 to the information processing device 101.

In step S2109, the remote desktop service provided by the information processing device 101 performs a login process for the login information received from the secure box 14. Herein, it is assumed that a user of the information terminal 111 is an authorized user of the remote desktop service provided by the information processing device 101, and successfully logs in.

In step S2110, the remote desktop service provided by the information processing device 101 transmits information indicating that the login has been successful, and a screen image or the like in an RDP format to the secure box 14.

In step S2111, the device controller 803 of the secure box 14 transmits the screen image in the RDP format to the converter 802 received from the remote desktop service. In parallel with this process in S2111, in step S2112, the device controller 803 of the secure box 14 transmits log information indicating that a user has successfully logged into the log manager 706 of the management server 10.

In step S2113, the converter 802 of the secure box 14 converts the screen image in the RDP format received from the device controller 803 into a screen image in the PNG format, for example.

In step S2114 and step S2115, the converter 802 transmits the converted PNG-format image to the information terminal 111 through the relay server 13.

In step S2116, the information terminal 111 displays a PC operation screen provided by the remote desktop service of the information processing device 101 by displaying an image in the PNG format transmitted by the converter 802 of the secure box 14.

FIG. 23A is a diagram illustrating an example of a PC operation screen 2310 displayed by the information terminal 111. The PC operation screen 2310 is a display screen of the remote desktop provided by the remote desktop service of the information processing device 101 and is displayed, for example, on a web browser.

Subsequently, in step S2117, a user moves a mouse cursor (mouse pointer) 2311 on the PC operation screen 2310. In this case, in steps S2118 and S2119, the information terminal 111 transmits pointer coordinates of the mouse to the secure box 14 through the relay server 13.

In step S2120, the converter 802 of the secure box 14 performs protocol conversion to convert the pointer coordinates transmitted by the information terminal 111 to pointer coordinates in the RDP format. In step S2121, the converter 802 transmits the pointer coordinates of the converted RDP format to the information processing device 101. As described above, when predetermined control (for example, power control, transmission of log information, etc.) by the device controller 803 is not necessary, the converter 802 may transmit the protocol converted data in the RDP format to the information processing device 101 without the device controller 803.

In step S2122, the remote desktop service provided by the information processing device 101 performs a movement process of moving the mouse cursor 2311 on the remote desktop.

In step S2123, the remote desktop service provided by the information processing device 101 transmits a screen image in an RDP format with the mouse cursor 2311 moved to the secure box 14.

In step S2124, the converter 802 of the secure box 14 converts the screen image in the RDP format received from the information processing device 101 into a screen image in the PNG format.

In step S2125 and step S2126, the converter 802 transmits the converted PNG-format image to the information terminal 111 through the relay server 13. Accordingly, in step S2127, the display controller 722 of the information terminal 111 displays (updates) the PC operation screen provided by the remote desktop service by displaying the PNG-format image transmitted by the converter 802 of the secure box 14.

Subsequently, in step S2118 of FIG. 22, the user clicks the mouse on the PC operation screen 2310. Accordingly, in steps S2129 and S2130, the information terminal 111 transmits a mouse event indicating that a mouse has been clicked to the secure box 14 through the relay server 13.

In step S2131, the converter 802 of the secure box 14 performs protocol conversion to convert the mouse event transmitted by the information terminal 111 into a mouse event in RDP format. In step S2132, the converter 802 transmits the converted RDP-format mouse event to the information processing device 101.

In step S2133, the remote desktop service provided by the information processing device 101 performs a selection process by a mouse click on the remote desktop. Herein, it is assumed that an object selected by the user's mouse click is an object outputting predetermined audio.

In step S2134, the remote desktop service provided by the information processing device 101 transmits a screen image in the updated RDP format and the audio data for playing back the audio selected by the mouse click to the secure box 14.

In step S2135, the converter 802 of the secure box 14 converts the screen image in the RDP format received from the information processing device 101 into an image in the PNG format. The converter 802 also performs protocol conversion to convert the audio data in the RDP format received from the information processing device 101 into audio data in the WAV format.

In steps S2136 and S2137, the converter 802 transmits the converted PNG-format image to the information terminal 111 through the relay server 13. In parallel with the processes in steps S2136 and S2137, in step S2138 and step S2139, the converter 802 transmits the converted WAV-format audio data to the information terminal 111 through the relay server 13.

In step S2140, the display controller 722 of the information terminal 111 displays a PC operation screen provided by the remote desktop service by displaying the PNG-format image transmitted by the converter 802 of the secure box 14. In parallel with this process in step S2140, the display controller 722 reproduces the WAV format-audio data transmitted by the converter 802 of the secure box 14.

Subsequently, in step S2141, for example, the user performs a logout operation on the information terminal 111. In response to this, in steps S2142 and S2143, the information terminal 111 transmits logout information indicating that the user has performed a logout operation to the secure box 14 through the relay server 13.

In step S2144, the converter 802 of the secure box 14 performs protocol conversion to convert a character string of the logout information transmitted by the web browser of the information terminal 111 to the logout information in RDP format.

In step S2145, the converter 802 of the secure box 14 notifies the device controller 803 of the protocol converted RDP-format logout information. Accordingly, in step S2146, the device controller 803 of the secure box 14 transmits logout information in the RDP format received from the converter 802 to the information processing device 101.

In step S2147, the remote desktop service provided by the information processing device 101 performs a logout process according to the logout information received from the secure box 14.

In step S2148, the remote desktop service provided by the information processing device 101 transmits information indicating that the logout has been successful and a screen image or the like in an RDP format to the secure box 14.

In step S2149, the device controller 803 of the secure box 14 transmits a screen image in the RDP format to the converter 802 received from the remote desktop service. In parallel with this process in step S2149, in step S2150, the device controller 803 transmits log information indicating that logout has been performed to the log manager 706 of the management server 10.

In step S2151, the converter 802 of the secure box 14 performs protocol conversion to convert the screen image in the RDP format received from the device controller 803 into a screen image in the PNG format, for example. In step S2152 and step S2153, the converter 802 transmits the converted PNG-format image to the information terminal 111 through the relay server 13.

In step S2154, the information terminal 111 displays the image in the PNG format transmitted by the converter 802 of the secure box 14 and displays the screen after logout.

The above-described process enables a series of processes, in which a user logs into the remote desktop service provided by the information processing device 101, manipulates the mouse cursor, and performs mouse clicks, so that the audio is played back, and then logs out. The secure box 14 transmits a process that needs to retain log information to the log manager 706 of the management server 10. Note that it is preferable that the process that needs to retain log information be information necessary for the audit, such as the date and time, user name, access destination service, destination, and event (connection start and end).

(Protocol Conversion Process 2)

Hereinafter, an example of a protocol conversion process (FAX) performed by the communication system 1 will be described when a user uses the information terminal 111 to use a facsimile service provided by the image forming device 102.

Herein, it is assumed that the information terminal 111 executes a web browser, and that the web browser interprets HTML 5, can execute Javascript (registered trademark), and can communicate with wss (WebSocket over HTTPS). Meanwhile, the facsimile service (an example of the image forming service) provided by the image forming device 102 is implemented by operating the Web API provided by the image forming device 102.

Herein, the web browser of the information terminal 111, and the facsimile service provided by the image forming device 102 both use HTTP as a communication means. However, since the data format and the sequence are different between the information terminal 111 and the image forming device 102, the information terminal 111 and the image forming device 102 use different communication protocols, for example. Thus, the secure box 14 performs protocol conversion and service control. For example, the secure box 14 converts data received from the information terminal 111 into a data format so that the facsimile service provided by the image forming device 102 can be processed, or performs a process such as decomposing the received data into necessary procedures, and transmits the converted or decomposed data to the facsimile service. As a specific example, the web browser of the information terminal 111 transmits login information (user name, password, domain, or the like) as character string data. The secure box 14 converts the login information transmitted as the data of the character string into a web API that can be processed by the facsimile service provided by the image forming device 102, and transmits the converted login information to the image forming device 102.

Figure 24:
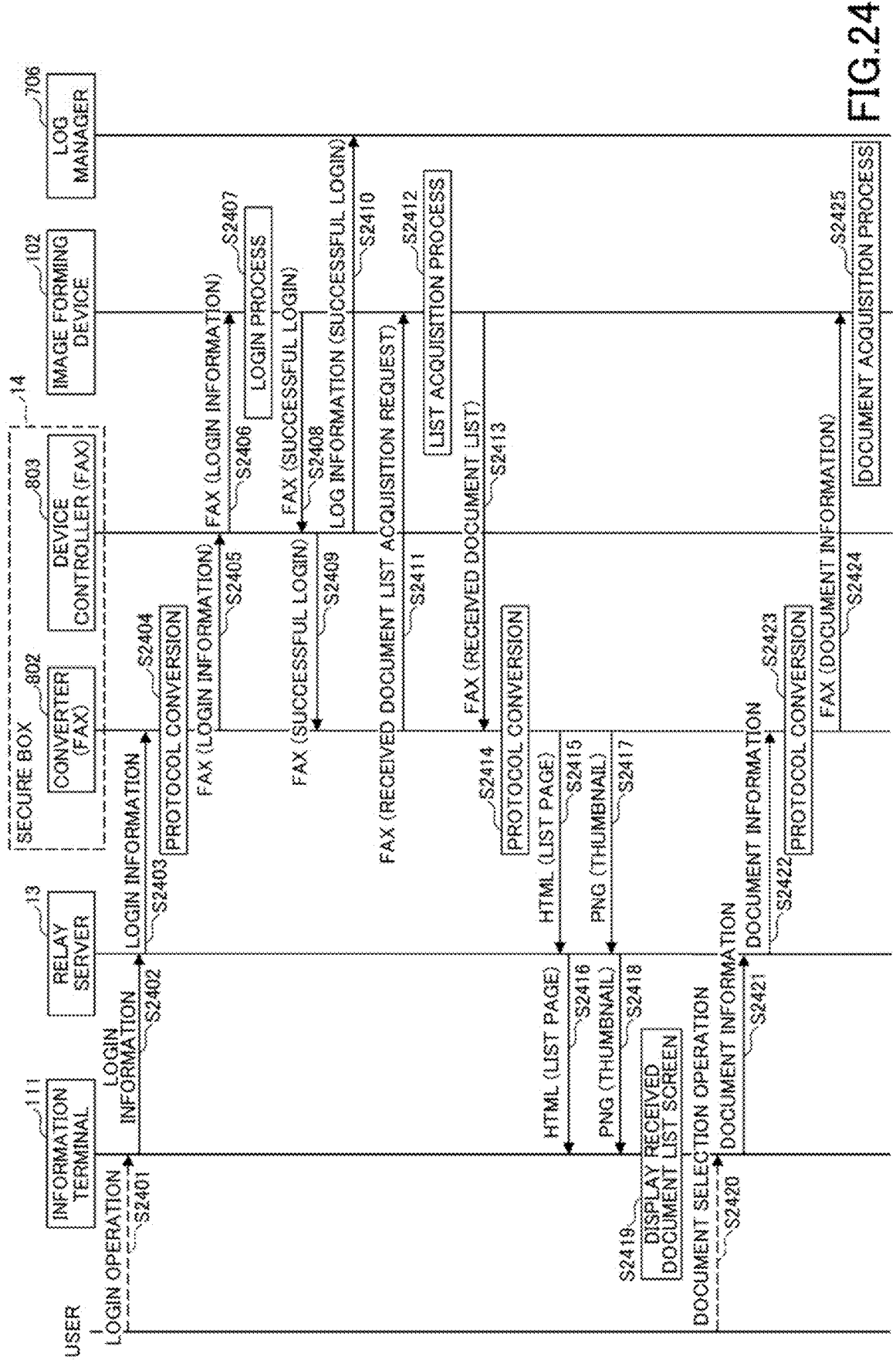
FIG. 24 is a sequence diagram (1) illustrating an example of a protocol conversion process (FAX) according to the first embodiment.
Figure 25:
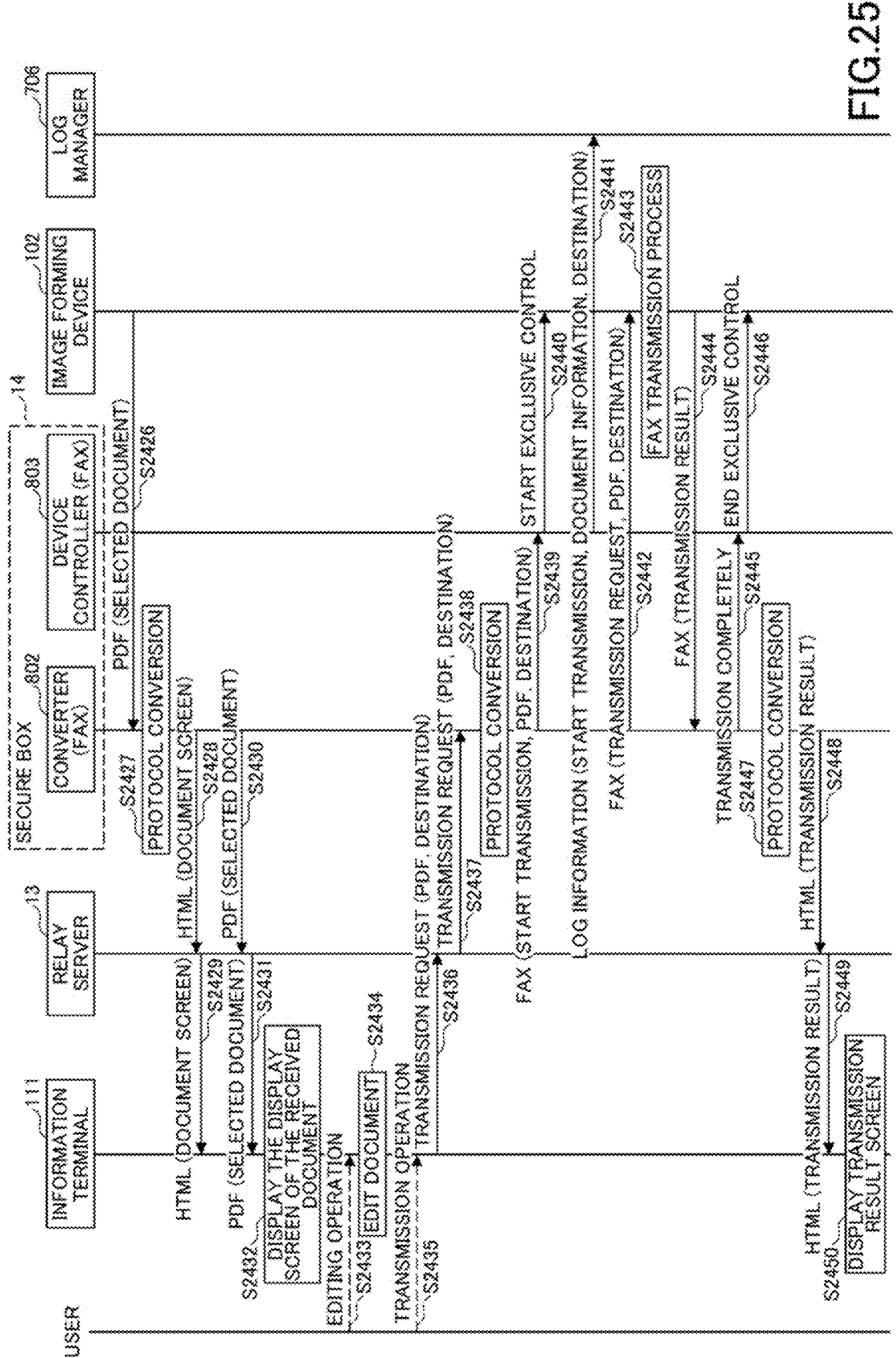
FIG. 25 is a sequence diagram illustrating an example of a protocol conversion process (FAX) according to the first embodiment.

FIGS. 24 and 25 are sequence diagrams illustrating an example of a protocol conversion process (FAX) according to the first embodiment. Herein, for facilitating understanding of the description, it is assumed that a session capable of performing communication between the information terminal 111 and the secure box 14 through the relay server 13 has already been established at the start of the process illustrated in FIG. 24.

In step S2401, the user performs a login operation (input of the login information) on the information terminal 111. In step S2402 and step S2403, the operation reception unit 723 of the information terminal 111 transmits input login information to the secure box 14 through the relay server 13.

In step S2404, the converter (FAX) 802 of the secure box 14 performs protocol conversion to convert a character string of the login information transmitted by the web browser of the information terminal 111 into login information in the web API format of the facsimile service. In step S2405, the converter 802 notifies the device controller (RDP) 803 of the protocol converted login information in the web API-format of the facsimile service.

In step S2406, the device controller 803 of the secure box 14 transmits the login information in the web API format of the facsimile service received from the converter 802 to the image forming device 102. In response to this, in step S2407, the image forming device 102 performs a login process for the login information in the web API format of the facsimile service received from the secure box 14. Herein, a user of the information terminal 111 is an authorized user of the image forming device 102, and successfully logs in.

In step S2408, the image forming device 102 transmits information indicating that the login has been successful to the secure box 14 in the web API format of the facsimile service.

In step S2409, the device controller 803 of the secure box 14 transmits information representing successful login received from the image forming device 102 to the converter 802. In parallel with this process in step S2409, in step S2410, the device controller 803 transmits log information indicating that the login has been successful to the log manager 706 of the management server 10.

In step S2411, the converter 802 of the secure box 14 receives information indicating that the image forming device 102 has successfully logged in, and transmits a request for acquiring a list of received documents (received document list) to the image forming device 102. As described above, the protocol conversion executed by the converter 802 of the secure box 14 may include the conversion of the sequence.

In step S2412 and step S2413, when a request for acquiring a list of received documents (a received document list acquisition request) is received from the secure box 14, the facsimile service provided by the image forming device 102 acquires a list of received documents, and transmits the list to the secure box 14 as the request source.

In step S2414, the converter 802 of the secure box 14 performs protocol conversion to convert the list of received documents in the web API format of the facsimile service received from the image forming device 102 into, for example, a list page in the HTML format and a thumbnail in the PNG format.

In steps S2415 and S2416, the converter 802 transmits the converted HTML-format list page to the information terminal 111 through the relay server 13. In parallel with the processes in steps S2415 and S2416, in step S2417 and step S2418, the converter 802 transmits the converted PNG-format thumbnail to the information terminal 111 through the relay server 13.

In step S2419, the display controller 722 (the web browser) of the information terminal 111 displays a received document list screen using the HTML-format list page and the PNG-format thumbnail transmitted by the secure box 14.

Subsequently, in step S2420, when the user performs a document selection operation of selecting a document from the received document list screen, the processes from step S2421 onward are performed.

In steps S2421 and S2422, the operation reception unit 723 of the information terminal 111 transmits document information representing the selected document to the secure box 14 through the relay server 13.

In step S2423, the converter 802 of the secure box 14 performs protocol conversion to convert document information transmitted by the information terminal 111 into document information in the web API format of the facsimile service. In step S2424, the converter 802 transmits the document information converted into the web API format of the facsimile service to the image forming device 102. In response to this, in step S2425, the facsimile service affected by the image forming device 102 performs a process of acquiring the selected document.

Subsequently, in step S2426 of FIG. 25, the facsimile service provided by the image forming device 102 transmits the selected document in a PDF format to the converter 802 of the secure box 14, for example.

In step S2427, the converter 802 of the secure box 14 performs protocol conversion to convert the PDF-format document received from the facsimile service of the image forming device 102 into, for example, an HTML-format document screen and a PDF-format document.

In steps S2428 and S2429, the converter 802 transmits the HTML-format document screen to the information terminal 111 through the relay server 13. In parallel with the process in steps S2428 and S2429, in step S2430 and step S2431, the converter 802 transmits the selected document in the PDF format to the information terminal 111 through the relay server 13.

Figure 23B:
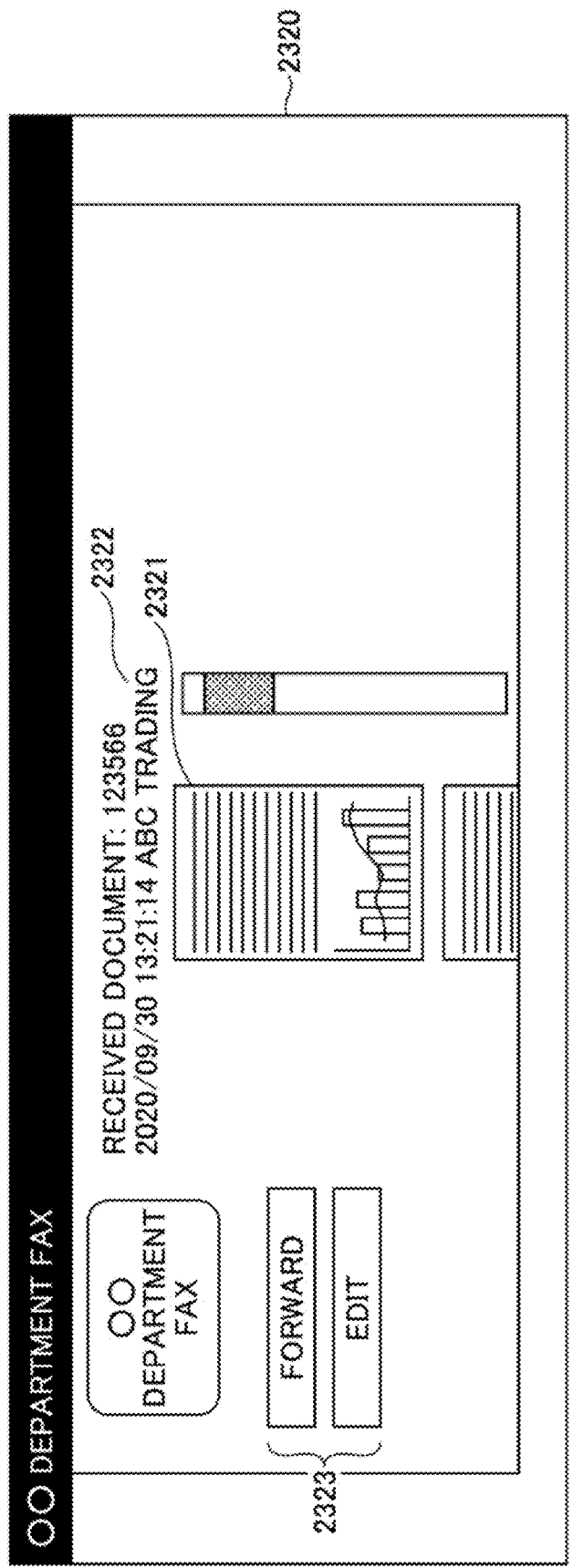

In step S2432, the display controller 722 of the information terminal 111 displays a received document display screen 2320, for example, illustrated in FIG. 23B, using the HTML-format document screen and the PDF-format document transmitted by the secure box 14. In the example of FIG. 23B, the received document screen 2320 displays as an image 2321 of the received document, information (received date and time, transmission source, etc.) 2322 of the received document, and a plurality of operation buttons 2323.

Subsequently, in step S2433 and step S2434, the user performs an editing operation on the received document display screen 2320. For example, the user selects an "Edit" button in the received document display screen 2320 as illustrated in FIG. 23B, and performs an edit, for example, adding a message to the image 2321 of the received document in the displayed edit screen.

In step S2435, when the user performs a transmission operation, the communication system 1 performs the processes from step S2436 onward.

In steps S2436 and S2437, the operation reception unit 723 of the information terminal 111 transmits a transmission request including an edited PDF-format document and a destination of the FAX transmission to the secure box 14 through the relay server 13.

In step S2438, the converter 802 of the secure box 14 performs protocol conversion to convert the transmission request transmitted by the information terminal 111 to a transmission request in the web API format of the facsimile service. In step S2439, the converter 802 notifies the device controller 803 of transmission start information indicating that the FAX transmission starts. In response to this, in step S2440, the device controller 803 requests the image forming device 102 to start exclusive control to restrict reception of other operations and other processes. This is to prevent, for example, the power of the image forming device 102 from being turned off during FAX transmission process and the FAX transmission process from failing. In step S2441, the device controller 803 transmits log information indicating that the FAX transmission starts to the log manager 706 of the management server 10.

In step S2422, the converter 802 of the secure box 14 transmits a transmission request in the web API format of the facsimile service to the image forming device 102. In response to this, in step S2443 and step S2444, the facsimile service provided by the image forming device 102 executes a FAX transmission process and notifies the converter 802 of a transmission result (in this case, the transmission is successful).

In step S2445, the converter 802 of the secure box 14 notifies the device controller 803 that the FAX transmission has been completed. In response to this, in step S2446, the device controller 803 requests the image forming device 102 to terminate the exclusive control.

In step S2247, the converter 802 of the secure box 14 performs protocol conversion to convert the transmission result in the web API format of the facsimile service into a transmission result in the HTML format. In step S2448 and step S2449, the converter 802 transmits the converted HTML-format transmission result to the information terminal 111 through the relay server 13.

In step S2450, the display controller 722 of the information terminal 111 displays a display screen representing a FAX transmission result.

The protocol conversion process illustrated in FIGS. 21, 22, 24, and 25 is an example of the protocol conversion process performed by the communication system 1. The converter 802 and the device controller 803 of the secure box 14 perform different processes according to the service selected by the user. The device controller 803 may be included in the converter 802.

As described above, according to the first embodiment, various existing electronic devices can be used through the web of the information terminal 111 in the communication system 1 that remotely accesses the electronic devices connected to a local network 100.

Second Embodiment

<System Configuration>

Figure 26:
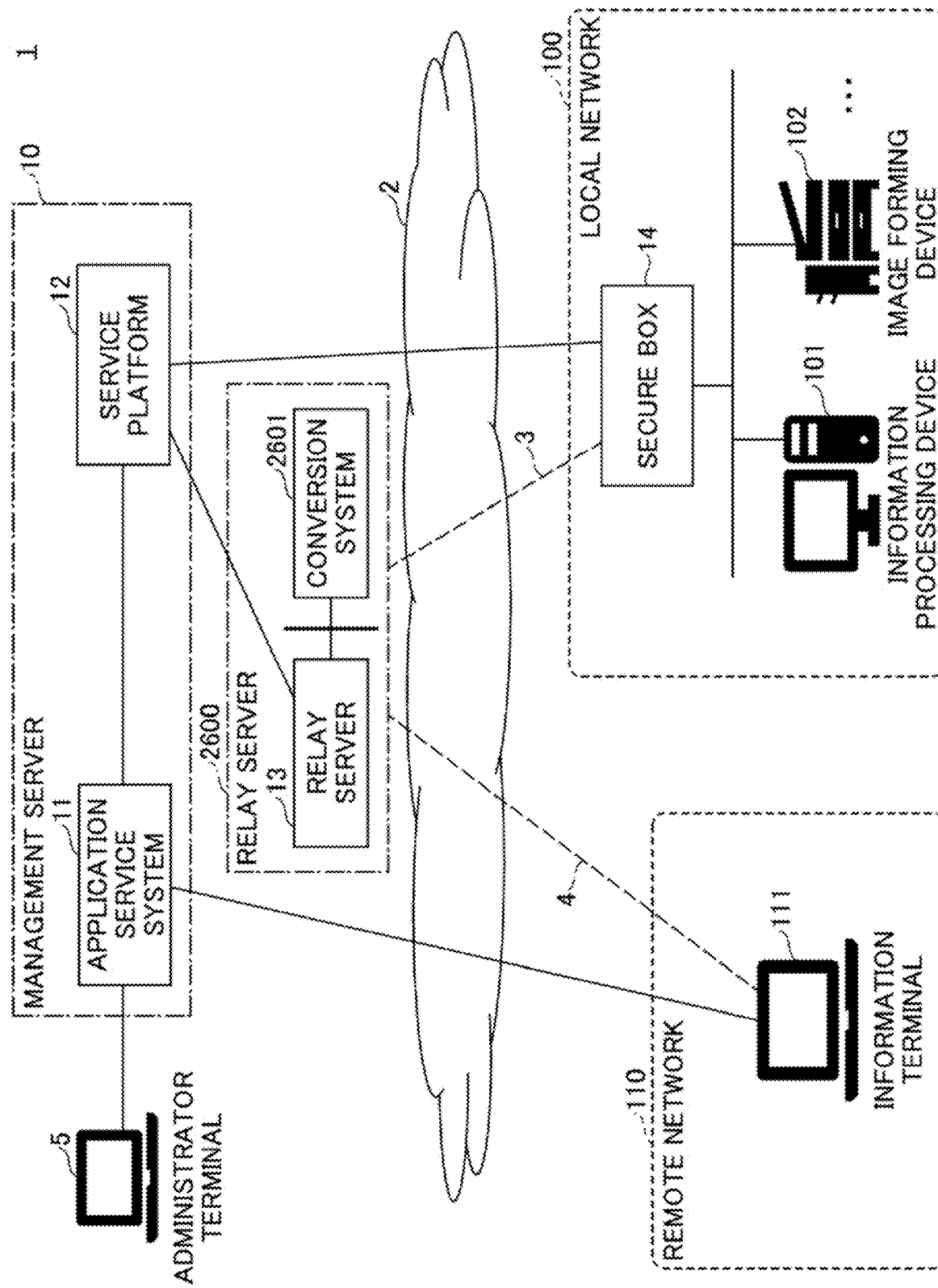
FIG. 26 is a diagram illustrating an example of a system configuration of a communication system according to a second embodiment.

FIG. 26 is a diagram illustrating an example of a system configuration of a communication system according to a second embodiment. The communication system 1 according to the second embodiment includes a conversion system 1601 having a converter 802 and a device controller 803 in addition to the system configuration of the communication system 1 according to the first embodiment illustrated in FIG. 1. Accordingly, the secure box 14 according to the second embodiment does not need to include a converter 802 and a device controller 803 (but may include a converter 802 and a device controller 803).

In the example of FIG. 26, the conversion system 2601 is communicatively connected to the relay server 13, and the relay server 13 and the conversion system 2601 are included in a relay server 2600. However, this configuration is merely an example, and the functions of the conversion system 2601 may, for example, be included in the relay server 13. In short, the relay server 2600 according to the second embodiment may have a functional configuration as illustrated in FIG. 27.

(Functional Configuration of Relay Server)

Figure 9A:
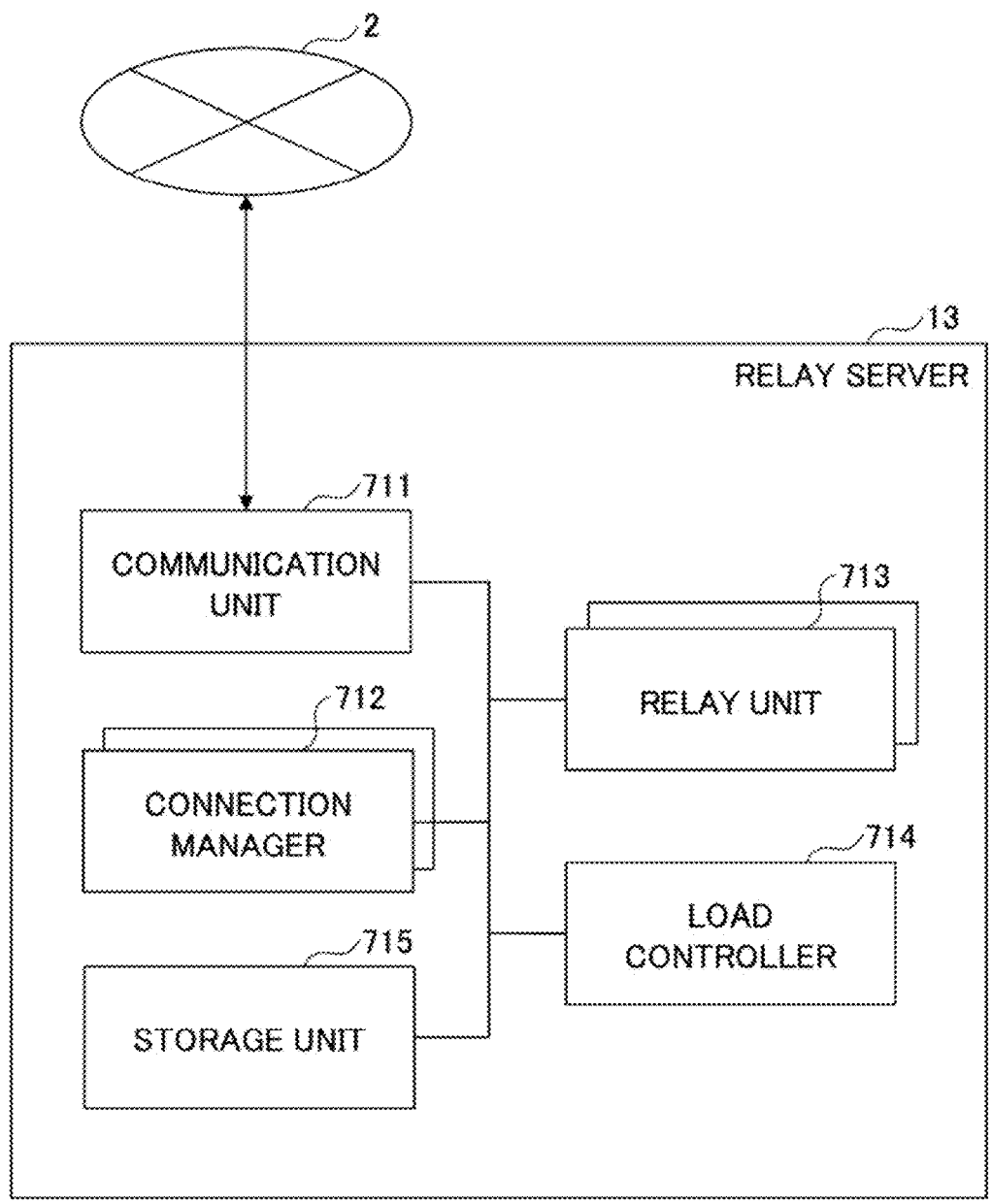
FIG. 9A is a diagram illustrating an example of a functional configuration of a relay server according to the first embodiment.
Figure 9B:
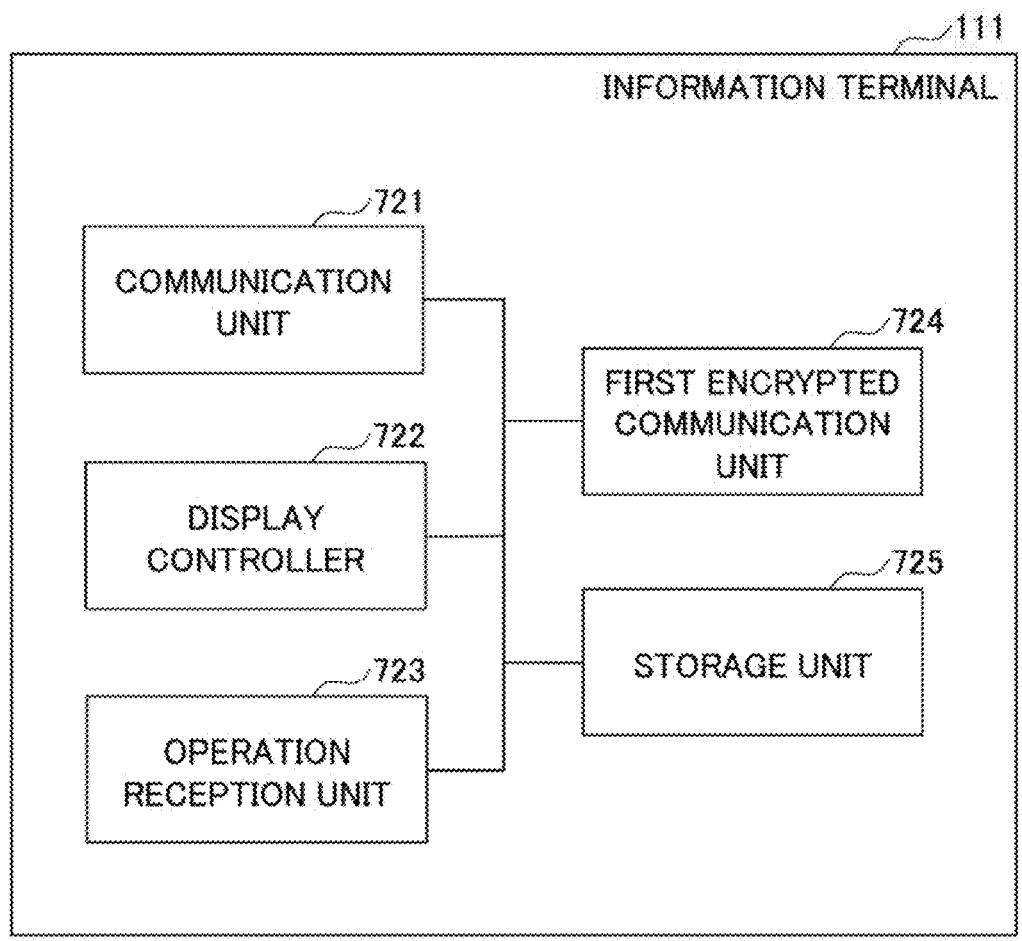
FIG. 9B is a diagram illustrating an example of an information terminal according to the first embodiment.
Figure 27:
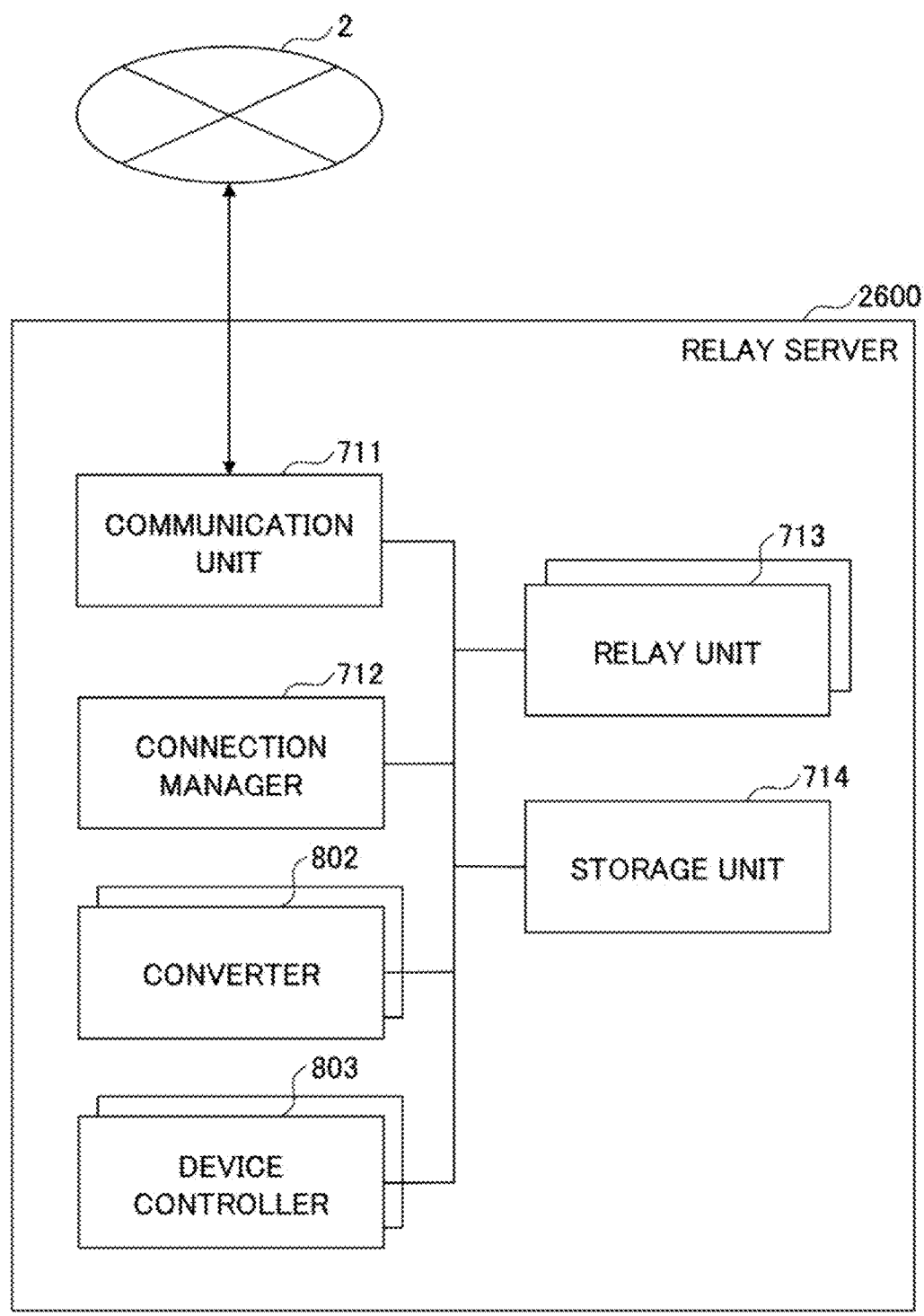
FIG. 27 is a diagram illustrating an example of a functional configuration of a relay server according to a second embodiment.

FIG. 27 is a diagram illustrating an example of a functional configuration of a relay server according to a second embodiment. The relay server 2600 includes, for example, one or more converters 802 and one or more device controllers 803 in addition to the functional configuration of the relay server 13 according to the first embodiment described in FIG. 9A. Note that the relay server 2600 according to the second embodiment is another example of a communication control device having a converter 802 and a device controller 803. Note that the functions of each functional configuration provided by the relay server 2600 may be the same as the functions of each functional configuration described in the first embodiment.

<Flowchart>

In the communication system 1 according to the second embodiment, the start process of the secure box described in FIG. 14, the login process of the information terminal described in FIG. 15, and a session start process and a session end process described in FIGS. 16 and 17 can be applied as is.

Although the basic processing contents are the same with regard to the protocol conversion processing described in FIGS. 21 and 22 and FIGS. 24 and 25, since the flow of data is partially changed, the difference between the protocol conversion processing and the protocol conversion processing according to the first embodiment will be mainly described herein.

Figure 28:
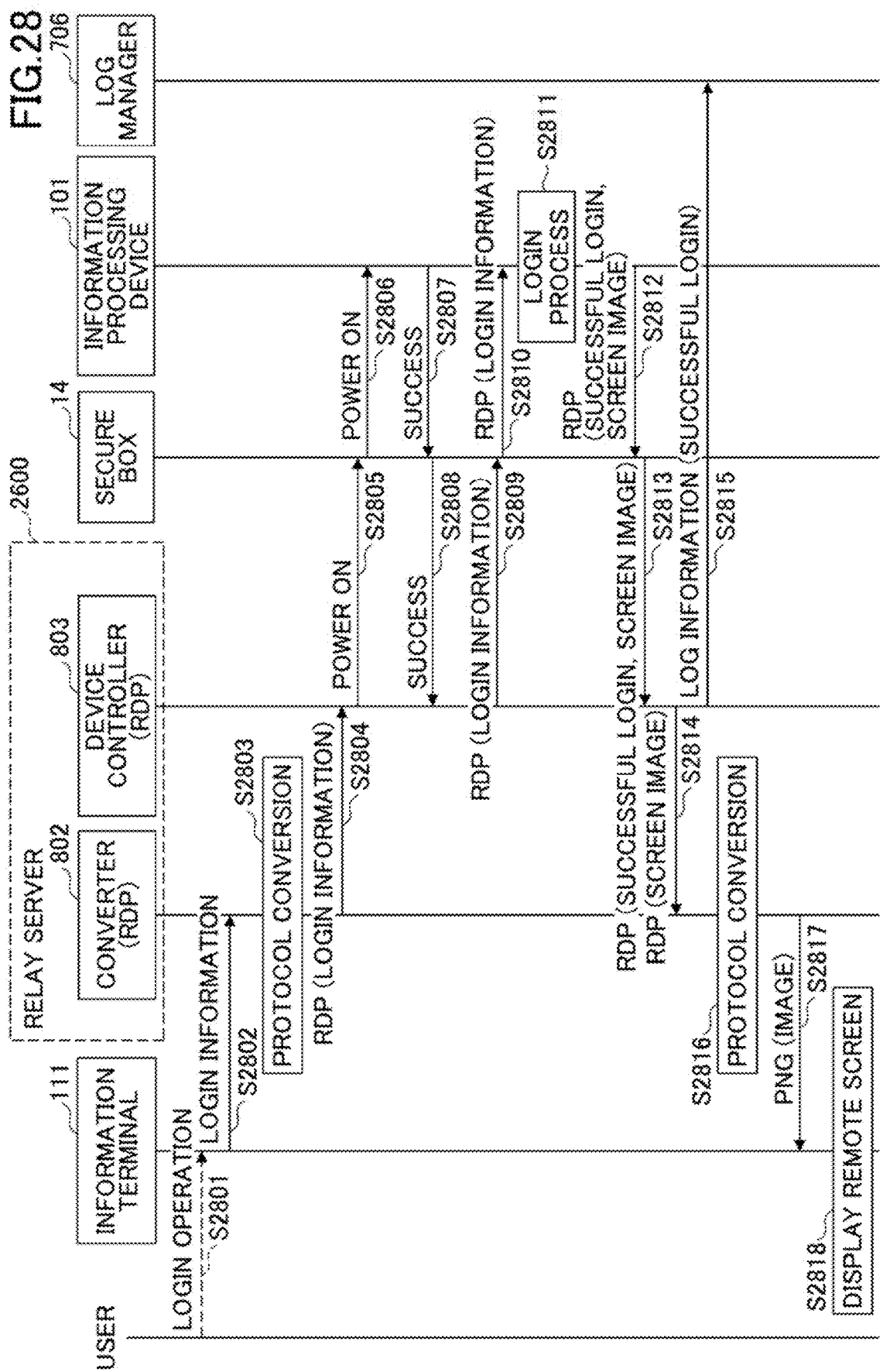
FIG. 28 is a sequence diagram illustrating an example of a protocol conversion process (RDP) according to a second embodiment.

FIG. 28 is a sequence diagram illustrating an example of a protocol conversion process (RDP) according to the second embodiment. This process corresponds to the protocol conversion process (RDP) according to the first embodiment described in FIG. 21. Since the basic processing content is the same as that of the first embodiment, a detailed description of the processing content similar to that of the first embodiment will not be given herein. Since the processing of the relay unit 713 of the relay server 2600 is data transmission (relay), the description of the relay unit 713 will not be given herein.

In step S2801, a user performs a login operation on the information terminal 111. In step S2802, the operation reception unit 723 of the information terminal 111 transmits the input login information to the relay server 2600.

In step S2803, the converter (RDP) 802 of the relay server 2600 receives the login information transmitted by the information terminal 111 through the relay unit 713 and converts the received login information into the login information in the RDP format. In step S2804, the converter 802 notifies the device controller (RDP) 803 of the login information that is converted into the RDP format by the protocol conversion.

In steps S2805 to S2808, when the login information in the RDP format is received from the converter 802, the device controller 803 of the secure box 14 starts (power on) the information processing device 101 through the secure box 14. As described above, in the second embodiment, the secure box 14 performs the relay process for relaying data between the relay server 2600 and the information processing device 101.

In step S2809 and step S2810, the device controller 803 of the secure box 14 transmits login information in the form of RDP received from the converter 802 to the information processing device 101 through the secure box 14.

In step S2811, a remote desktop service provided by the information processing device 101 performs a login process for the login information received from the secure box 14. Herein, it is assumed that the user of the information terminal 111 is an authorized user of the remote desktop service provided by the information processing device 101, and the user successfully logs in.

In steps S2812 and S2813, the remote desktop service provided by the information processing device 101 transmits information indicating that the login has been successful, and a screen image or the like to the relay server 2600 through the secure box 14.

In step S2814, the device controller 803 of the relay server 2600 transmits a screen image in the form of RDP to the converter 802 received from the remote desktop service.

In parallel with this process in step S2814, in step S2815, the device controller 803 transmits log information indicating that the login has been successful to a log manager 706 of the management server 10.

In step S2816, the converter 802 of the relay server 2600 converts the screen image in the RDP format received from the device controller 803 into a screen image in the PNG format, for example. In step S2817, the converter 802 transmits the converted PNG-format image to the information terminal 111 through the relay unit 713.

In step S2818, the display controller 722 of the information terminal 111 displays a PC operation screen provided by the remote desktop service of the information processing device 101 by displaying an image in the PNG format received from the relay server 2600.

As described above, the communication system 1 according to the second embodiment can perform the protocol conversion processing in the same manner as the communication system 1 according to the first embodiment.

(Modification)

Figure 29:
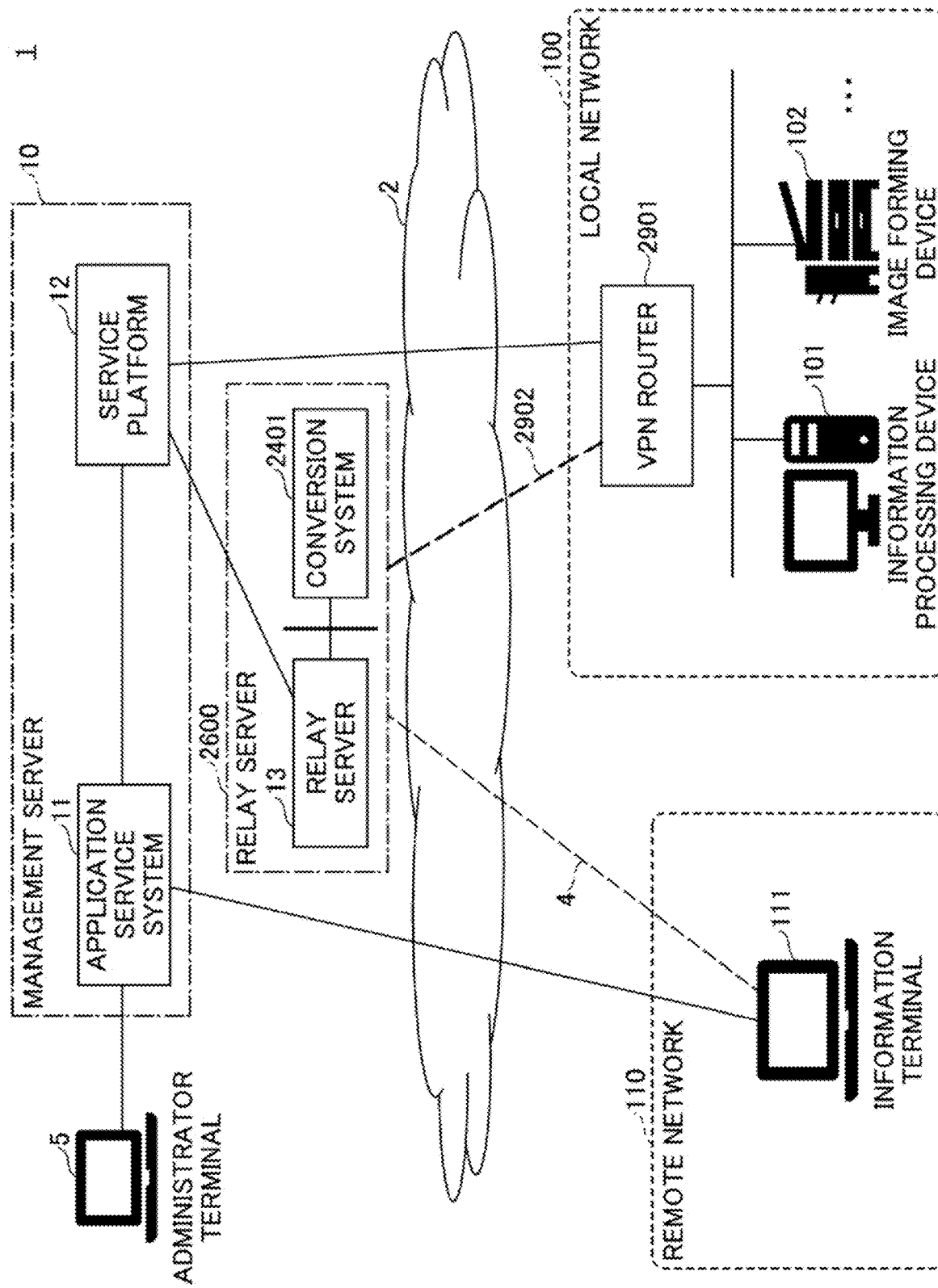
FIG. 29 is a diagram illustrating a modification of a communication system according to a second embodiment.

FIG. 29 is a diagram illustrating a modification of a communication system according to a second embodiment. The communication system 1 illustrated in FIG. 29 includes a VPN router 2901 instead of the secure box 14 of the communication system 1 according to the second embodiment illustrated in FIG. 26. The VPN router 2901 is a terminating device that connects the local network 100 to the relay server 2600 through a VPN (Virtual Private Network) communication 2902.

As described above, when the VPN router 2901 is installed in the local network 100, the communication system 1 may connect the local network 100 to the relay server 2600 using the VPN router 2901 instead of the secure box 14. Accordingly, since the communication system 1 does not have to be accompanied by installation work of the secure box, the maintainability is improved and the installation is facilitated.

(Setting Process of Setting Information)

Next, a setting process of the setting information common to various embodiments will be described. FIG. 30 is a sequence diagram illustrating an example of a setting process of setting information according to an embodiment. This process illustrates an example of a process in which an administrator or the like sets various setting information managed by the communication system 1 using the administrator terminal 5.

In step S3001, the administrator or the like performs a display operation of the portal screen to a web browser of the administrator terminal 5. In response, in step S3002, the web browser of the administrator terminal 5 transmits a portal screen display request to the reception unit 702 of the management server 10.

In step S3003, the reception unit 702 of the management server 10 transmits a portal screen to the administrator terminal 5 in response to the portal screen display request from the administrator terminal 5. Accordingly, in step S3004, the web browser of the administrator terminal 5 displays a portal screen 1810, for example, illustrated in FIG. 18A.

In step S3005, the administrator or the like selects a setting target from the portal screen 1810. Accordingly, in step 3006, the web browser of the administrator terminal 5 requests the reception unit 702 of the management server 10 to transmit the selected setting screen.

In step S3007, the reception unit 702 of the management server 10 transmits the setting screen requested from the administrator terminal 5 to the administrator terminal 5. Accordingly, in step S3008, the web browser of the administrator terminal 5 displays the setting screen.

Figure 31A:
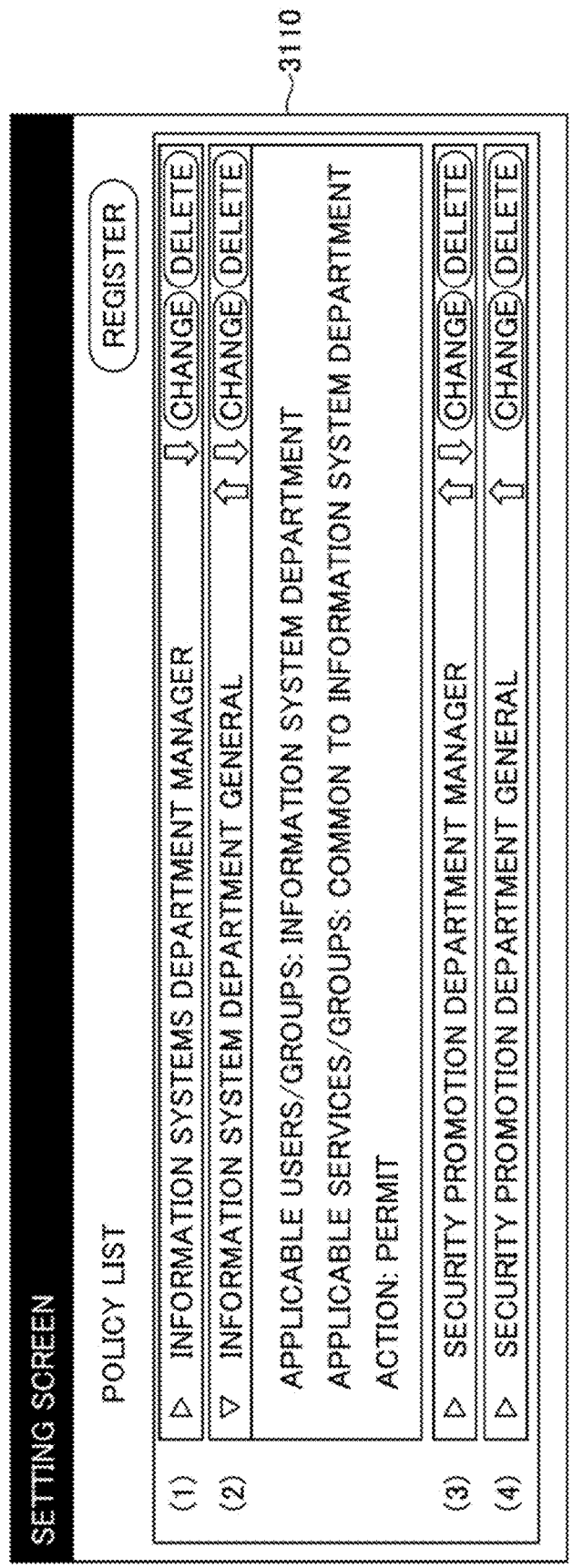
FIGS. 31A and 31B are diagrams illustrating examples of setting screens according to an embodiment.

For example, in step S3005, the administrator or the like selects the "Policy Management" button 1814 from the portal screen 1810 illustrated in FIG. 18A. In this case, in step 3008, the web browser of the administrator terminal 5 displays a policy list setting screen 3110, for example, as illustrated in FIG. 31A. The policy list setting screen 3110 enables the administrator or the like to change, delete, and set priorities of the policy included in the policy list 335, for example, as illustrated in FIG. 13A.

Figure 31B:
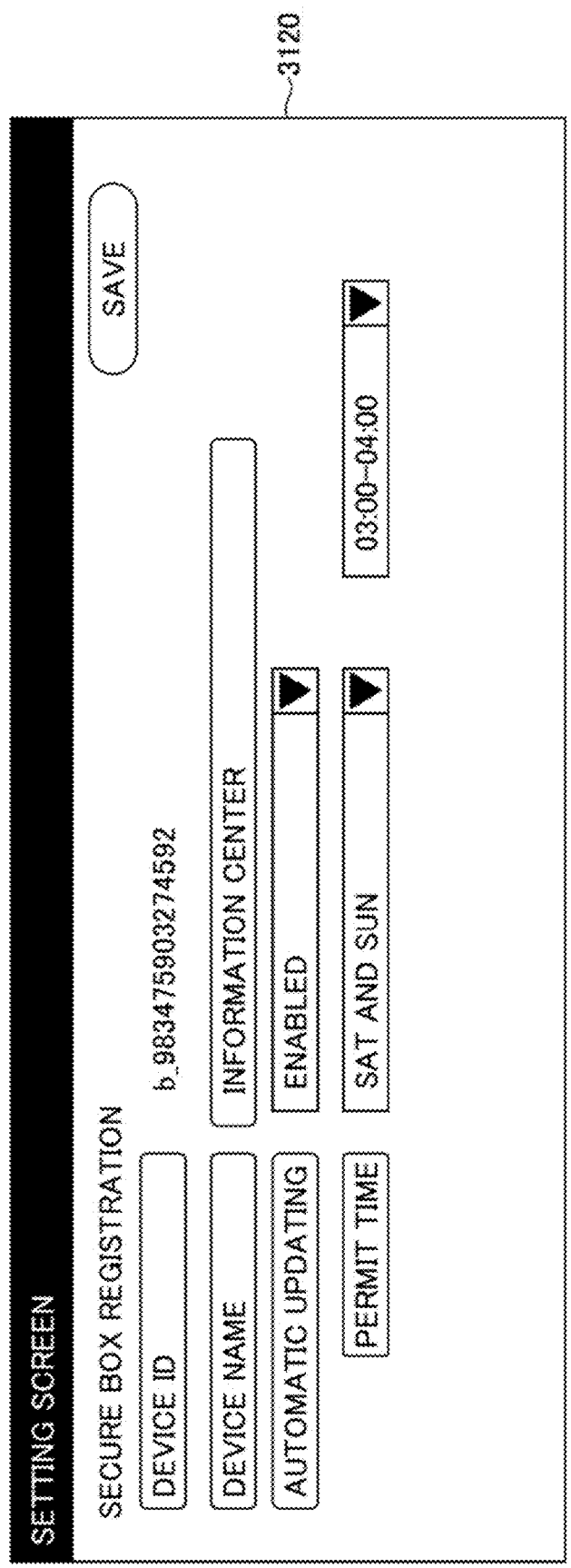

As another example, in step S3005, the administrator or the like selects the "Secure Box Management" button 1815 from the portal screen 1810 illustrated in FIG. 18A. In this case, in step 3008, the web browser of the administrator terminal 5 displays a setting screen 3120 of the secure box, for example, as illustrated in FIG. 31B. The secure box setting screen 3120 enables the administrator or the like to set a secure box list 1301 as illustrated in FIG. 13B, for example.

In step S3009, the administrator or the like performs an operation of changing the setting information for the setting screen displayed in step S3008. In response, in step S3010, the web browser of the administrator terminal 5 transmits changes to the reception unit 702 of the management server 10.

In step S3011, the reception unit 3011 of the management server 10 notifies an information manager 705 of the changes received from the administrator terminal 5. In response to this, in step S3012, the information manager 705 reflects the changes in the setting information. In step S3013, the information manager 705 notifies the log information representing the changes of the setting information to the log manager 706.

In step S3014, the information manager 705 of the management server 10 notifies the reception unit 702 of the completion notification indicating that the change of the setting information has been completed. In response to this, in step S3015, the reception unit 702 transmits a setting completion screen to the administrator terminal 5. As a result, in step S3016, the web browser of the administrator terminal 5 displays the setting completion screen.

When it is necessary to change the setting information of the secure box 14 by the above-described processing, the communication system 1 further performs the processing of steps S3021 to S3026.

In step S3021, the reception unit 702 of the management server 10 transmits the changes of the setting information to the secure box 14 through the communication controller 704. In response, in step S3023, the setting information manager 806 of the secure box 14 reflects the changes received from the management server 10 in the setting information stored in the storage unit 808. In step S3024, the setting information manager 806 transmits log information representing the changes of the setting information to the log manager 706 of the management server 10.

In steps S3025 and S3026, the setting information manager 806 of the secure box 14 transmits a completion notification indicating that the changes of the setting information have been completed to the reception unit 702 through the communication controller 704 of the management server 10.

As a result of the above-described process, the administrator or the like can change (set) various setting information managed by the communication system 1 using the administrator terminal 5.

(Display Process of Log Information)

Next, a display process of the log information common to various embodiments will be described. FIG. 32 is a sequence diagram illustrating an example of a display process of log information according to an embodiment. This process illustrates an example of a process in which an administrator or the like displays the log information managed by the communication system 1 using the administrator terminal 5. Note that among the processes illustrated in FIG. 32, the processes of steps S3001 to S3004 are the same as the processes of steps S3001 to S3004 described in FIG. 30. Thus, the description thereof will not be repeated herein.

In step S3201, the administrator or the like selects a "log management" button 1816 from the portal screen 1810 illustrated in FIG. 18A. In response, in step S3202, the web browser of the administrator terminal 5 transmits a log information display request to the reception unit 702 of the management server 10.

In steps S3203 and S3204, the reception unit 702 of the management server 10 acquires log information from the log manager 706. In step S3205, the reception unit 702 transmits a display screen of the log information for displaying the acquired log information to the administrator terminal 5. Accordingly, in step S3206, the web browser of the administrator terminal 5 displays a display screen 3300 of the log information, for example, illustrated in FIG. 33A.

FIG. 33A is a diagram illustrating an example of a display screen of log information. In the example of FIG. 33A, information, such as time stamp, user, service, operation, result, and the like is displayed on the display screen 3300 of the log information. With the above-described information, an administrator or the like can confirm when, by whom, and by which services operations have been performed, what kind of operations have been performed, and the results of these operations.

Figure 33B:
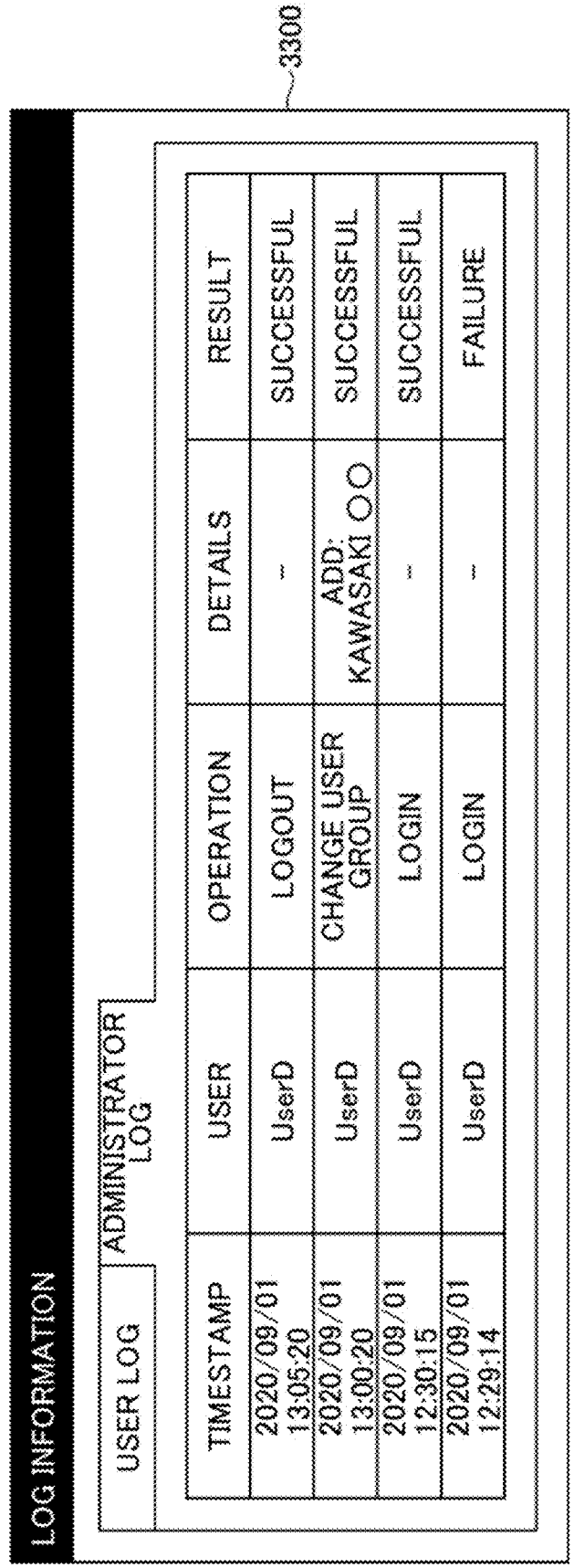

The administrator or the like may display log information for each user by selecting tab 3301 of "user log" in the display screen 3300 of the log information, for example, as illustrated in FIG. 33B. It is preferable that an administrator or the like not only displays log information but also downloads log information as necessary.

As described above, according to the embodiments of the present invention, in the communication system 1 that remotely accesses the electronic device connected to the local network 100 from the information terminal 111, various existing electronic devices can be used from the information terminal 111.

<Supplementary Description>

The functions of each of the embodiments described above may be implemented by one or more processing circuits. As used herein, a "processing circuit" includes a processor programmed to perform each function by software, such as a processor implemented in electronic circuits, an ASIC (Application Specific Integrated Circuit), a digital signal processor (DSP), a field programmable gate array (FPGA), or a conventional circuit module designed to perform each function as described above.

The devices described in the examples also illustrate only one of a plurality of computing environments for carrying out the embodiments disclosed herein. In some embodiments, the management server 10 includes a plurality of computing devices, such as server clusters. The plurality of computing devices is configured to communicate with each other through any type of communication link, including networks, shared memory, and the like, and perform the processes disclosed herein. Similarly, the relay server 13, or the secure box 14, may include a plurality of computing devices configured to communicate with each other.

For example, the relay server 2600 and the secure box 14 illustrated in FIG. 26 can be configured to share the processing of the management server 10 illustrated in FIGS. 14 to 17 in various combinations. For example, a process executed by a predetermined unit may be executed by the relay server 2600. Similarly, the function of a predetermined unit may be performed by the secure box 14. Each element of the management server 10 may be grouped into a single server device or may be divided into a plurality of devices.
[Effects of the Invention]

According to an embodiment, various electronic devices are available from various existing information terminals in a communication system for remotely accessing the electronic devices connected to a local network from the information terminals.

What is claimed is:

1. A communication system designed for implementing remote access from an information terminal connected to a first network to an electronic device that is one of a plurality of electronic devices connected to a second network, the second network differing from the first network, the communication system including a computer having a processor and a memory storing programmed instructions that, when executed by the processor, are operable for performing a process comprising:
receiving, by a relaying device implemented in first circuitry, a connection request including a session ID;
determining, by the relaying device, whether a transmission source of the connection request is the information terminal or a secure box by determining a Uniform Resource Indicator (URI) of the connection request; and
after it is determined that the transmission source of the connection request is the information ten final, determining, by the relaying device, that a session ID is registered in a connection management device, and redirecting the information terminal to an IP address corresponding to the session ID registered in the connection management device.

2. The communication system according to claim 1, wherein the process further comprises:
causing a screen to be displayed, the screen listing the plurality of electronic devices and further listing services or functions provided by the communication system:
receiving, through the screen, a user selection of the electronic device from among the plurality of electronic devices;
relaying, by a relaying device implemented in first circuitry, communication between the information terminal and the second network, in a state of being connectable from the first network and the second network; and
converting, by a converter implemented in second circuitry, a first protocol used by the information terminal for the remote access into a second protocol corresponding to the electronic device, the converter being one of a plurality of converters implemented in the second circuitry, each of the plurality of converters corresponding to one of the plurality of electronic devices, the converter being selected in accordance with the user selection of the electronic device.

3. The communication system according to claim 2, wherein
the electronic device includes an information processing device that provides a remote desktop service, and
the second protocol includes a protocol for utilizing the remote desktop service.

4. The communication system according to claim 2, wherein
the electronic device includes an image forming device, and
the second protocol includes a Web API for utilizing an image forming function of the image forming device.

5. The communication system according to claim 2, wherein
the electronic device provides a predetermined function, and
the second protocol includes a protocol for utilizing the predetermined function.

6. The communication system according to claim 2, wherein the process further comprises:
performing predetermined control on the electronic device, based on data that has been converted into the second protocol by the converter.

7. The communication system according to claim 6, wherein
the predetermined control includes power control for turning the electronic device on and off.

8. The communication system according to claim 6, wherein
the predetermined control includes exclusive control that restricts performance of other processes by the electronic device.

9. The communication system according to claim 1, wherein the process further comprises:
receiving a second connection request addressed from the information terminal to the electronic device and notifying the information terminal of connection information for connecting to the relay device; and
connecting the converter to the relay device through encrypted first communication, in response to the second connection request.

10. The communication system according to claim 9, wherein the process further comprises:
connecting the converter to the relay device through the encrypted first communication by using the connection information, and
relaying, by the relay device, between second communication and the encrypted first communication, wherein the information terminal uses the connection information to connect to the relay device through the second communication.

11. The communication system according to claim 2, wherein the process further comprises:
performing communication control including the converting.

12. The communication system according to claim 11, wherein the performing communication control includes
connecting to the second network, and
connecting to the relay device through encrypted first communication.

13. The communication system according to claim 11, wherein the performing communication control includes
converting the first protocol into control information for controlling an electronic device connected to a corresponding one of a plurality of communication interfaces provided.

14. The communication system according to claim 2, wherein the process further comprises:
performing communication control including the relaying and the converting.

15. The communication system according to claim 2, wherein the services or functions include at least one of a remote desktop service or a facsimile service.

16. The communication system according to claim 2, wherein the services or functions include at least one of an approval service or an attendance management service.

17. The communication system according to claim 16, wherein the services or functions include the approval service and the attendance management service.

18. The communication system according to claim 1, wherein after it is determined that the transmission source of the connection request is the information terminal, determining, by the relaying device, that the session ID is registered in a connection management device; verifying all sets of connection pairs; determining, by the relaying device, whether a set of connection pairs has already been connected and a destination service is running; and request the information terminal to redirect the set of connection pair that has already been connected and which the destination service is running.

19. A communication control device for use in a communication system, the communication system being designed for implementing remote access from an information terminal connected to a first network to an electronic device that is one of a plurality of electronic devices connected to a second network differing from the first network, the communication control device comprising:
receiving, by a relaying device implemented in first circuitry, a connection request including a session ID;
determining, by the relaying device, whether a transmission source of the connection request is the information ten final or a secure box by determining a Uniform Resource Indicator (URI) of the connection request; and
after it is determined that the transmission source of the connection request is the information terminal, determining, by the relaying device, that a session ID is registered in a connection management device, and redirecting the information terminal to an IP address corresponding to the session ID registered in the connection management device.

20. A non-transitory computer-readable recording medium storing a program for causing a computer to implement remote access from an information terminal connected to a first network to an electronic device that is one of a plurality of electronic devices connected to a second network, the second network differing from the first network in a communication system, the program having instructions that when processed by a processor, execute a process comprising:
receiving, by a relaying device implemented in first circuitry, a connection request including a session ID:
determining, by the relaying device, whether a transmission source of the connection request is the information terminal or a secure box by determining a Uniform Resource Indicator (URI) of the connection request; and
after it is determined that the transmission source of the connection request is the information terminal, determining, by the relaying device, that a session ID is registered in a connection management device, and redirecting the information terminal to an IP address corresponding to the session ID registered in the connection management device.

* * * * *